(12) United States Patent
Amano et al.

(10) Patent No.: US 7,958,326 B2
(45) Date of Patent: Jun. 7, 2011

(54) STORAGE SYSTEM AND STORAGE CONTROL METHOD

(75) Inventors: Takashi Amano, Yokohama (JP); Yoichi Mizuno, Yokohama (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 631 days.

(21) Appl. No.: 12/010,492

(22) Filed: Jan. 25, 2008

(65) Prior Publication Data
US 2008/0244205 A1 Oct. 2, 2008

(30) Foreign Application Priority Data
Mar. 30, 2007 (JP) .................................. 2007-091039

(51) Int. Cl.
*G06F 13/00* (2006.01)
*G06F 13/28* (2006.01)
*G06F 7/00* (2006.01)
*G06F 12/16* (2006.01)

(52) U.S. Cl. ................ 711/162; 711/161; 711/E12.103; 707/646

(58) Field of Classification Search ........................ None
See application file for complete search history.

(56) References Cited

U.S. PATENT DOCUMENTS
| | | | |
|---|---|---|---|
| 6,269,381 B1 | 7/2001 | St. Pierre et al. | |
| 7,127,578 B2 * | 10/2006 | Nagata | 711/162 |
| 2005/0262316 A1 | 11/2005 | Obayashi et al. | |

FOREIGN PATENT DOCUMENTS
JP 2005-332067 5/2004

OTHER PUBLICATIONS
Extended European Search Report mailed Jun. 26, 2009.

* cited by examiner

*Primary Examiner* — Reginald G Bragdon
*Assistant Examiner* — Eric S Cardwell
(74) *Attorney, Agent, or Firm* — Stites & Harbison PLLC; Juan Carlos A. Marquez, Esq.

(57) ABSTRACT

The correspondence between a plurality of virtual storage positions in a virtual volume for logically holding a snapshot image of a main volume in which data elements transmitted from a higher-level device are written and a plurality of address information elements indicating a plurality of actual storage positions of a plurality of data elements constituting the snapshot image is managed. In the initial backup, all the data elements stored in all the actual storage positions indicated by a plurality of address information elements are backed up, then storage positions where a difference has occurred between the virtual volume and the backup destination storage device is managed, and in the next and subsequent backups, data elements on the storage positions specified from the address information elements corresponding to the differentially managed storage positions are backed up.

25 Claims, 28 Drawing Sheets

FIG. 3

MANAGEMENT OF VOLUME PAIR — 215

PAIR CONFIGURATION MANAGEMENT TABLE — 301

| PAIR NUMBER | MAIN VOLUME | SNAPSHOT VOLUME | STATUS |
|---|---|---|---|
| 1 | 1001 | 2001 | PAIR STATUS |
| 2 | 1002 | 2002 | SPLIT STATUS |
| 3 | 1003 | 2003 | IN TRANSITION TO PAIR STATUS |
| 4 | 1004 | 2004 | IN TRANSITION TO SPLIT STATUS |
| 5 | 1005 | 2005 | ERROR STATUS |
| ... | ... | ... | ... |

311, 312, 313, 314

SNAPSHOT BITMAP MANAGEMENT TABLE — 302

| PAIR NUMBER | BITMAP NUMBER | DIFFERENTIAL MANAGEMENT SIZE | BITMAP STORAGE POSITION |
|---|---|---|---|
| 1 | 1 | 1MB | 0:0-0:1000 |
| 2 | 2 | 1MB | 1:2000-1:4000 |
| 3 | 3 | 2MB | 1:5000-1:6000 |
| ... | ... | ... | ... |

321, 322, 323, 324

SNAPSHOT BITMAP — 303

331a 331b 331c 331d 331e

| 1001 | 1002 | 1003 | 1004 | 1005 | ... | | | |
|---|---|---|---|---|---|---|---|---|
| 2001 | ... | | | | | | | |
| ... | | | | | | | | |

FIG. 4

MANAGEMENT OF VOLUME PAIR — 215

SNAPSHOT MANAGEMENT TABLE — 304

| BITMAP NUMBER (341) | BIT NUMBER (342) | DATA STORAGE POSITION (343) |
|---|---|---|
| 1 | 1 | 3001:0000-3001:0999 |
| 1 | 2 | 3001:5000-3001:5999 |
| ⋮ | ⋮ | ⋮ |
| 1 | 1000 | 1001:8000-1001-8999 |
| 2 | 1 | 3004:2000-3004:2999 |
| 2 | 2 | 1002:2000-1002-2999 |
| ⋮ | ⋮ | ⋮ |
| 2 | 1000 | 1002:5000-1002-5999 |
| 3 | 1 | 1003:0000-1003:0999 |
| ⋮ | ⋮ | ⋮ |

POOL CONFIGURATION MANAGEMENT TABLE — 305

| POOL VOLUME (351) |
|---|
| 3001 |
| 3002 |
| 3003 |
| 3004 |
| 3005 |
| ⋮ |

FIG. 5

MANAGEMENT OF VOLUME PAIR (215)

BACKUP BITMAP MANAGEMENT TABLE (306)

| PAIR NUMBER (361) | BITMAP NUMBER (362) | DIFFERENTIAL MANAGEMENT SIZE (363) | BITMAP STORAGE POSITION (364) |
|---|---|---|---|
| 1 | 101 | 1MB | 10:0-10:1000 |
| 2 | 102 | 1MB | 11:2000-11:4000 |
| 3 | 103 | 2MB | 11:5000-11:6000 |
| ⋮ | ⋮ | ⋮ | ⋮ |

BACKUP BITMAP (307)

| 1001 (371a) | 1002 (371b) | 1003 (371c) | 1004 (371d) | 1005 (371e) | ... | | | |
|---|---|---|---|---|---|---|---|---|
| 2001 | ... | | | | | | | |
| ... | | | | | | | | |
| | | | | | | | | |
| | | | | | | | | |
| | | | | | | | | |

FIG. 8

MANAGEMENT OF TAPE ~218

TAPE POOL MANAGEMENT TABLE ~601

| TAPE POOL NUMBER ~611 | TAPE POOL CONFIGURATION TAPE NUMBER ~612 | STORAGE TAPE POOL NUMBER ~613 |
|---|---|---|
| 1 | 101,102,103 | 11,12,13 |
| 2 | 111-131 | 14,15 |
| ⋮ | ⋮ | ⋮ |

TAPE GROUP MANAGEMENT TABLE ~602

| TAPE GROUP NUMBER ~621 | TAPE GROUP STATUS ~622 | TAPE GROUP CONFIGURATION TAPE ~623 | BACKUP SOURCE LUN ~624 | BACKUP DATA TYPE ~625 | TAPE GROUP NUMBER NECESSARY FOR THE RESTORE ~626 | AFFILIATION TAPE POOL NUMBER ~627 | RECORDING DATE AND TIME ~628 |
|---|---|---|---|---|---|---|---|
| 11 | NORMAL | 101:10-900 102:0-900 103:0-900 | 2001,2002 | FULL | | 1 | 2006/4/4 22:00:00 |
| 12 | NORMAL | 104:50-900 105:0-500 | 2001,2002 | DIFFERENTIAL | 11 | 1 | 2006/4/11 22:00:00 |
| 13 | NORMAL | 106:0-300 | 2001,2002 | INCREMENTAL | 11,12 | 1 | 2006/4/12 22:00:00 |
| 14 | IN BACKUP | 107:0-900 | 2003 | FULL | | 2 | 2006/4/20 20:10:00 |
| ⋮ | ⋮ | ⋮ | ⋮ | ⋮ | ⋮ | ⋮ | ⋮ |

TAPE MEDIA MANAGEMENT TABLE ~603

| TAPE NUMBER ~631 | TAPE TYPE ~632 | 1 BLOCK SIZE ~633 | TAPE CAPACITY ~634 | USED CAPACITY ~635 | TAPE STATUS ~636 | AFFILIATION TAPE POOL NUMBER ~637 | AFFILIATION TAPE GROUP NUMBER ~638 |
|---|---|---|---|---|---|---|---|
| 101 | LTO3 | 512B | 400GB | 300GB | NOMAL | 1 | 11 |
| 111 | LTO3 | 512B | 400GB | 0GB | NOT USE | 4 | |
| 121 | LTO4 | 256B | 800GB | 0GB | ERROR | | |
| ⋮ | ⋮ | ⋮ | ⋮ | ⋮ | ⋮ | ⋮ | |

FIG. 9

MANAGEMENT OF BACKUP DATA — 211

701 BACKUP DATA MANAGEMENT TABLE

| 711 BACKUP DATA NUMBER | 712 BACKUP SOURCE LUN | 713 BACKUP DESTINATION TAPE GROUP NUMBER | 714 STATUS OF BACKUP DATA | 715 BACKUP DATA TYPE | 716 BACKUP ACQUISITION DATE AND TIME |
|---|---|---|---|---|---|
| 1 | 2001,2002 | 11 | NORMAL | FULL | 2006/4/4 22:00:00 |
| 2 | 2001,2002 | 12 | NORMAL | DIFFERENTIAL | 2006/4/11 22:00:00 |
| 3 | 2001,2002 | 13 | NORMAL | INCREMENTAL | 2006/4/12 22:00:00 |
| 4 | 2003 | 14 | ERROR | FULL | 2006/4/20 20:10:00 |
| ⋮ | ⋮ | ⋮ | ⋮ | ⋮ | ⋮ |

702 DIFFERENTIAL/INCREMENTAL BITMAP MANAGEMENT TABLE

| 721 LUN | 722 BITMAP NUMBER | 723 BACKUP TYPE | 724 DIFFERENTIAL MANAGEMENT SIZE | 725 BITMAP STORAGE POSITION |
|---|---|---|---|---|
| 2001 | 201 | DIFFERENTIAL | 1MB | 5:0-5:1000 |
| 2001 | 202 | INCREMENTAL | 1MB | 5:2000-5:4000 |
| 2002 | 203 | DIFFERENTIAL | 2MB | 7:5000-7:6000 |
| 2002 | 204 | INCREMENTAL | 2MB | 8:2000-8:4000 |
| ⋮ | ⋮ | ⋮ | ⋮ | ⋮ |

703 INCREMENTAL/DIFFERENTIAL BITMAP

|  | 731a | 731b | 731c | 731d | 731e |  |  |  |
|---|---|---|---|---|---|---|---|---|
|  | 1001 | 1002 | 1003 | 1004 | 1005 | ... |  |  |
| 2001 | ... |  |  |  |  |  |  |  |
| ... |  |  |  |  |  |  |  |  |
|  |  |  |  |  |  |  |  |  |
|  |  |  |  |  |  |  |  |  |
|  |  |  |  |  |  |  |  |  |

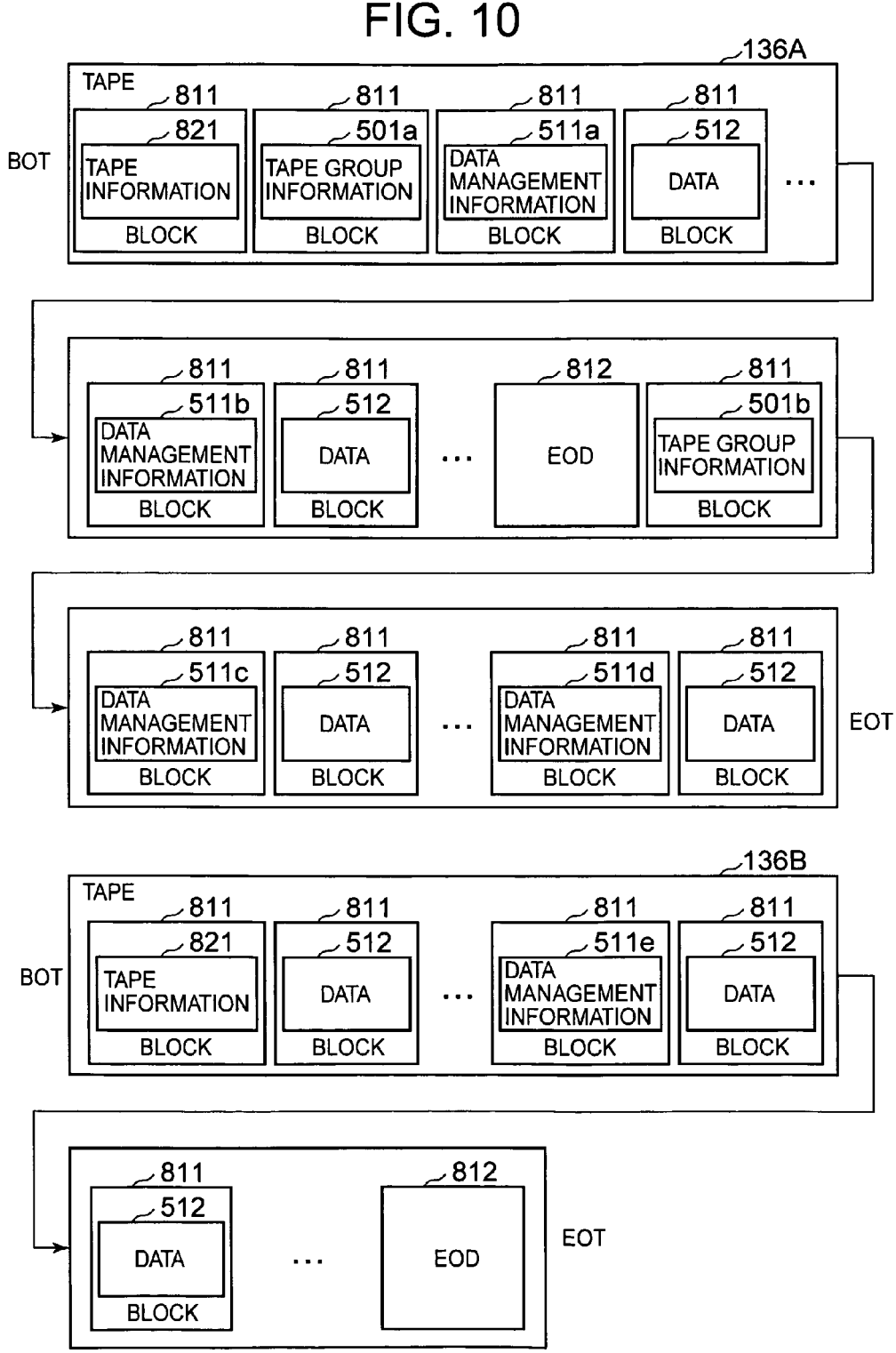

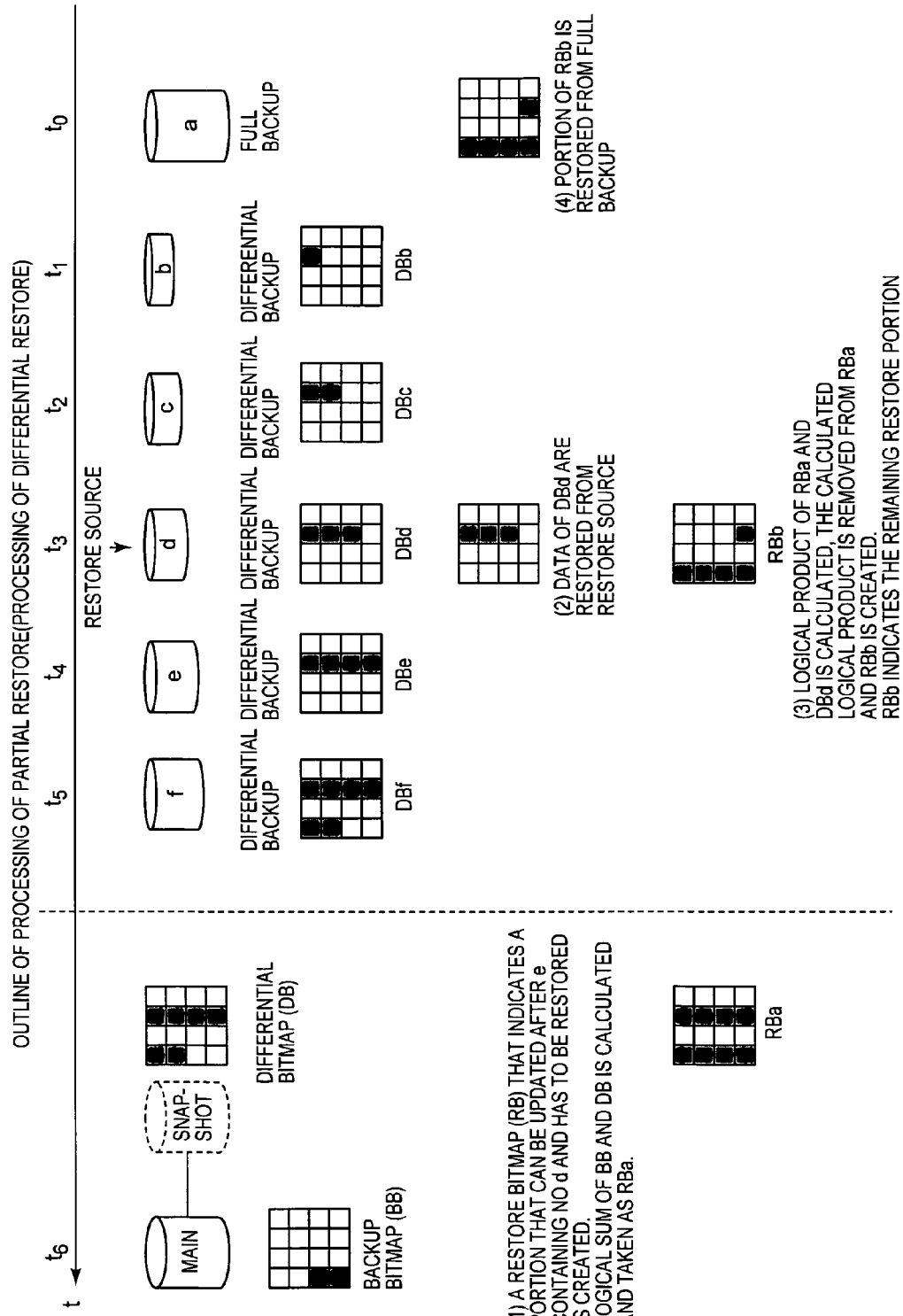

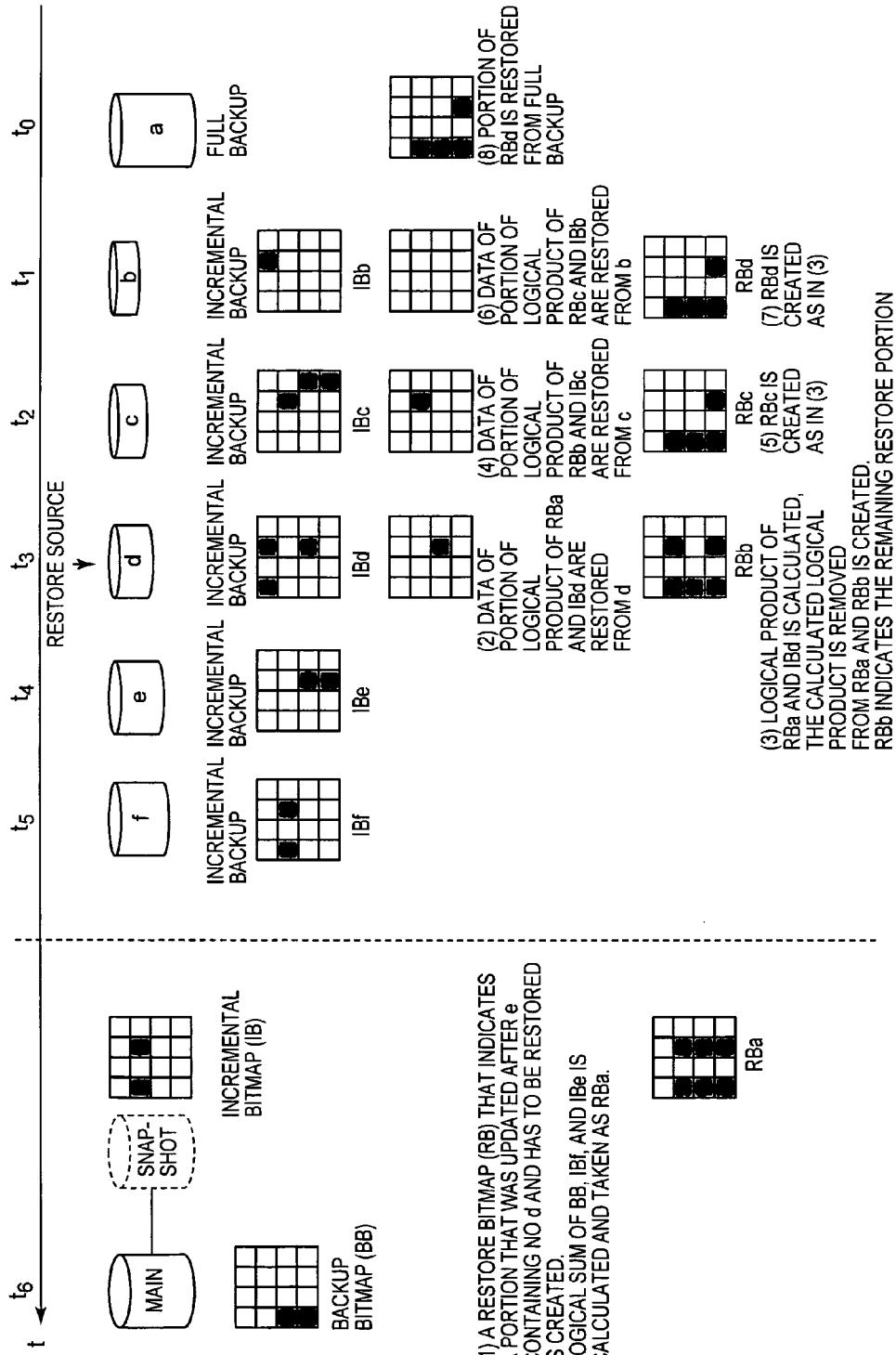
FIG. 28 OUTLINE OF PROCESSING OF PARTIAL RESTORE (PROCESSING OF INCREMENTAL RESTORE)

STORAGE SYSTEM AND STORAGE CONTROL METHOD

CROSS-REFERENCE TO PRIOR APPLICATION

This application relates to and claims the benefit of priority from Japanese patent application number 2007-91039, filed on Mar. 30, 2007 the entire disclosure of which is incorporated herein by reference.

BACKGROUND

The present invention relates to a technology for data backup.

For example, according to Japanese Patent Application Laid-open No. 2005-332067, a disk array device performs data update after snapshot acquisition to an update data storage disk device that is a storage area physically separated from a disk device that stores the original data.

A method by which a backup server reads data from a storage device that is a backup source and writes the data that were read into a storage device that is a backup destination is an example of backup. However, with this method, for example, when the backup performance of the backup server is inferior to that of the storage device that is the backup source and/or backup destination, the backup performance of the backup server becomes a bottleneck.

A method of acquiring a snapshot of a logical volume at a snapshot acquisition time and taking the snapshot as a backup source can be considered as another backup method. However, if the snapshot is taken as a copy (referred to hereinbelow as "volume copy") of the logical volume itself at a snapshot acquisition time, when there are a plurality of snapshot acquisition times, the number of volume copies has to be equal to the number of snapshot acquisition times. As a result, the consumption of storage resources is increased.

SUMMARY

Accordingly, it is an object of the present invention to enable the backup that requires no backup server and in which a snapshot that is different from the volume copy is taken as a backup source.

Other objects of the present invention will be made clear from the explanation below.

There are provided a main volume that is a logical volume in which an update is generated by writing a data element transmitted from a higher-level device and a copy storage area that is a storage area in which a data element prior to updating in the main volume will be copied.

A correspondence is managed between a plurality of virtual storage positions in a snapshot volume that is a virtual logical volume for logically holding a snapshot image of the main volume and a plurality of address information elements indicating a plurality of actual storage positions of a plurality of data elements constituting the snapshot image of the main volume.

In the initial backup, all the data elements stored in all the actual storage positions indicated by the plurality of address information elements are backed up to a backup destination storage device.

When a difference occurs between the snapshot volume and the backup destination storage device because the snapshot volume is updated following an update of the main volume after the initial backup, the differential management information for managing which virtual storage position within said snapshot volume is equivalent to the difference is updated.

In the next and subsequent backups, an actual storage position of one or more data elements equivalent to the difference between the snapshot volume and the backup destination storage device is specified from an address information element corresponding to a virtual storage position specified from the differential management information, and one or more data elements present in the specified actual storage position is backed up to the backup destination storage device.

BRIEF DESCRIPTION OF THE DRAWINGS

FIG. 3 shows a first management information example of the Management of volume pair;
FIG. 4 shows a second management information example of the Management of volume pair;
FIG. 5 shows a third management information example of the Management of volume pair;
FIG. 8 shows an example of management information of the Management of tape media;
FIG. 9 shows an example of management information of the Management of backup data;
FIG. 10 shows an example of recording format of a tape.

FIG. 27 shows the outline of the Processing of Differential Restore; and

FIG. 28 shows the outline of the Processing of Incremental Restore.

DETAILED DESCRIPTION OF THE PREFERRED EMBODIMENTS

Figure 1:
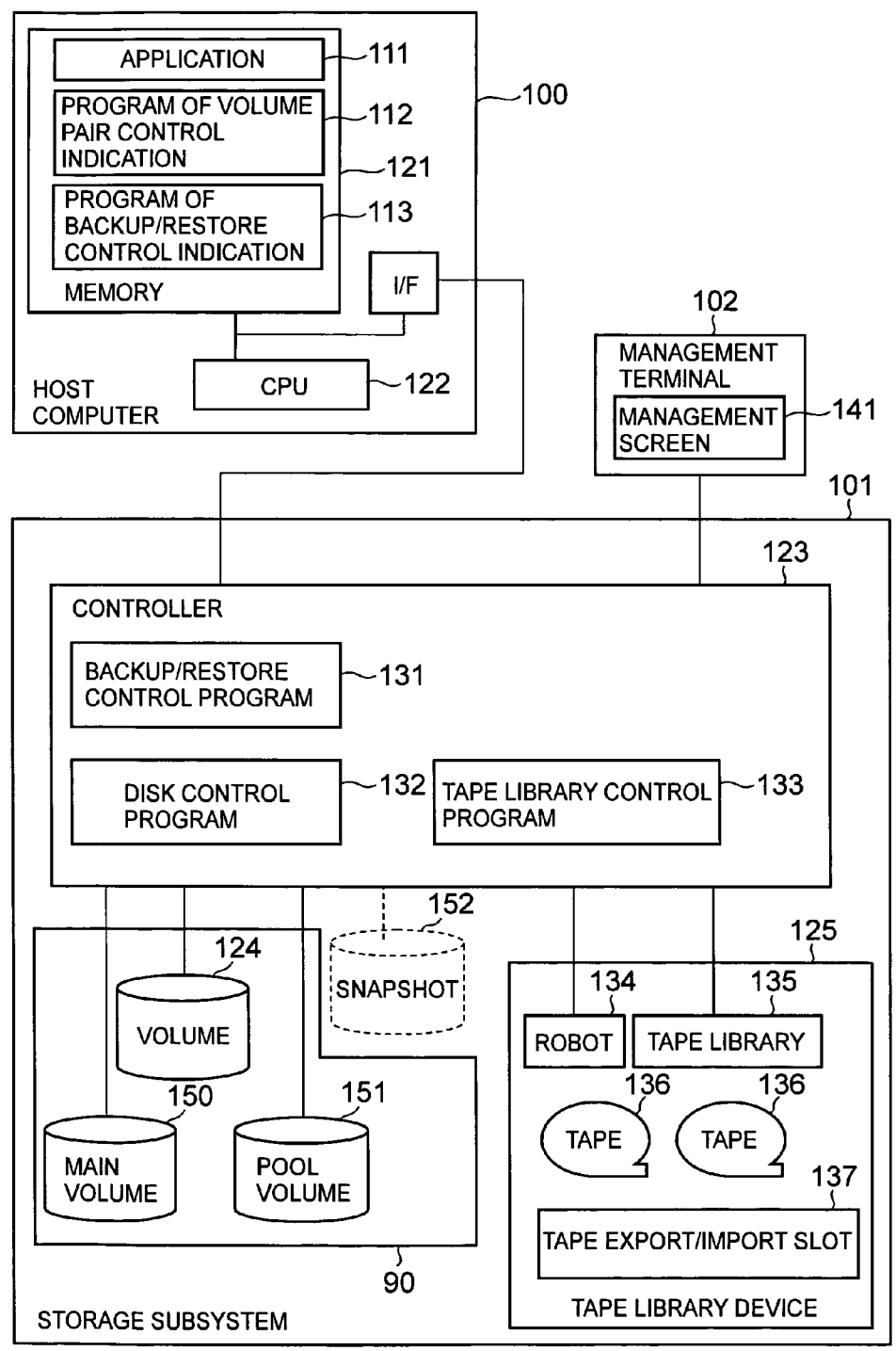
FIG. 1 shows a configuration example of a computer system of one embodiment of the present invention.

In one embodiment, a storage system is provided with a main volume that is a logical volume in which an update is generated by writing a data element transmitted from a higher-level device, and a copy storage area that is a storage area in which a data element prior to updating in the main volume will be copied. The storage system can comprise a snapshot management unit, a full backup unit, a differential management unit, and a partial backup unit. The snapshot management unit can manage a correspondence between a plurality of virtual storage positions in a snapshot volume (virtual logical volume) for logically holding a snapshot image of the main volume and a plurality of address information elements indicating a plurality of actual storage positions (positions in the main volume and/or copy storage area) of a plurality of data elements constituting the snapshot image. The full backup unit can execute as a full backup a backup of all the data elements located in all the storage positions indicated by the plurality of address information elements to a backup destination storage device. The differential management unit can update differential management information for managing which virtual storage position within the snapshot volume is equivalent to a difference when the difference occurs between the snapshot volume and the backup destination storage device because the snapshot volume is updated following an update of the main volume after the full backup. A partial backup unit can execute a partial backup in which an actual storage position of one or more data elements equivalent to the difference between the snapshot volume and the backup destination storage device is specified from an address information element corresponding to a virtual storage position specified from the differential management information and one or more data elements present in the specified actual storage position are backed up to the backup destination storage device.

The main volume can be formed, for example, by using a storage device of a random access type. A variety of storage devices such as hard disks and flash memories can be employed as the storage device of a random access type.

The backup destination storage device can be, for example, a storage device of a sequential access type. A variety of storage devices such as magnetic tapes can be employed as the storage device of a sequential access type.

In one embodiment, the differential management unit can manage by the differential management information a storage position, from among a plurality of virtual storage positions in the snapshot volume, of a differential data element that is present between the snapshot volume after the full backup and the backup destination storage device. The partial backup in each cycle is a differential backup. The differential backup can back up one or more differential data elements present in one or more actual storage positions indicated by one or more address information elements corresponding to one or more virtual storage positions specified from the differential management information.

In one embodiment, the differential management information includes a first differential management information element (for example, the below-described backup bitmap) that is information for managing in which storage position, from among a plurality of virtual storage positions in the snapshot volume, an update has occurred and a second differential management information element (for example, the below-described differential bitmap) that is information for managing which data element logically stored in a storage position, from among a plurality of virtual storage positions in the snapshot volume, is a backup object. In which storage position, from among a plurality of virtual storage positions in the snapshot volume, a differential data element is present can be specified from the result of a logical operation (for example, a logical sum) of the first differential management information element and the second differential management information element.

In one embodiment, the snapshot image is a data image of the main volume at a point in time in which a volume pair of the main volume and the snapshot volume is split. The differential management unit is so configured that if an update occurs in any storage position, from among a plurality of virtual storage positions in the snapshot volume, within an interval from a point in time in which the volume pair was split to a point in time in which the volume pair is split the next time, then the first differential management information element is updated so that the updated storage position becomes known. At the time the volume pair is split, the differential management unit can perform a logical operation of the first differential management information element and the second differential management information element at the time of this split, can overwrite the result of this logical operation on the second differential management information element, and then can reset the first differential management information element. In the differential backup, a virtual storage position in which a differential data element is present can be specified from the second differential management information element at the time of the differential backup.

In one embodiment, the partial backup unit can also back up restore necessary information that is necessary to restore a snapshot image by using a differential data element, in addition to the differential data element that is logically present in a specified virtual storage position, in a differential backup of each cycle, to the backup destination storage device. The restore necessary information includes a second differential management information element at a point in time of the differential backup for specifying a position of the differential data element that will be backed up.

In one embodiment, the differential management unit can manage by the differential management information a virtual storage position in which a differential data element between the snapshot volume and the backup destination storage device after immediately preceding full backup or immediately preceding partial backup is present. The partial backup in each cycle is an incremental backup. The incremental backup can back up one or more differential data elements present in one or more actual storage positions indicated by one or more address information elements corresponding to one or more virtual storage positions specified from the differential management information.

In one embodiment, the differential management information includes a first differential management information element (for example, the below-described backup bitmap) that is information for managing in which virtual storage position, from among a plurality of virtual positions in the snapshot volume, an update has occurred and a third differential management information element (for example, the below-described incremental bitmap) that is information for managing which data element logically stored in a virtual position, from among a plurality of virtual storage positions in the snapshot volume, is a backup object. Specifying is performed to determine a virtual storage position in which a differential data element is present from the second differential management information element that was updated by using the first differential management information element.

In one embodiment, the snapshot image is a data image of the main volume at a point in time in which a volume pair of the main volume and the snapshot volume is split. The differential management unit is so configured that if an update occurs in any storage position, from among a plurality of virtual storage positions in the snapshot volume, within an interval from a point in time in which the volume pair was split to a point in time in which the volume pair is split the next time, then the first differential management information element is updated so that the updated storage position becomes known. The differential management unit can reset the third differential management information element at the time of this split of the volume pair, overwrite the first differential management information element at the time of this split on the third differential management information element that was reset, and then reset the first differential management information element. In the incremental backup, a virtual storage position in which a differential data element is present can be specified from the third differential management information element at the time of the incremental backup.

In one embodiment, the partial backup unit can also back up restore necessary information that is necessary to restore a snapshot image by using a differential data element, in addition to the differential data element present in a specified virtual storage position, in an incremental backup of each cycle, to the backup destination storage device. The restore necessary information includes a third differential management information element at a point in time of the incremental backup.

In one embodiment, the storage system can further comprise a restore unit that restores a snapshot image of a restore object, from among a plurality of snapshot images respectively corresponding to a plurality of points in time, to the main volume or another logical volume. The restore unit can restore the plurality of data elements that were subjected to the full backup, and then can overwrite one or more data elements that were backed up in the partial backup and are in the snapshot image of the restore object on data elements respectively corresponding to the one or more data elements from among the plurality of data elements that were restored.

In one embodiment, the restore unit can restore one or more data elements that were backed up in the partial backup and are in the snapshot image of the restore object and can restore data elements other than the one or more data elements that are in the snapshot image of the restore object by reading from a group of data elements that were partially backed up and/or from a group of data elements that were fully backed up at a point in time preceding a restore object time that is a point in time in which the snapshot image of the restore object was partially backed up.

In one embodiment, it is possible that the restore unit does not execute the restore with respect to storage positions having actually stored therein data elements constituting a snapshot image of the restore object, from among a plurality of storage positions in the main volume at a restore execution time that is a point in time in which the restore is executed.

In one embodiment, the restore unit can specify one or more first restore object positions, from among a plurality of storage positions in the main volume, from a result of logical operation of the first differential management information element and the second differential management information element in the restore execution time, specify one or more second restore object positions from a plurality of positions in the main volume from the second differential management information element at the restore object time, restore one or more data elements that were differentially backed up at the restore object time to each respective one or more second restore object positions, and restore to a position other than the one or more second restore object positions, from among the one or more first restore object positions, a data element that corresponds to the position and is selected from a group of data elements that were full backed up at a point in time before the restore object time.

In one embodiment, the restore unit can execute the following processing (1) to (3):

(1) to create a restore position information element that represents one or more restore object positions, from among a plurality of positions in the main volume, from a result of logical operation of the first differential management information element at the restore execution time and each third differential management information element in each backup time that is before the restore execution time and after the restore object time;

(2) to restore a data element that was incremental backed up or full backed up at the backup time to the restore object position specified from the result of logical operation of the third differential management information element at the incremental backup time and the created restore position information element or the updated restore position information element with respect to each incremental backup time before the restore object time, and to update the restore position information element by removing the specified restore object position from one or more restore object positions indicated by the restore position information element that was used for the logical operation;

(3) if the restore position information element after the update relating to the incremental backup time immediately after the full backup (the earliest incremental backup time) represents at least one restore object position, to restore the data element corresponding to this restore object position, from among a plurality of data elements that were full backed up, to the restore object position.

In one embodiment, the restore necessary information may include a storage size of a storage position (storage position (storage area) within the main volume or snapshot volume) corresponding to the bitmap bit that is the differential management information element contained in the restore necessary information.

In one embodiment, the backup destination storage device may be a storage device of a sequential access type, and the restore necessary information may be recorded on the upstream side of a group of sequential devices from the data element.

In one embodiment, the backup destination storage device may be a storage device of a sequential access type, and the restore necessary information and data elements in the partial backup may be recorded on the downstream side from all the data elements that were recorded by the full backup.

In one embodiment, the snapshot image is a data image of the main volume at a snapshot acquisition time. The differential management unit is so configured that if an update occurs in any storage position, from among a plurality of virtual storage positions in the snapshot volume, within an interval from a snapshot acquisition time to a next snapshot acquisition time, then the first differential management information element is updated so that the updated storage position becomes known, and at the snapshot acquisition time, the differential management unit can perform a logical operation of the first differential management information element and the second differential management information element, overwrite the result of this logical operation on the second differential management information element, and then reset the first differential management information element. In the differential backup, specifying is performed to determine a virtual storage position in which a differential data element is present from the second differential management information element at the time of the differential backup.

In one embodiment, the differential management unit is so configured that if an update occurs in any storage position, from among a plurality of virtual storage positions in the snapshot volume, within an interval from a snapshot acquisition time to a next snapshot acquisition time, then the first differential management information element is updated so that the updated storage position becomes known, and at the snapshot acquisition time, the differential management unit resets the second differential management information element, overwrites the first differential management information element at this time on the second differential management information element that was reset, and then resets the first differential management information element. In the incremental backup, specifying is performed to determine a virtual storage position in which a differential data element is present from the second differential management information element at the time of the incremental backup.

In one embodiment, the differential management information includes a first differential management information element that is information for managing in which virtual storage position, from among a plurality of virtual storage positions in the snapshot volume, an update has occurred and second and third differential management information elements that are information for managing which data element corresponding to the virtual storage position in a virtual storage position, from among a plurality of virtual storage positions in the snapshot volume, is a backup object. The differential management unit is so configured that if an update occurs in any virtual storage position, from among a plurality of virtual storage positions in the snapshot volume, within an interval from a snapshot acquisition time to a next snapshot acquisition time, then the first differential management information element is updated so that the updated position becomes known, and at the snapshot acquisition time, the differential management unit can perform a logical operation of the first differential management information element and the second differential management information element, overwrite the result of this logical operation on the second differential management information element, reset the third differential management information element, overwrite the first differential management information element at this time on the third differential management information element after the rest, and then reset the first differential management information element. In the differential backup, specifying is performed to determine a virtual storage position, from among a plurality of virtual storage positions in the snapshot volume, in which a differential data element is present, from the second differential management information element at the time of the differential backup. In the incremental backup, specifying is performed to determine a position, from among a plurality of positions in the snapshot volume, in which a differential data element is present from the third differential management information element at the time of the incremental backup.

In one embodiment, the differential management unit is so configured that if an update occurs in any virtual storage position, from among a plurality of virtual storage positions in the snapshot volume, within an interval from a snapshot acquisition time to a next snapshot acquisition time, then the first differential management information element is updated so that the updated virtual storage position becomes known, and at the snapshot acquisition time, the differential management unit can perform a logical operation of the first differential management information element and the second differential management information element at this time, overwrite the result of this logical operation on the second differential management information element, and then reset the first differential management information element.

In one embodiment, the differential management unit is so configured that if an update occurs in any position, from among a plurality of positions in the snapshot volume, within an interval from a snapshot acquisition time to a next snapshot acquisition time, then the first differential management information element is updated so that the updated position becomes known, and at the snapshot acquisition time, the differential management unit can reset the second differential management information element, overwrite the first differential management information element at this time on the second differential management information element after the reset, and then reset the first differential management information element.

One embodiment can be obtained by combining two or more from among the above-described multiple embodiments. For example, the storage system can selectively execute any partial backup from among the above-described differential backup and incremental backup. For example, when the storage system receives a Differential Backup Indication from the higher-level device, the storage system executes the differential backup, and when an Incremental Backup Indication is received from the higher-level device, then the incremental backup can be executed.

The above-described units (for example, a device-related value acquisition unit, a device identification value calculation unit, a correspondence registration unit, and the like) can be created of hardware, computer programs or combinations thereof (for example, a portion is implemented by using a computer program, and the rest is implemented with hardware). A computer program is read and executed by a predetermined processor. Further, in the case of information processing performed by reading a computer program with a processor, a storage region present on hardware resources such as a memory may be used appropriately. Further, a computer program may be installed on a computer from a recording medium such as a CD-ROM, or may be downloaded to the computer via a communication network.

An embodiment of the present invention will be explained below with reference to the appended drawings. In the explanation below the backup of three types will be assumed: a full backup, a differential backup, and an incremental backup. Of these backups of three types, the differential backup and incremental backup are backups of the type that belongs to a partial backup. When backups of two or more types of the three aforementioned types are considered hereinbelow, they will be described together by using a slash "/". For example, when backups of all the three types are indicated, they are described as "full/differential/incremental". IN such case, "/" is used to mean "and/or".

For example in this embodiment, the storage system will be a single storage system, the higher-level device will be a host computer, the storage device of a backup source will be a storage device of a random access type, more specifically, for example, a magnetic disk (referred to hereinbelow simply as "disk"), and the storage device of backup destination will be a storage device of a sequential access type, more specifically, for example, a magnetic tape (referred to hereinbelow simply as "tape").

The embodiment will be described below in greater detail.
<<System Configuration>>

Figure 2:
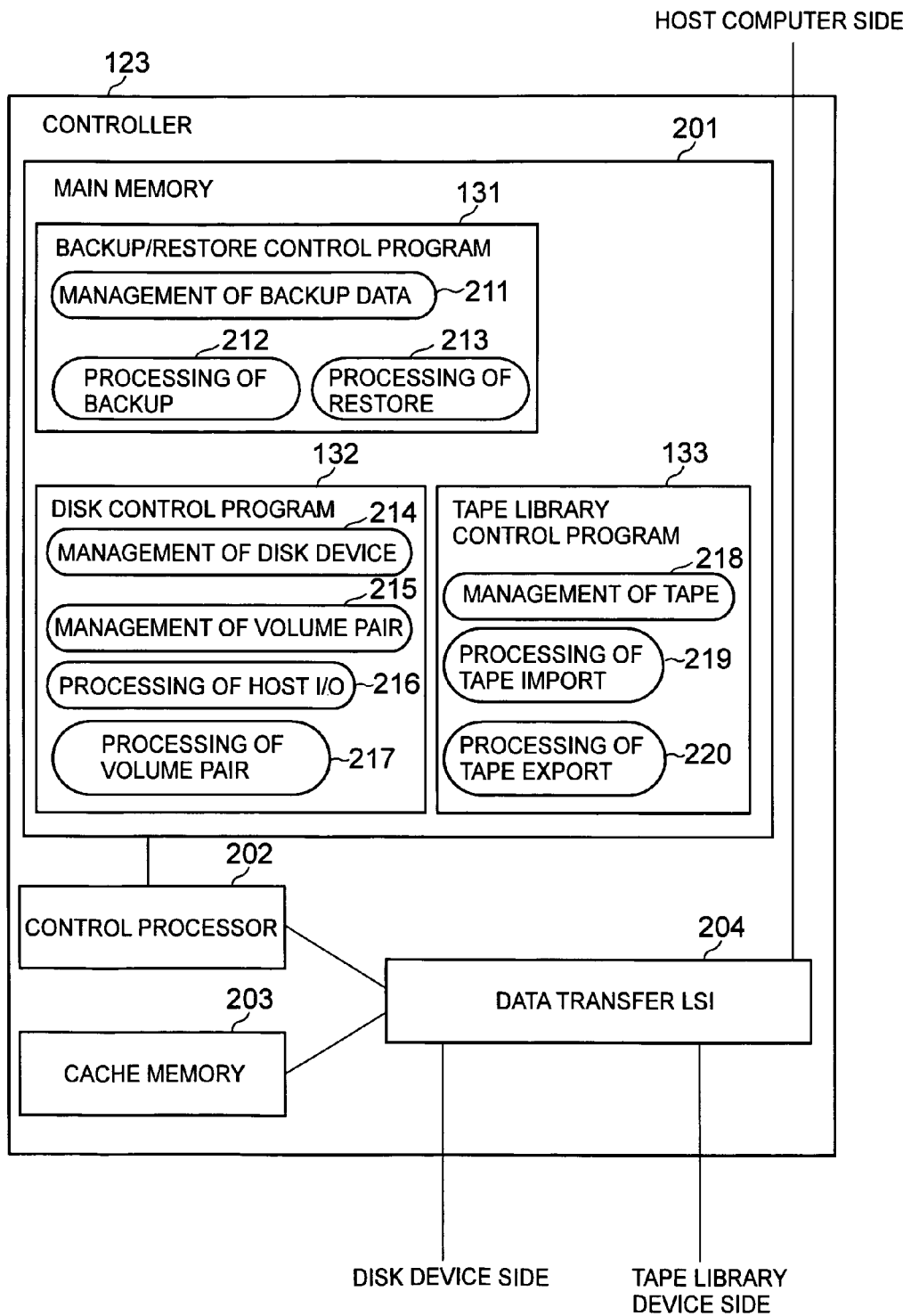
FIG. 2 shows a configuration example of the controller of FIG. 1.

FIG. 1 shows a configuration example of a computer system of an embodiment of the present invention. FIG. 2 is shows a configuration example of a controller 123 shown in FIG. 1.

A host computer 100, a storage subsystem 101, and a management terminal 103 are connected by using a fiber channel, and exchange of information and processing requests is performed therebetween. The host computer 100, storage subsystem 101, and management terminal 103 may be also connected by a communication network such as a LAN (Local Areas network), or may be connected by a special line.

The host computer 100 comprises an application 111 for writing information into the storage subsystem 101 and reading information therefrom, a Program 112 of Volume Pair Control Indication that issues a Volume Pair Control Indication, a Program 113 of Backup/Restore Control Indication that issues a Backup/Restore Control Indication, a memory 121 that stores the application 111, the Program 112 of Volume Pair Control Indication, and the Program 113 of Backup/Restore Control Indication, and a CPU (Central processing Unit) 122 for executing the application 111, the Program 112 of Volume Pair Control Indication, and the Program 113 of Backup/Restore Control Indication. The CPU 122 that executes the Program 112 of Volume Pair Control Indication issues a variety of commands such as a Pair Re-synchronize Indication, a Pair Split Indication, and a Pair Delete Indication. When a term "program" is used hereinbelow, it actually means performing processing with a CPU that executes the program. The Program 113 of Backup/Restore Control Indication issues a variety of commands such as a Full Backup Start Indication, an Incremental Backup Start Indication, and a Restore Start Indication.

The storage subsystem 101 comprises a controller 123, a disk unit 90, and tape library device 125. The controller 123 comprises a Backup/Restore Control Program 131 that performs Management of Backup Data, Processing of Backup, and Processing of Restore, a Disk Control Program 132 that performs Management of Disk Device, Management of Volume Pair, Processing of Host I/O, and Processing of Volume Pair, and a Tape Library Control Program 133 that performs Management of Tape, Processing of Tape Import, and Processing of Tape Export.

The tape library device 125 comprises a plurality of tapes 136, a robot 134 that transfers the tapes 136, a tape driver 135 that writes information into the tapes 136 and reads information therefrom, and a tape export/import slot 137 for introducing the tapes 136 into the storage subsystem 101 and removing the tapes therefrom.

The disk unit 90 comprises a plurality of disks. A RAID (Redundant Array of Independent (or Inexpensive) Disks) group is composed of two or more disks from among the plurality of disks. For example, a plurality of RAID groups are present in the disk unit 90. One or more logical volumes are formed based on a storage space of one RAID groups. Therefore, a plurality of logical volumes are present in the disk unit 90. A plurality of logical volumes comprise, for example, a main volume (primary logical volume) 150, a pool volume 151, and a volume 124 that is a logical volume other than the main volume 150 and the pool volume 151. The main volume 150 is a logical volume for writing data that are write objects and transmitted from the host computer 100. In order not to lose data located in the main volume 150, backup is executed for which the below-described snapshot volume 152 serves as a backup source. The pool volume 151 is a logical volume for copying a certain data block prior to update if this data block located in the main volume 150 is updated to another data block in the case where the main volume 150 and the snapshot volume 152 are have a pair split status.

Further, the storage subsystem 101 also has a virtual volume representing a logical snapshot (referred to hereinbelow as "snapshot volume") 152 of the main volume 150. The snapshot volume 152 is a volume that logically holds a data image of the main volume 150 at the point in time in which a pair of the main volume 150 and the snapshot 152 is split. The snapshot volume 152 is a logical volume and is not a volume that actually stores data. Data constituting the data image that is logically held by the snapshot volume 152 are stored in the main volume 150 and/or the pool volume 151. Therefore, in the case where backup is executed which takes the snapshot volume 152 as a backup source, the data constituting the data image that is logically held by the snapshot volume 152 are read from the main volume 150 and/or pool volume 151 and stored in the backup destination.

The disk control program 132 has a function of executing Pair Control in response to a Pair Control Indication from the host computer 100. Examples of Pair Control include Pair Creation in which a volume pair composed of the main volume 150 and the snapshot volume 152 is created, Pair Re-synchronization in which differential data copying between volumes is performed, Pair Split in which the volumes are split, and Pair Deletion in which a volume pair is deleted. The Program 132 of Disk Control comprises a Program 214 that performs the Management of the disk unit 90, a Program 215 that performs the Management of Volume Pair, a Program 216 that performs Processing of I/O such as writing/reading information from the host computer 100, and a Program 217 that performs Processing of Volume Pair.

The Backup/Restore Control Program 131 comprises a Program 211 that performs the Management of Backup Data, a Program 212 that performs the Processing of Backup, and a Program 213 that performs the Processing of Restore. The program 211 of Management of Backup Data has a function of performing the Management of Backup Data and also has a function of managing differential data between the backups in order to perform the Differential/Incremental Backup. Furthermore, the Program 131 of Backup/Restore Control has a function of performing full/differential/incremental backup of information of the snapshot volume 152 to the tape 136 and restoring the information of the tape 136 to the main volume 150. The restore destination may be the primary volume 150 or a volume (for example, the volume 124) different from the main volume 150.

The tape Library Control Program 133 comprises a Program 218 that performs the management of data 136, a Program 219 that performs the Processing of Tape Import, and a Program 220 that performs the Processing of Tape Export. The Tape Library Control Program 133 has a function of exporting and a function of importing the tapes 136 by using the tape export/import slot 137.

The management terminal 102 has a management screen 141 and has a function of performing the management of the storage subsystem 101. For example, the management terminal creates a logical volume (sometimes referred to hereinbelow as "LU") of the disk unit 90 and issues an Export/Import Indication of the tape 136. The management screen 141 is, for example, a display screen of a display device (not shown in the figure) of the management terminal 102.

The controller 123 comprises a memory (referred to hereinbelow as "main memory") 201 that stores the Backup/Restore Control Program 131, Disk Control Program 132, and Tape Library Control Program 133, a processor (for example, a CPU; referred to hereinbelow as "control processor") 202 that executes the Backup/Restore Control Program 131, Disk Control Program 132, and Tape Library Control Program 133, a cache memory 203 that stores information temporarily, and a data transfer LSI (Large Scale Integration) 204 that performs data transfer between the host computer 101, disk unit 90, and tape library device 125.

FIG. 3 shows an example of the first management information of the Management 215 of Volume Pair.

The first management information of the Management 215 of Volume Pair comprises, for example, a Pair Configuration Management Table 301, a Snapshot Bitmap Management Table 302, and a Snapshot Bitmap 303.

The Pair Configuration Management Table 301 serves for managing a status or configuration information of a volume pair created by the Processing 217 of Volume Pair. In this Table 301, a volume pair number 311, a main volume 150, a snapshot volume 313, and a status 314 are recorded for each volume pair. The volume pair number 311 is a number that uniquely identifies a volume pair. The main volume 150 is a LUN (logical unit number) of a LU (logical unit) serving as the main volume 150. The snapshot volume 313 is a LUN of the LU (virtual logical volume) serving as the snapshot volume 152. A plurality of snapshot volumes can be configured for one main volume. The status 314 is a status of a volume pair such as "Pair status", "Split status", "Transition to pair status", "Transition to split status", and "Error status". The pair status is a status in which a stationary image of the main volume is not maintained or a status in which information of the main volume 150 and information of the snapshot volume 152 are synchronized. The split status is a status in which the stationary image of the main volume 150 at a certain point in time is acquired by the snapshot volume 152 and a status in which the information of the main volume 150 and information of the snapshot volume 152 are synchronized are not synchronized due to subsequent update from the host. The transition to a pair status is a status in which a processing of transition to a pair status is performed, and the transition to a split status is a status in which a processing of transition to a split status is performed.

The Snapshot Bitmap Management Table 302 serves to manage the difference between the main volume 150 and the snapshot volume 152 for each volume pair. This difference is managed, for example, with a Snapshot Bitmap 303. In this table 302, a volume pair number 321, a snapshot bitmap number 322, a differential management size 323, and a snapshot bitmap storage position 324 are recorded for each volume pair. The volume pair number 321 indicates the volume pair to which the snapshot bitmap relates. The snapshot bitmap number 322 is a number than uniquely identifies the snapshot bitmap 303. The differential management size 323 is a size corresponding to 1 bit of the snapshot bitmap. The snapshot bitmap storage position 324 indicates in which position and in which disk in the disk unit 90 the snapshot bitmap is stored. For example, if the snapshot bitmap storage position 324 is 0:0-0:100, it means that the snapshot bitmap is stored in an LBA from 0 to 1000 of an LU with an LUN of 0. In order to increase the reference speed, the snapshot bitmap storage position 324 may be on the main memory 201 or the cache memory 203, rather than on the disk unit 90.

For example, if the differential management size 323 is 1 MB, then 331a will indicate a differential bit of the block corresponding to 1 MB from the head section of the LU, and 331b will indicate a differential bit of the block corresponding to 1 MB to 2 MB from the head section of the LU. The differential bit 331 is reversed if the information of the main volume 150 is different from the information of the snapshot volume 152 in any one corresponding block in the pair split status. For example, data stored in the blocks corresponding to 331a, 331b, 331e are identical for the main volume 150 and the snapshot volume 152, but data stored in the blocks corresponding to 331c, 331d are different. The size of the snapshot bitmap is determined by the capacity of the LU and the differential management size 323. For example, if the capacity of the LU is 100 MB and the differential management size 323 is 1 MB, then the size of one snapshot bitmap will be 100 bit.

FIG. 4 shows an example of second management information of the Management 215 of Volume Pair.

The second management information of the Management 215 of Volume Pair includes, for example, a Snapshot Management Table 304 and Pool Configuration Management Table 305.

A bitmap number 341 that is an identifier of the Snapshot Bitmap 303, a bit number 342 that is an identifier of each bit in the Snapshot Bitmap 303, and a data storage position 343 that indicates information relating to a position in which data blocks corresponding to each bit are stored are present in the Snapshot Management Table 304. The data storage position 343 is represented, for example, by a combination of LBA and LUN of the logical volume. In the case where the main volume 150 and the snapshot volume 152 initially formed a pair, because the main volume 150 has not yet been updated, all the data blocks constituting a data image (snapshot image) represented by the snapshot volume 152 are in the main volume 150. Therefore, the initial value of the data storage position 343 becomes the LUN and LBA of the main volume 150. If updates are present in the main volume 150 and the pre-update data that are present in the update position were copied into the pool volume 151, the data storage position 343 corresponding to the bit corresponding to this update position will be the LUN and LBA of the pool volume 151 of copy destination. By referring to the Snapshot Management Table 304 or the above-described first management information, it is possible to establish the volume pair in which the difference is present, the location in the volume pair in which the difference is present, and the pool volume 151 in which the data block of the difference is stored, and the storage location.

The Pool Configuration Management Table 305 includes a pool volume 351. The pool volume 351 is one or more LUN corresponding to respective one or more pool volumes 151.

FIG. 5 shows an example of third management information of Management 215 of Volume Pair.

The third management information of Management 215 of Volume Pair includes, for example, a Backup Bitmap Management Table 306 and a backup bitmap 307.

The Backup Bitmap Management Table 306 serves to manage the difference between the snapshot volume 152 at the time of a pair split status and the snapshot volume 152 at the time of the next pair split status for each volume pair. Furthermore, from another standpoint, this table can be also said to serve for managing the updated portion of the main volume from a point in time of stationary image acquisition of the main volume to a point of time of the next stationary image acquisition. This difference is managed, for example, with the backup bitmap 307. A volume pair number 361, a backup bitmap number. 362, a differential management size 363, and a backup bitmap storage position 364 are recorded for each volume pair in the table 306. The volume pair number 361 indicates a volume pair to which the backup bitmap relates. The backup bitmap number 362 is a number that uniquely identifies the backup bitmap 307. The differential management size 363 indicates the size to which 1 bit of the backup bitmap corresponds. The backup bitmap storage position 364 indicates a disk in the disk unit 90 in which the backup bitmap is stored and the position on the disk in which the backup bitmap is stored. For example, if the backup bitmap storage position 364 is 10:0-10:1000, it indicates that the backup bitmap is stored in LBA from 0 to 1000 of the LU with a LUN of 10. In order to increase the reference speed, the backup bitmap storage position 364 may be on the main memory 201 or the cache memory 203, rather than on the disk unit 90.

For example, if the differential management size 363 is 1 MB, then 371*a* will indicate a differential bit of the block corresponding to 1 MB from the head section of the LU, and 371*b* will indicate a differential bit of the block corresponding to 1 MB to 2 MB from the head section of the LU. The differential bit 371 is reset in each pair split status (for example, all the differential bits 371 are set to 0) and reversed if the information of any one corresponding block in the snapshot volume 152 differs from the time of a pair split status to the time of the next pair split status. From another standpoint, the differential bit is reversed if the main volume is updated from a point in time of stationary image acquisition of the main volume to the next point of time of stationary image acquisition. For example, for blocks corresponding to 371*a*, 371*b*, 371*e* no difference occurred from the time of a pair split status to the time of the next pair split status, but a difference is demonstrated in the blocks corresponding to 371*c*, 371*d*. The size of the backup bitmap is determined by the capacity of the LU and the differential management size 363. For example, if the capacity of the LU is 100 MB and the differential management size 363 is 1 MB, then the size of one backup bitmap will be 100 bit.

Figure 6:
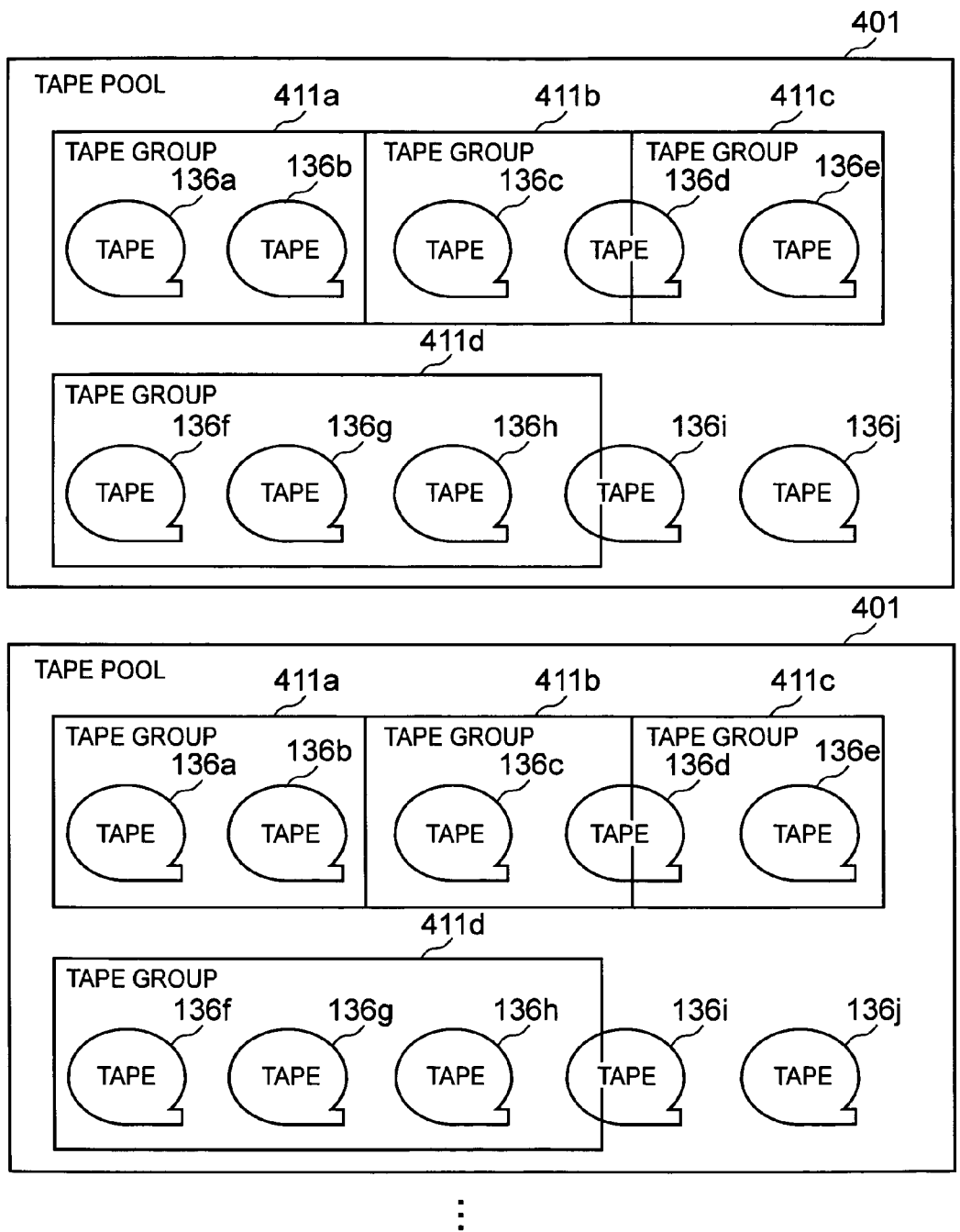
FIG. 6 shows an example of a logical image of a tape pool managed by the Management of tape media.

FIG. 6 shows a logical image example of a tape pool 401 managed by tape management 218.

The tape pool 401 comprises a plurality of tapes 136. A tape group 411 is configured by grouping some of the tapes 136. There are also tapes, such as a tape 136*j*, in the tape group 411 that are hot grouped. For example, a tape group 411*a* is configured of a tape 136*a* and a tape 136*b*. It is also possible to use half a tape in a tape group 411*b* and the remaining half in a tape group 411*c*, tape 136*d* being an example of such a tape. Further, the tape group 411 is not necessarily configured of two or more tapes 136. For example, one tape 136 or part of the tape 136 may be taken as the tape group 411. In FIG. 6, a plurality of tape pools 401 are shown and all the tape pools 401 have the same internal configuration, but it goes without saying that the configurations may differ between the tape pools 401.

The tape pool 401 is created in units of tape library devices 125 by using the management terminal 102. The tape pool 401 is configured of tapes 136 of the tape library devices 125. The creation of the tape pool 401 may be also performed from the host computer 100. A plurality of tape pools 401 may be created inside the tape library device 125, or the tape pool may be created over a plurality of tape library devices 125. In the Processing of Backup, the tape pool 401 is designated as a backup destination, and backup is successively performed into unused tapes. The tape used for backup may be a tape where absolutely no data have been recorded, that is, an absolutely unused tape. For example, data may be overwritten on a tape where unnecessary data have been recorded, or additional recording may be continuously made on a tape where some data have been recorded. The tape group 411 can be obtained by grouping tapes that were used for backup. For this purpose, the backup unit becomes the tape group 411, and the Management of Backup Data is performed in the units of tape groups. The tape group 411 may be created by using the management terminal 102 or the like prior to backup and the tape group 411 may be designated as a backup destination.

The created tape group 411 has a function of adding a tape that does not constituted the tape group 411, such as the tape 136*j*, as necessary. For example, the tape group 411*a* that has been created in advance is designated as a backup destination, but when data could not be fully inputted into the tape 136*a* and tape 136*b*, the remaining data are stored in the tape 136*j*, and the tape group 411*a* can be configured of the tapes 136*a*, 136*b*, 136*j*.

A tape area (for example, one or a plurality of tapes 136 in their entirety, or a partial recording area) for configuring the tape group 411 may be reserved in advance from the tape pool 401 based on the size of data that are the backup object when backup is performed and the size of management information (for example, information including the restore necessary information, which is the information that has to be restored) that will be stored together with the data, and the backup may be performed in this reserved tape area. The tape group 411 may be configured upon completion of the backup.

As shown in FIG. 6, a plurality of tape groups 411 are connected to one tape pool 401, but when a plurality of backups are performed from the same snapshot volume 152, data with a later backup date and time may be backed up into a location on the downstream side of those with the earlier backup date and time. For example, when a differential backup is performed after a full backup, the differential backup bay be performed from a location on the downstream side (for example immediately after) of the tape group corresponding to the full backup. Further, for example, when an incremental backup is performed after the differential backup, the incremental backup may be performed from a location on the downstream side (for example immediately after) of the tape group corresponding to the differential backup. As a result, the tape can be prevented from being frequently wound forward and rewound.

Figure 7:
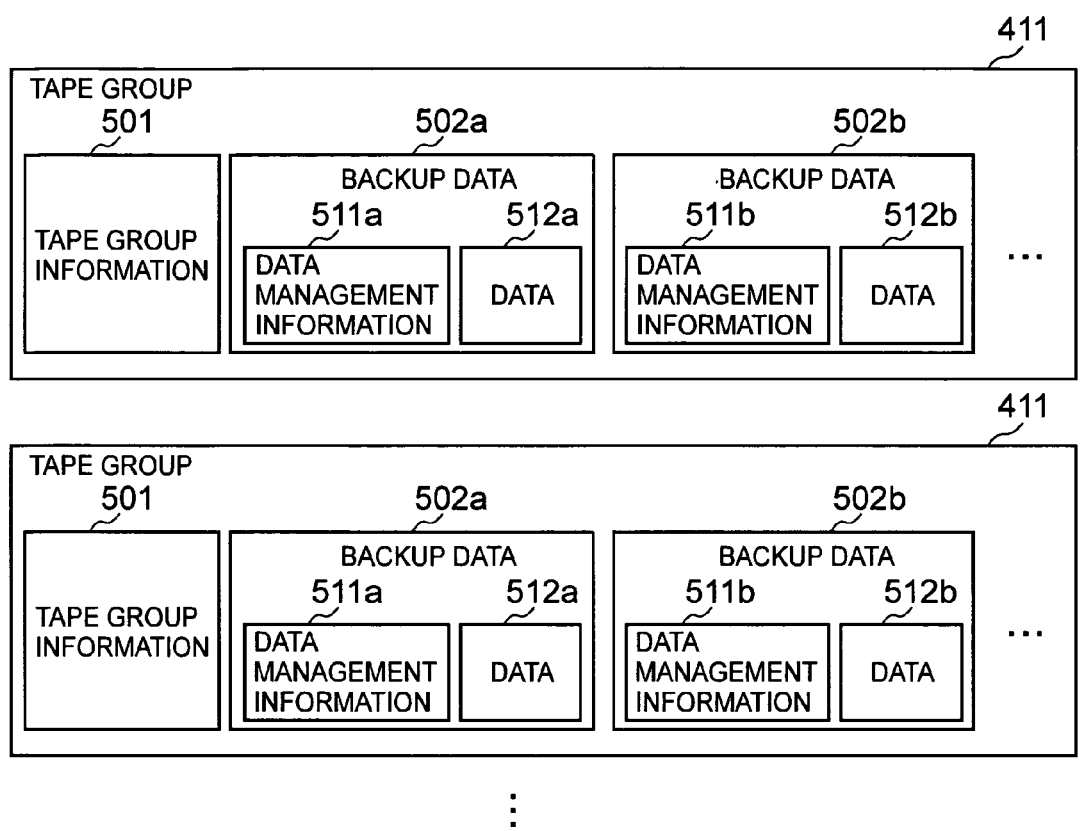
FIG. 7 shows an example of storage information a tape group.

FIG. 7 shows an example of storage information of the tape group 411.

The tape group 411 is configured of tape group information 501 and backup data 502. The backup data 502 are configured of data management information 511 and data 512. The tape group information 501 is management information of the tape group 411 that in necessary in Processing of Restore.

The data management information 511 is management information of a backup source LU (snapshot volume 152) that is necessary in Processing of Restore. The data 512 are user data (a set of at least one data block to be used by the application 111 of the host computer 100) of the backup source LU. The tape group information 501 and the data management information 511 will be explained below with reference to FIGS. 10, 11, 12.

FIG. 8 shows an example of management information of the Management 218 of tape media.

A Tape Pool Management Table 601, a Tape Group Management Table 602, and a Data Media Management Table 603 are included in the management information.

The Tape Pool Management Table 601 is a table for managing the tape pool 401. A tape pool number 611, a tape pool configuration tape number 612, and a storage tape group number 613 are recorded in the Table 601. The tape pool number 611 is a number for uniquely identifying the tape group 401. The tape pool configuration tape number 612 is a number of the tape constituting the tape pool 401. The tape numbers may be recorded in the order of 101, 102, 103, or they may be recorded as 111 to 131 to save the table capacity, thereby indicating that the tape group is configured of tapes with numbers from the tape number 111 to the tape number 131. A combination of these recording methods may be also used. The storage tape group number 613 is a number of the tape group 411 created in the tape pool 401. For example, the tape pool 401 with a tape pool number 1 is configured of tapes 136 with the tape numbers 101, 102, 103, and tape groups 411 with the tape group numbers 11, 12, 13 are created.

The Tape Group Management Table 602 is a table for managing the tape group 411. This table 602 stores a tape group number 621, a tape group status 622, a tape group configuration tape 623, a backup source LUN 624, a backup data type 625, a tape group number 626 necessary for the restore, affiliation tape pool number 627, and recording date and time 628. The tape group number 621 is a number for uniquely identifying the tape group 411. The tape group status 622 shows a status of the tape group, such as Normal, In Backup, in Restore, and Error. The tape group configuration tape 623 is information (position information) representing the position of the tape group. This position information is represented, for example, by a combination of the tape number 631 and the object address. Thus, 101:10-900 represents 900 from the address 10 of the tape number 101. The backup source LUN 624 shows a LUN of the backup source LU. The backup data type 625 shows whether the data 512 within the backup data 502 are stored by any backup from among the full, differential, and incremental backups. The tape group number 626 that is necessary for the restore indicates the tape group number 621 that will be necessary during the restore. The affiliation tape pool number 627 indicates the tape pool number 611 to which the tape group 411 belongs. The recording date and time 628 indicate the date and time at which the backup is started. The recording date and time 628 may be a record of the date and time at which the backup is completed or a record of the date and time designated during the Processing of Backup.

For example, it will be assumed that the full backup, differential backup, and incremental backup are successively implemented at 22:00:00 of Apr. 4, 2006, 22:00:00 of Apr. 11, 2006, and 22:00:00 of Apr. 12, 2006, respectively. The tape group 411 with a tape group number 11 has recorded therein the data in which the LU with the LUN 2001 and 2002 were full backed up at 22:00:00 of Apr. 4, 2006 to the tape number 101, 102, 103. The tape group 411 with a tape group number 12 has recorded therein the data in which the LU with the LUN 2001 and 2002 were differential backed up at 22:00:00 of Apr. 11, 2006 to the tape number 104, 105. The tape group 411 with a tape group number 13 has recorded therein the data in which the LU with the LUN 2001 and 2002 were incremental backed up at 22:00:00 of Apr. 12, 2006 to the tape number 106. In order to perform the Processing of Restore from the full backup data 502 of the tape group 411 of the tape group number 11, the tape group 411 of the tape group number 11 is sufficient. Therefore, nothing is recorded in the tape group number 626 that is necessary for the restore. In order to preform the Processing of Restore from the differential backup data 502 of the tape group 411 of the tape group number 12, the tape group 411 of the tape group number 11 is also necessary. Therefore, 11 is recorded in the tape group number 626 that is necessary for the restore. In order to preform the Processing of Restore from the incremental backup data 502 of the tape group 411 of the tape group number 13, the tape group 411 of the tape group numbers 11, 12 is also necessary. Therefore, 11, 12 are recorded in the tape group number 626 that is necessary for the restore. In this case, in the Processing of Restore, the Processing of Copy (copying from the tape to the volume of restore destination) is performed in the sequence of tape group numbers of 11, 12, 13. Alternatively, the tape group number 621 of the tape group 411 where the preceding backup data 502 have been recorded is recorded in the tape group number 626 that is necessary for the restore and, for example, once a restore request designating the tape group 411 of the tape group number 13 arrives, the necessity of the advanced Processing of Copy of the tape group 411 of the tape group number 12 is established by referring to the tape group number 626 that is necessary to restore the tape group number 13, then the necessity of the advanced Processing of Copy of the tape group 411 of the tape group number 11 is established by referring to the tape group number 626 that is necessary to restore the tape group number 12, then the tape group number 621 is found to be the full backup data 502 by referring to the tape group number 626 that is necessary to restore the tape group number 11, and the Processing of Copy of the tape group 411 is performed in the sequence of tape group numbers 11, 12, 13 in the Processing of Restore.

The Tape Media Management Table 603 is a table for managing the tape 136. A tape number 631, a tape type 632, a one block size 633, a tape capacity 634, a used capacity 635, a tape status 636, an affiliation tape pool number 637, and an affiliation tape group number 638 are recorded in this Table 603. The tape number 631 is a number for uniquely identifying the tape 136. The tape type 632 indicates the tape standard such as LTO3 or LTO4. The one block size 633 shows the capacity of one block of the tape 136. The tape capacity 634 shows the capacity of the tape 136. The used capacity 635 indicates the volume of the backup data 502 that have been recorded in the tape 136. The tape status 636 shows the status of the tape 136, such as "Normal", "Not used", and "Error". For example, "Normal" represents the status in which the backup data 502 have been normally recorded, "Not used" represents the status in which the backup data 502 have not been recorded, and "Error" represents the status in which the tape 136 cannot be used due to media failure or the like. The affiliation tape pool number 637 shows the tape pool number 611 to which the tape 136 belongs. The affiliation tape group number 638 shows the tape group number 621 to which the tape 136 belongs. For example, the tape 136 of the tape number 101 has recorded therein the backup data 502 and belongs to the tape pool 401 of the tape pool number 1 and the tape group 411 of the tape group number 11. The tape 136 of the tape number 111 has no backup data 502 recorded therein and belongs to the tape pool 401 of the tape pool number 4.

FIG. 9 shows an example of management information of the Management 211 of Backup data.

This management information includes a Backup Data Management Table 701, a Differential/Incremental Bitmap Management Table 702, and Differential/Incremental Bitmap 703.

The Backup Data Management Table 701 is a table for managing the backup data 502. A backup data number 711, a backup source LUN 712, a backup destination tape group number 713, a backup data status 714, a backup data type 715, and backup acquisition date and time 716 are recorded in the table 701. The backup data number 711 is the number for uniquely identifying the backup data 502. The backup source LUN 712 shows the LUN of the backup source LU. The backup destination tape group number 713 shows the tape group number 621 where the backup data 502 have been recorded. The backup data status 714 shows the status of the backup data such as "Normal", "Restore impossible", and "Error". For example, the "Normal" represents a status in which the backup data 502 have been recorded and can be restored. The "Restore impossible" represents the status in which the backup data 502 have been lost and cannot be restored, but the tape 136 can be used. The "Error" represents the status in which the tape 136 cannot be used due to a tape media failure. The backup data type 715 shows whether the backup data 502 are the full backup data, differential backup data, or incremental backup data. The backup acquisition date and time 716 shows the data and time at which the backup was started. The backup acquisition date and time 716 may be a record of the date and time the backup is completed or a record of the date and time designated during the Processing of Backup.

The Differential/Incremental Bitmap Management Table 702 and the Differential/Incremental Bitmap 703 serve to manage the differential/incremental data of the tape library device 125 and snapshot volume 152 after the full backup to perform the differential/incremental backup. The differential/incremental data from the full backup are managed with the differential/incremental bitmap for each backup source LU. It goes without saying, that the differential/incremental data may be managed with another means, for example, a differential/incremental data list, rather than with the bitmap. For example, in the full/differential/incremental backup such that a full backup is performed at the beginning of each month, an incremental backup is performed at weekdays, and a differential backup is performed at Sundays, the differential backup and incremental backup cannot be combined with one differential bitmap. Therefore, two bitmaps, one for the differential backup and one for the incremental backup, are prepared for each backup source LU.

A LUN 721, a differential/incremental bitmap number 722, a backup type 723, a differential management size 724, and a differential/incremental bitmap storage position 725 are recorded in the Differential/Incremental Bitmap Management Table 702. The LUN 721 shows a LUN of the LU (in other words, the snapshot volume 152 that is the object of Management of Differential/Incremental Data) where the management of differential/incremental data is conducted. The differential/incremental bitmap number 722 is the number that uniquely identifies the differential/incremental bitmap 703. The backup type 723 shows whether the corresponding differential/incremental bitmap is a bitmap for differential backup (differential bitmap) or a bitmap for incremental backup (incremental bitmap). The differential management size 724 shows the size corresponding to 1 bit of the differential/incremental bitmap. The differential/incremental bitmap storage position 725 shows where the differential/incremental bitmap is stored in the disk unit 90. For example, if the differential/incremental bitmap storage position 725 is 5:0-5:1000, it shows that data are stored in the LBA 0 to 1000 of the LU with a LUN of 5. The storage position of the differential/incremental bitmap may be stored on the main memory 201 or cache memory 203, rather than on the disk unit 90, to increase the reference speed.

In the differential/incremental bitmap 703, for example, if the differential management size 724 is 1 MB, then 731*a* will indicate a differential bit of the block corresponding to 1 MB from the head section of the LU, and 731*b* will indicate a differential bit of the block corresponding to 2 MB from the head section 1 MB of the LU. The differential bit is reversed if any one of the corresponding blocks is updated. For example, 731*a*, 731*b*, 731*e* were not updated, but 731*c*, 731*d* were updated, and during the differential/incremental backup, the blocks corresponding to 731*c*, 731*d* become the backup objects. At the end of the full backup, the differential bitmap and the incremental bitmap are reset. At the end of the differential backup and incremental backup, only the incremental bitmap is reset. The size of the differential/incremental bitmap is determined by the capacity of the LU and the differential management size 724. For example, if the capacity of the LU is 100 MB and the differential management size 724 is 1 MB, then the size of one differential/incremental bitmap 703 will be 100 bit.

Figure 11:
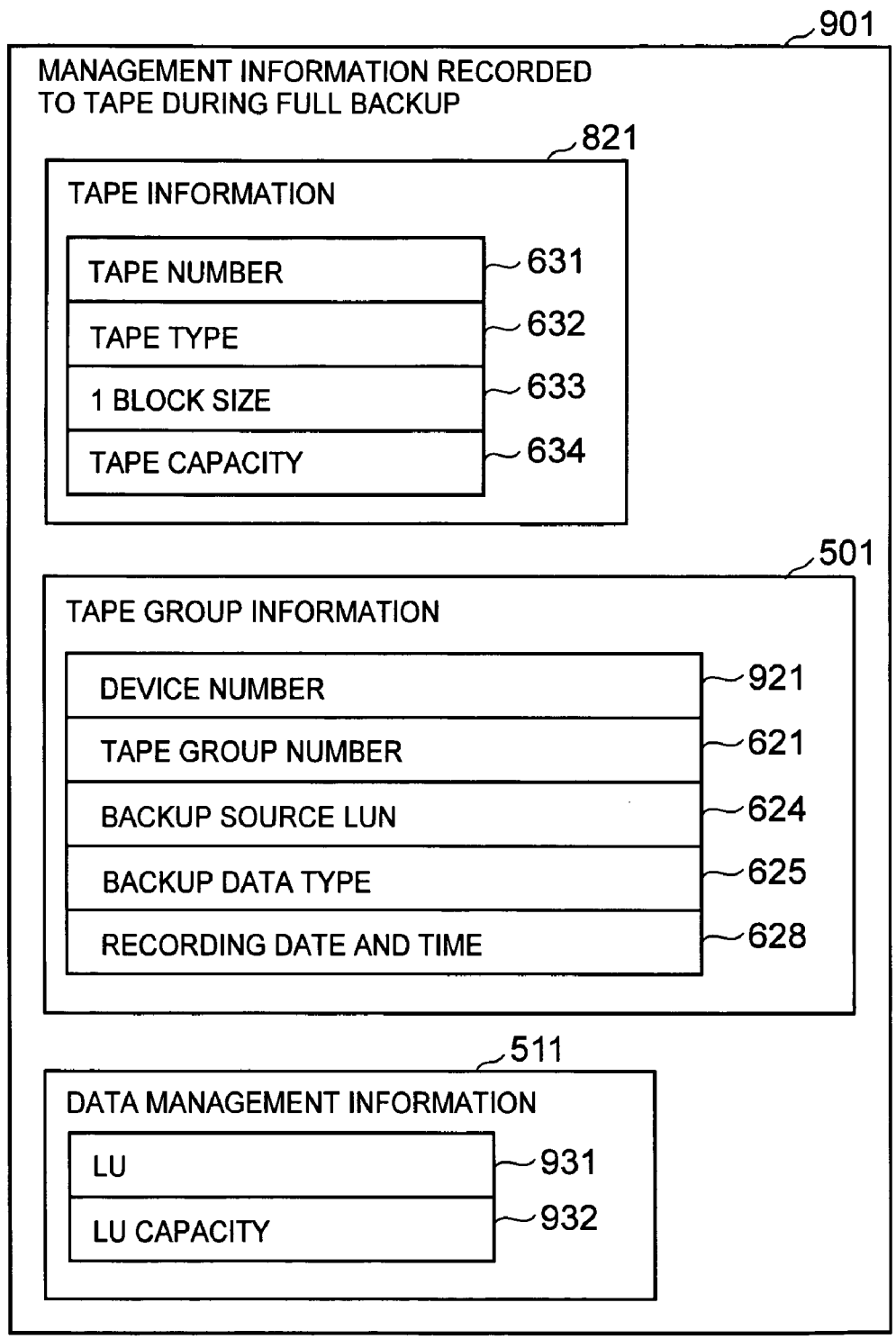
FIG. 11 shows an example of management information recorded to a tape during full backup.
Figure 12:
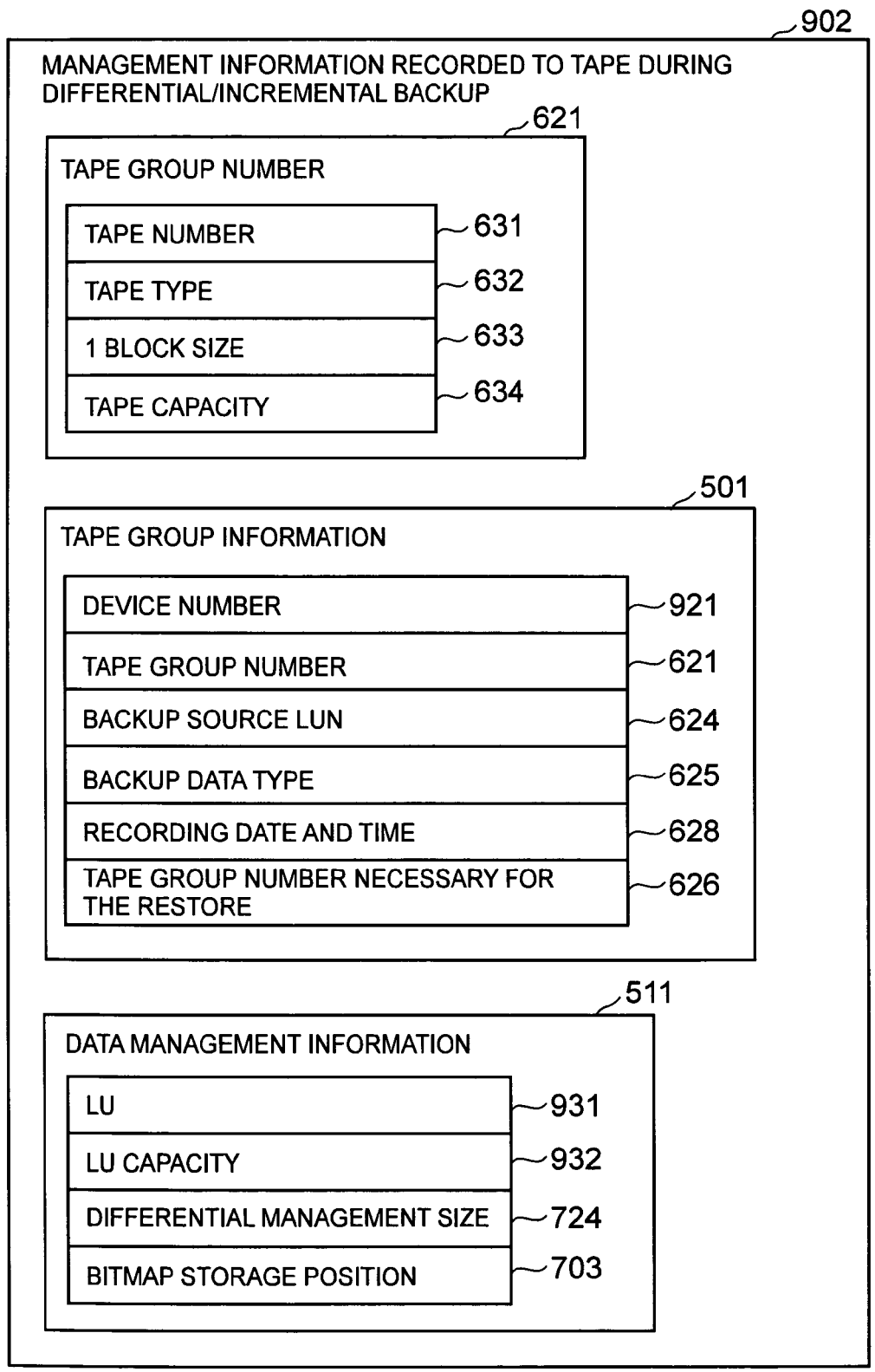
FIG. 12 shows an example of management information recorded to a tape during differential/incremental backup.

FIG. 10 shows an example of recording format of the tape 136. FIG. 11 shows an example of management information that is recorded to a tape during full backup. FIG. 12 shows an example of management information that is recorded to a tape during differential/incremental backup. Management information recorded to a tape during backup is, for example, information that is recorded to the main memory 201.

A plurality of blocks 811 and a plurality of EOD (End Of Data) 812 are recorded to the tape 136. Block numbers that identify each block 811 are assigned to blocks 811, and the block number assumes values that increase by one, i.e., as 1, 2, 3, . . . from the beginning (BOT (Beginning Of Tape) side) to the end (EOT (End Of Tape) side) of the tape 136. If a block 811 is recorded to the tape 136 immediately after the tape 136 has been mounted to the tape drive 135, then the block 811 is recorded in the location with the block number 1, and if the next block 811 is recorded, then the block 811 is recorded in the location with the block number 2. If the blocks 811 are thereafter recorded, then the blocks 811 are recorded successively toward the EOT in the location with the block number 3, in the location with the block number 4, etc. Further, if the block 811 is reproduced immediately after the tape 136 has been rewound, the block 811 with the block number 1 is reproduced, and if the block 811 is further reproduced, then the block 811 with the block number 2 is reproduced. In other words, the blocks 811 are reproduced successively toward the EOT. Further, the blocks 811 are reproduced until the block 811 that was last to be recorded is reproduced.

The tape information 821 is recorded in the block number 1, which is the head block of the tape 136A. The tape information 821 may be recorded in a plurality of blocks with block number 1, 2. During the full backup and during the differential/incremental backup, the tape number 631, tape type 632, one block size 633, and tape capacity 634 are recorded as the tape information 821 by referring to the Tape Media Management Table 603.

The tape group information 501 is recorded in the block that is next in number to the block where the tape information 821 has been recorded. The tape group information 501 may be recorded in a plurality of blocks. In the case of the full backup, a device number 921, the tape group number 621, the backup source LUN 624, the backup data type 625, and the recording date and time 628 are recorded as the tape group information 501 by referring to the Tape Group Management Table 602. In the case of the incremental/differential backup, the device number 921, tape group number 621, backup source LUN 624, backup data type 625, recording date and time 628, and the tape group number 626 necessary for the restore are recorded. The device number 921 is the number for uniquely identifying the storage subsystem 101 where the backup was performed.

The data management information 511 is recorded in the block that is next in number to the block where the tape group information 501 has been recorded. The data management information 511 may be recorded in a plurality of blocks. In the case of the full backup, a LUN 931 and a LU capacity 932 are recorded as the data management information 511, and in the case of the incremental/differential backup, the LUN 931, LU capacity 932, differential management size 724, and differential/incremental bitmap 703 are recorded by referring to the Incremental/Differential Bitmap Management Table 702. The LUN 931 is the LUN of the backup source LU. The LU capacity 932 is the LU capacity of the backup source LU. In the case of incremental backup, only the incremental bitmap (in other words, only one per each LU) may be recorded to the tape, without recording the differential bitmap. Because whether to perform the differential backup or the incremental backup can be determined by an indication from the host computer 100, a bit that is the object of the differential backup is recorded to the differential bitmap, and a bit that is the object of the incremental backup is recorded to the incremental bitmap.

Data 512 of the backup source LU are recorded from the block that is next in number to the block where the data management information 511 has been recorded. In the Processing of Full Backup, all the data 512 of the backup source LU are recorded, and in the Processing of Differential/Incremental Backup, only the differential/incremental data 512 are recorded.

Once the recording of full/differential/incremental data 512 in the backup source LU has been completed, an EOD 812 is recorded and recording to the tape in the Processing of Backup is completed. When other backup data 502 is recorded to the same tape 136A, the recording to the tape is performed from the block that is next in number to the EOD 812. Further, when the backup data 502 are recorded to the tapes 136A, 136B, data information 821 is recorded to the head block of the tape 136B, and the continuation of the information recorded to the very laser block of the tape 136A is recorded to the block that is next in number thereto.

The outline of Processing of Differential Backup, Processing of Incremental Backup, Processing of Differential Restore, and Processing of Incremental Restore that are preformed in the present embodiment will be schematically explained below.

<<Outline of Processing of Differential Backup>>

Figure 23:
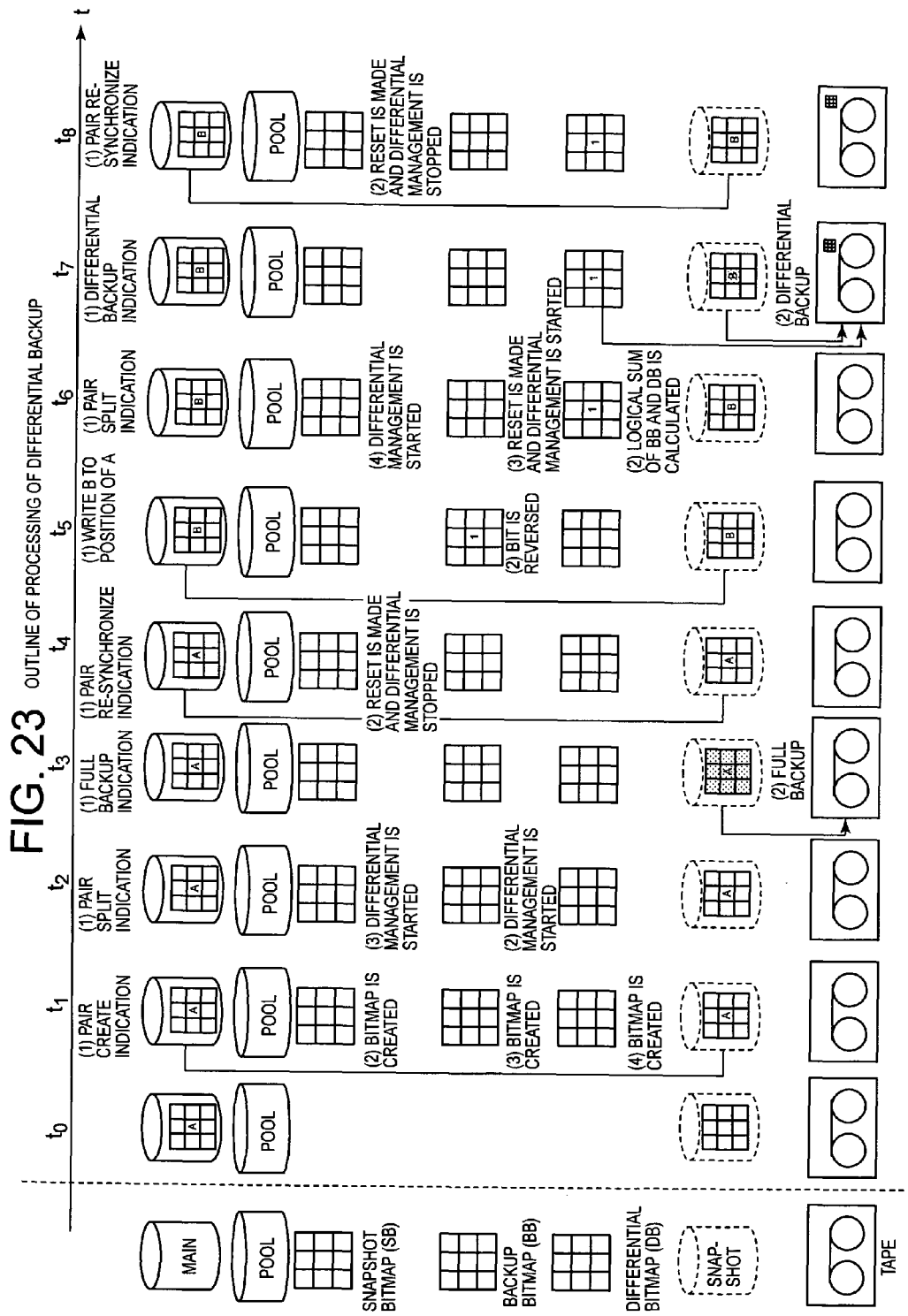
FIG. 23 shows part of the outline of the Processing of Differential Restore.
Figure 24:
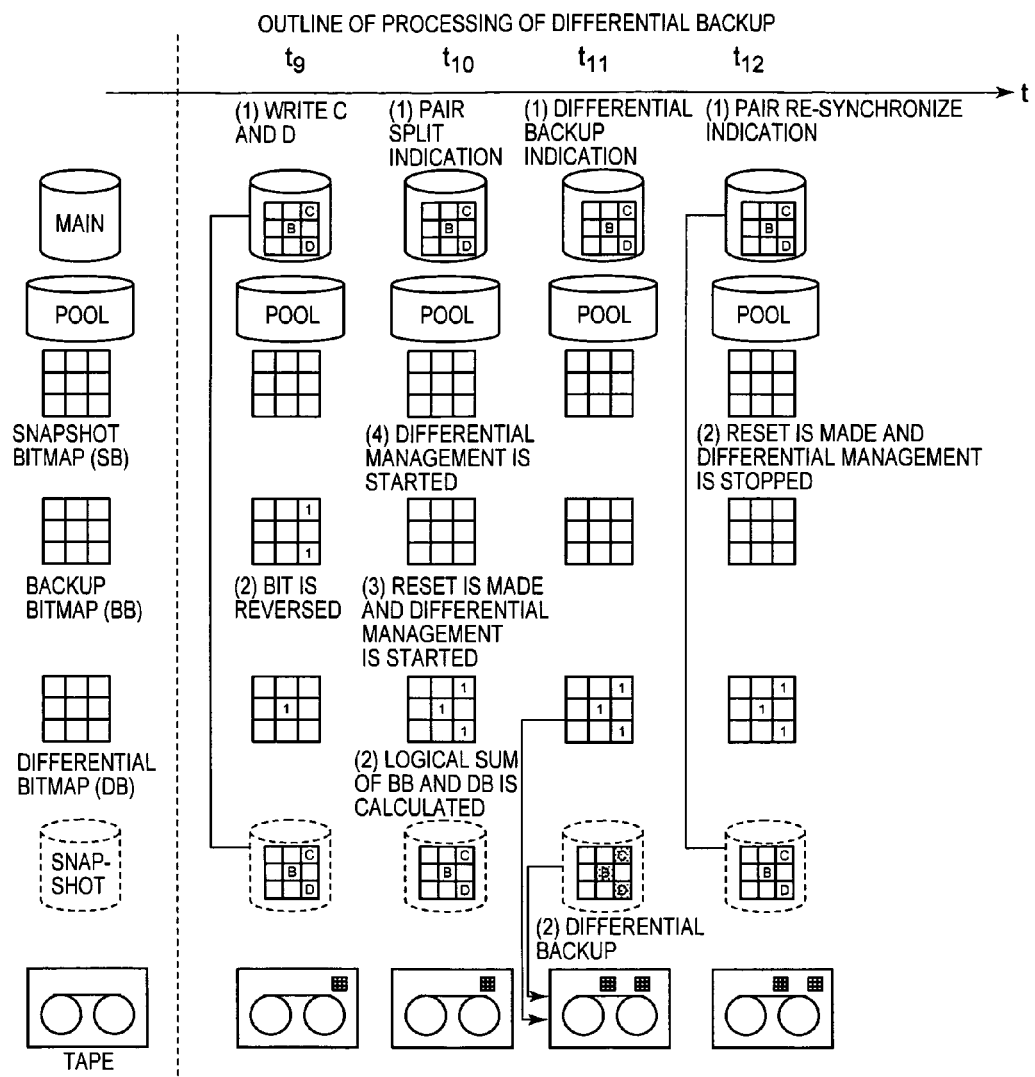
FIG. 24 shows the remainder of the outline of the Processing of Differential Restore.

The Processing of Differential Backup will be outlined below with reference to a combination of FIG. 23 and FIG. 24 (because the Processing of Full Backup is performed before the Processing of Differential Backup, the Processing of Full Backup is also shown in the figures). In the explanation below, the main volume 150 that will be the object of explanation will be called "object main volume", a snapshot volume 303 corresponding to the object main volume will be called "SB", a snapshot volume 152 constituting a pair with the object main volume will be called "object snapshot volume", a backup bitmap 307 corresponding to the object snapshot volume will be called "BB", and a differential bitmap 703 corresponding to the object snapshot volume will be called "DB". Further, in the figure the object main volume and the object snapshot volume are represented by a block group of 3 blocks in the vertical direction by 3 blocks in the horizontal direction. Likewise, each bitmap is represented by 3 bit in the vertical direction by 3 bit in the horizontal direction. Each block group and each bitmap are assigned with numbers from 1 to 9 from the upper left corner to the lower right corner and specified by these numbers. Thus, the correspondence relationship between the numbers of blocks and bits in each block group and each bitmap is assumed to be:

| 1 | 2 | 3 |
|---|---|---|
| 4 | 5 | 6 |
| 7 | 8 | 9 |

When a specific block and bit are indicated, they are represented by "block: number", "bit: number" by using the assigned numbers. The same approach is followed in the case of explaining the outline of the incremental backup with reference to FIG. 25 and FIG. 26. However, in the incremental backup, the incremental bitmap 703 corresponding to the object snapshot volume is used instead of the differential bitmap 703 corresponding to the object snapshot volume. The incremental bitmap 703 is called "IB".

Full backup relating to the object snapshot volume is executed, and the differential data in the object snapshot volume that were generated thereafter are backed up in the differential backup.

For example, at a time t0, data A is stored in block: 5 within the object main volume.

In the case where the Disk Control Program 132 receives a Pair Create Indication that designates the object main volume from the host computer 100 at a time t1, SM, BB, and DB corresponding to the object main volume or object snapshot volume are created. Further, the LBA corresponding to the block: 5 and LUN of the object main volume is recorded as the data storage position 343 of the Snapshot Management Table 304 corresponding to the bit: 5 of SB. As a result, the data A in the block: 5 within the object main volume is logically copied to the block: 5 within the object snapshot volume. Actually, the data A remains present in the block: 5 within the object main volume.

In the case where the Disk Control Program 132 receives a Pair Split Indication that designates the object main volume from the host computer 100 at a time t2, the differential management using the BB and SB is started.

When the Backup/Restore Control Program 131 receives a Full Backup Indication that designates the object snapshot volume from the host computer 100 at a time t3, all the data within the object snapshot volume are backed up to a tape. Here, because the data located within the object main volume are not copied to the pool volume 151, all the data are backed up from the object main volume to the tape. If a certain block of the object main volume is updated between the time t2 and the time t3, the data preceding the update are copied from this block to the pool volume 151 and then the block is updated. In this case, at the time t3, the data that were present in the object main volume at the time t2 are read from both the object main volume and the pool volume 151 and written to the tape. Further, when all the blocks of the object main volume are updated between the time t2 and the time t3, the data that were present in the object main volume at the time t2 are read only from the pool volume 151 at the time t3 and written to the tape.

In the case where the Disk. Control Program 132 receives a Pair Re-synchronize Indication that designates the object main volume from the host computer 100 at a time t4, the status 314 of a volume pair of the object main volume and the object snapshot volume (referred to hereinbelow as "object pair") becomes a pair status, the SB is reset, and the differential management using the SB is stopped. As a result, the management of the data image of the object main volume at the time t2 is annulled.

At a time t5, data B are written to the block: 5 within the object main volume. Because the object pair is in a pair status, the data B are logically copied into the block: 5 within the object snapshot volume. Because the BB is a bitmap that manages the variation of the object snapshot volume from a certain pair split time to the next pair split time, the bit: 5 of the BB is reversed. From another standpoint, it can be also said that the bit: 5 of the BB is reversed in order to manage the update to the main volume from a point in time of stationary image acquisition of the main volume to the point in time of the next stationary image acquisition.

In the case where the Disk Control Program 132 receives a Pair Split Indication (second and subsequent Pair Split Indications) that designates the object main volume from the host computer 100 at a time t6, a logical sum of BB and DB is calculated and the calculation result is overwritten on the DB. In other words, the DB is updated. The BB is reset (the reversed bit is made the non-reversed bit), and the differential management using the BB is started. The differential management using the SB is also started.

In the case where the Backup/Restore Control Program 131 receives a Differential Backup Indication (second and subsequent Pair Split Indications) that designates the object snapshot volume from the host computer 100 at a time t7, data are read from the block in the object snapshot volume that corresponds to the reversed bit in the DB after the update at the time t6, and these data and the DB after the update at the time t6 are stored on the tape.

In the case where the Disk Control Program 132 receives a Pair Re-synchronize Indication that designates the object main volume from the host computer 100 at a time t8, the status 314 of the object pair becomes a pair status, the SB is reset, and the differential management using the SB is stopped. As a result, the management of the data image of the object main volume at the time t6 is annulled.

At a time t9, data C are written to the block: 3 within the object main volume and data D are written into the block 9. Because the object pair is in a pair status, the data C are logically copied into the block: 3 within the object snapshot volume, and the data D are logically copied to the block: 9. Because the BB is a bitmap that manages the variation of the object snapshot volume from a certain pair split time to the next pair split time, the bit: 3 and the bit: 9 of the BB are reversed. From another standpoint, it can be also said that the bit: 3 and the bit: 9 of the BB are reversed in order to manage the update to the main volume from a point in time of stationary image acquisition of the main volume to the point in time of the next stationary image acquisition.

In the case where the Disk Control Program 132 receives a Pair Split Indication (second and subsequent Pair Split Indications) that designates the object main volume from the host computer 100 at a time t10, a logical sum of BB and DB is calculated and the calculation result is overwritten on the DB. In other words, the DB is updated. In the DB after the update, the bit: 5 is reversed in the same manner as at the time t6 and, in addition, the bit: 3 and the bit: 9 corresponding respectively to the block: 3 and the block: 9 that are newly updated at the time t9 are also reversed. The BB is reset (the reversed bit is made the non-reversed bit), and the differential management using the BB is started. The differential management using the SB is also started.

In the case where the Backup/Restore Control Program 131 receives a Differential Backup Indication that designates the object snapshot volume from the host computer 100 at a time t11, data are read from the block (here, a block within the object main volume) in the object snapshot volume that corresponds to the reversed bit in the DB after the update at the time t10, and these data and the DB after the update at the time t9 are stored on the tape.

In the case where the Disk Control Program 132 receives a Pair Re-synchronize Indication that designates the object main volume from the host computer 100 at a time t12, the status 314 of the object pair becomes a pair status, the SB is reset, and the differential management using the SB is stopped. As a result, the management of the data image of the object main volume at the time t10 is annulled.

Data update of the object main volume, reception of the Pair Split Indication, reception of the Differential Backup Indication, and reception of the Pair Re-synchronize indication are thereafter repeated. The Pair Split Indication can be replaced with a Snapshot Acquisition (Stationary Image Acquisition) Indication, and the pair Re-synchronize Indication can be replaced with a Snapshot Cancellation (Stationary Image Cancellation) Indication. In this case, too, only the necessary area can be backed up by similarly managing the portion of the main volume that was updated from a stationary image acquisition time to the next stationary image acquisition time. The same applies to the subsequent processing. Further, the Pair Split Indication and the Differential Backup Indication may be combined into one indication.

<<Outline of Processing of Incremental Backup>>

Figure 25:
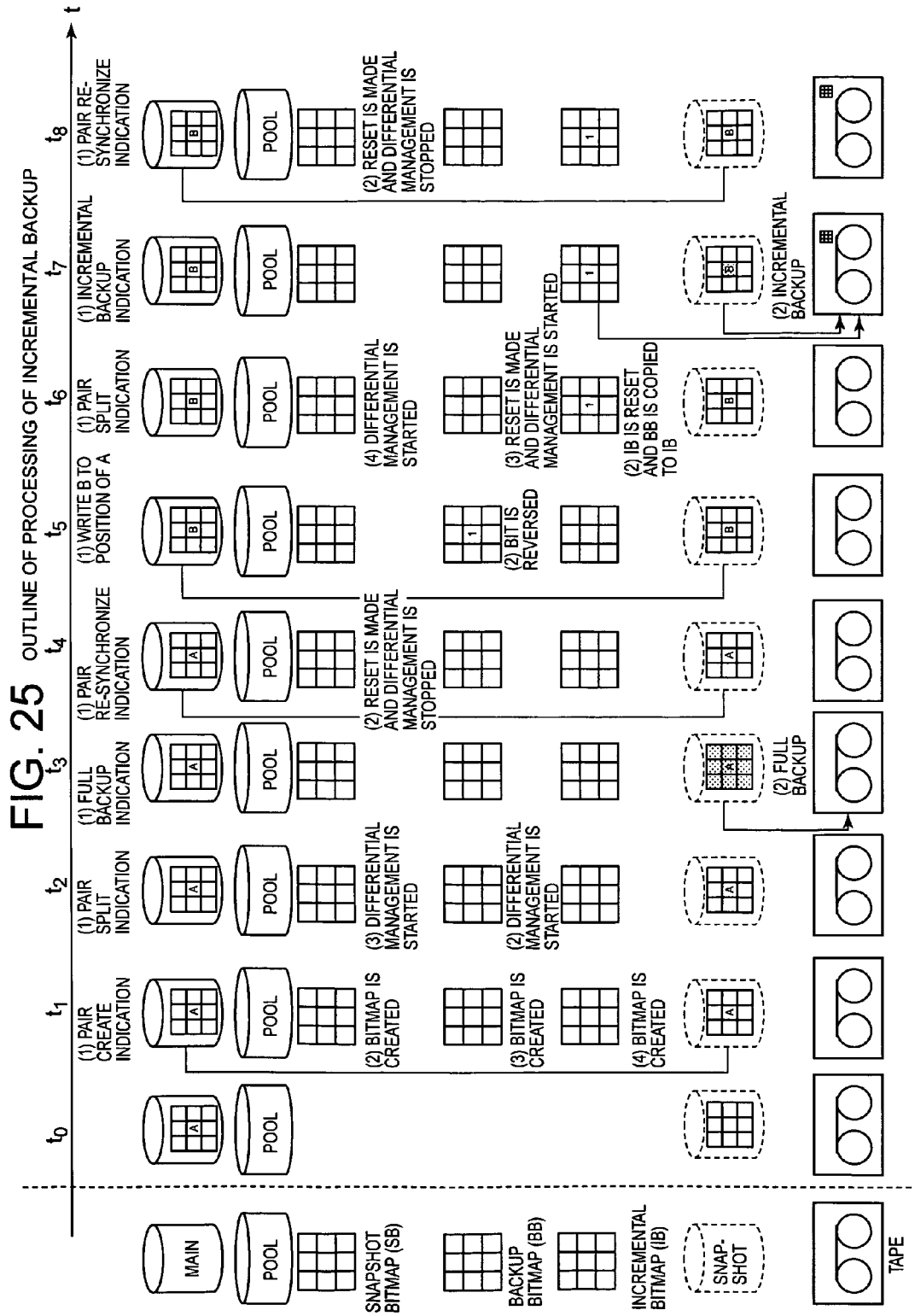
FIG. 25 shows part of the outline of the Processing of Incremental Restore.
Figure 26:
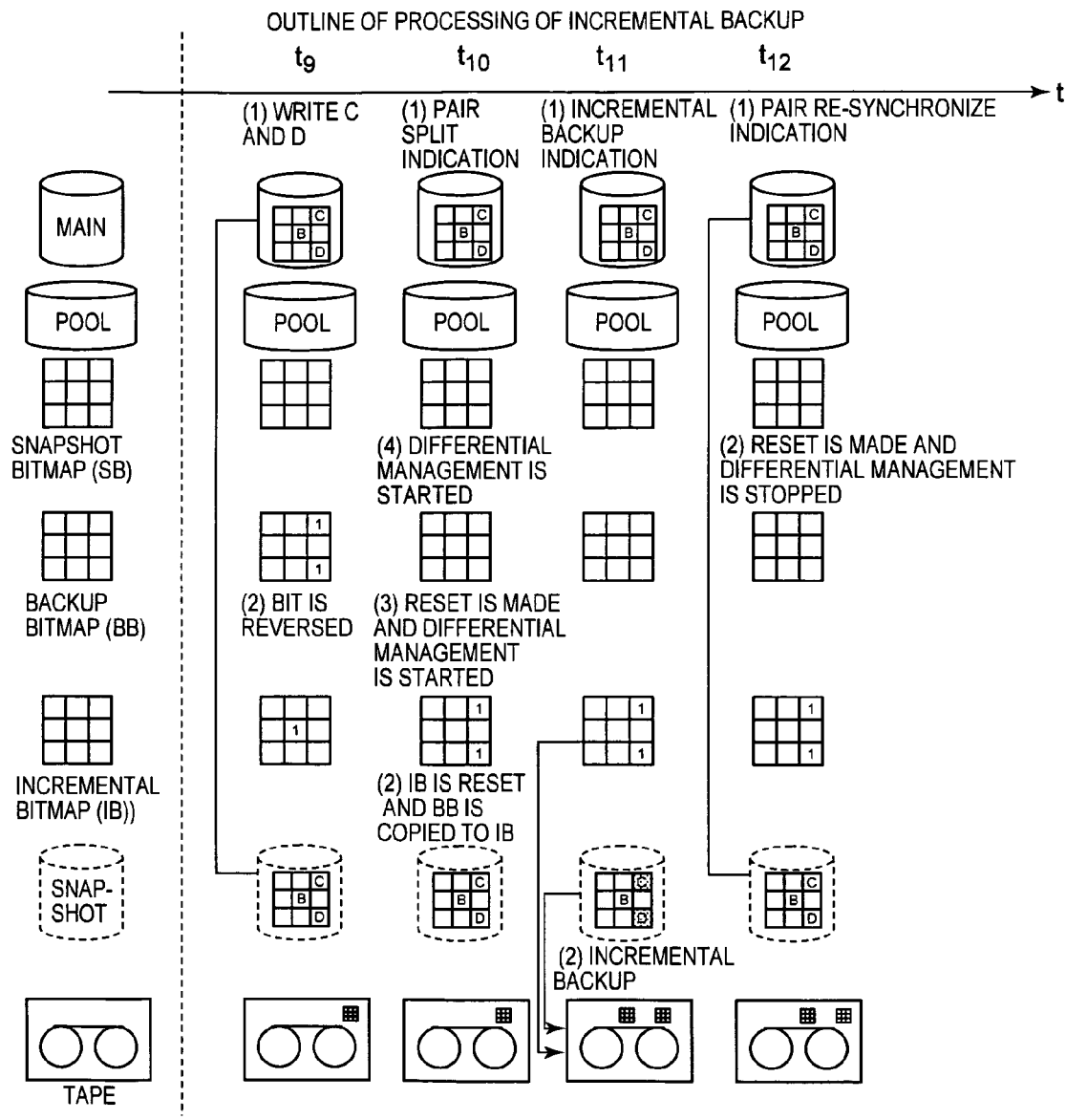
FIG. 26 shows the remainder of the outline of the Processing of Incremental Restore.

The Processing of Incremental Backup will be outlined below with reference to a combination of FIG. 25 and FIG. 26 (because the Processing of Full Backup is performed before the Processing of Differential Backup, the Processing of Full Backup is also shown in the figures).

Full backup relating to the object snapshot volume is executed, and the differential data in the object snapshot volume that were generated thereafter between the backup and the next backup are backed up in the incremental backup.

The processing executed at the time t0 to t5 shown in FIG. 5 is identical to the processing executed at the time t0 to t5 that was explained with reference to FIG. 23.

In the case where the Disk Control Program 132 receives a Pair Split Indication (second and subsequent Pair Split Indications) that designates the object main volume from the host computer 100 at a time t6, the IB is reset and the BB is copied to the IB. In other words, the IB is updated. The BB is reset and the differential management using the BB is started. The differential management using the SB is also started.

In the case where the Backup/Restore Control Program 131 receives a Differential Backup Indication that designates the object snapshot volume from the host computer 100 at a time t7, data are read from the block in the object snapshot volume that corresponds to the reversed bit in the IB after the update at the time t6, and these data and the IB after the update at the time t6 are stored on the tape.

In the case where the Disk Control Program 132 receives a Pair Re-synchronize Indication that designates the object main volume from the host computer 100 at a time t8, the status 314 of the object pair becomes a pair status, the SB is reset, and the differential management using the SB is stopped. As a result, the management of the data image of the object main volume at the time t6 is annulled.

At a time t9, data C are written to the block: 3 within the object main volume and data D are written into the block 9. Because the object pair is in a pair status, the data C are logically copied into the block: 3 within the object snapshot volume, and the data D are logically copied to the block: 9. The bit: 3 and the bit: 9 of the BB are reversed.

In the case where the Disk Control Program 132 receives a Pair Split Indication (second and subsequent Pair Split Indications) that designates the object main volume from the host computer 100 at a time t10, the IB is reset and the BB is copied to the IB. In other words, the IB is updated. In the IB after the update, the bit: 3 and the bit: 9 corresponding respectively to the block: 3 and the block: 9 that are newly updated at the time t9 are reversed to correspond to the incremental data, but the bit: 5 is not reversed because the data B corresponding thereto have already been backed up. The BB is reset and the differential management using the BB is started. The differential management using the SB is also started.

In the case where the Backup/Restore Control Program 131 receives a Differential Backup Indication that designates the object snapshot volume from the host computer 100 at a time t11, data are read from the block in the object snapshot volume that corresponds to the reversed bit in the IB after the update at the time t10, and these data and the IB after the update at the time t9 are stored on the tape.

In the case where the Disk Control Program 132 receives a Pair Re-synchronize Indication that designates the object main volume from the host computer 100 at a time t12, the status 314 of the object pair becomes a pair status, the SB is reset, and the differential management using the SB is stopped. As a result, the management of the data image of the object main volume at the time t10 is annulled.

The data update of the object main volume, reception of the Pair Split Indication, reception of the Differential Backup Indication, and reception of the Pair Re-synchronize Indication are thereafter repeated. Further, the Pair Split Indication and the Incremental Backup Indication may be combined into one indication.

<<Outline of Processing of Differential Restore>>

FIG. 27 is an explanatory drawing that outlines the Processing of Differential Restore. In the explanation below, the main volume 150 that will be the object of explanation will be called "object main volume", a snapshot volume 152 constituting a pair with the object main volume will be called "object snapshot volume", a backup bitmap 307 corresponding to the object snapshot volume will be called "BB", and a differential bitmap 703 corresponding to the object snapshot volume will be called "DB". Further, in the figure the object main volume and the object snapshot volume are represented by a block group of 4 blocks in the vertical direction by 4 blocks in the horizontal direction. Likewise, each bitmap is represented by 4 bit in the vertical direction by 4 bit in the horizontal direction. Each block group and each bitmap are assigned with numbers from 1 to 16 from the upper left corner to the lower right corner and specified by these numbers. Thus, the correspondence relationship between the numbers of blocks and bits in each block group and each bitmap is assumed to be:

| 1  | 2  | 3  | 4  |
|----|----|----|----|
| 5  | 6  | 7  | 8  |
| 9  | 10 | 11 | 12 |
| 13 | 14 | 15 | 16 |

When a specific block and bit are indicated, they are represented by "block: number", "bit: number" by using the assigned numbers. The same approach is followed in the case of explaining the outline of the incremental backup with reference to FIG. 28. However, in the incremental backup, the incremental bitmap 703 corresponding to the object snapshot volume is used instead of the differential bitmap 703 corresponding to the object snapshot volume. The incremental bitmap 703 is called "IB".

It will be assumed that at a time t0, full backup relating to the object snapshot volume is performed, and respective differential backup will is performed at times t1, t2, t3, t4, t5. The DB at the time t5 (denoted by DBf) is assumed to be the DB at a present time t6. Further, within the interval after the full backup at the time t0 to the time t3, the blocks: 3, 7, 11 located within the object main volume will updated, and from this point in time to the present point in time t6, at least the blocks: 1, 5, 9, 13, 15 of the object main volume will be updated.

The object snapshot volume at the time t3 will be assumed to be designated as a restore source (more specifically, for example, it will be assumed that a tape group having stored therein the data 512 that were stored in the differential backup with respect to the object snapshot volume at the time t3 is designated). In order to restore the object main volume at the time t3, with respect to the data stored in the blocks: 3, 7, 11, the restore may be performed from the differential backup data 502 relating to the time t3, because there is a possibility of the update being performed after the time t4, and with respect to the data stored in the blocks: 1, 5, 9, 13, 15, the restore may be performed from the full backup data 502 relating to the time t0.

Here, the following processing is performed.

(1) A restore bitmap (RB) is created that shows a block that can be updated after the time t3 and has to be restored. More specifically, a logical sum of BB and DBf at the present time t6 is calculated, and the calculation result becomes RB (RBa).

(2) The DB (DBd) that was stored at the time t3 is acquired from the tape corresponding to the restore source, and data corresponding to the reversed bit: 3, 7, 11 in the DBd are restored from the differential backup data 502 to the blocks: 3, 7, 11 of the object main volume, respectively.

(3) A logical sum of the RBa and DBd is calculated, and the RBd shown in the figure that is the RB (the RB for which the inverted bit is taken as a non-inverted bit) obtained by subtracting the calculated logical sum (only the bit numbers 3, 7, 11 are reversed bits) from the RBa is created. Data corresponding to the reversed bits: 1, 5, 9, 13, 15 in the RBb are the remaining restore objects.

(4) Data corresponding to the reversed bits: 1, 5, 9, 13, 15 in the RBb are restored from the full backup data 502 to the blocks: 1, 5, 9, 13, 15 of the object main volume, respectively.

The object main volume at the time t3 is restored by the Processing of Differential Restore according to the above-described flow of sequential steps (1) to (4).

<<Outline of Processing of Incremental Restore>>

FIG. 28 is an explanatory drawing that outlines the Processing of Incremental Restore.

It is assumed that at a time to, full backup relating to the object snapshot volume is performed, and respective incremental backup is performed at times t1, t2, t3, t4, t5. The IB at the time t5 (denoted by IBf) is assumed to be the IB at a present time t6. Further, within the interval after the full backup at the time t0 to the time t3, the blocks: 1, 3, 7, 11, 12, 16 located within the object main volume are updated, and from this point in time to the present point in time t6, at least the blocks: 5, 7, 9, 11, 13, 15 of the object main volume are updated.

The object snapshot volume at the time t3 is assumed to be designated as a restore source. In order to restore the object main volume at the time t3, with respect to the data stored in the block: 11, the restore may be performed from the incremental backup data 502 relating to the time t3, with respect to the data stored in the block: 7, the restore may be performed from the incremental backup data 502 relating to the time t2, and with respect to the data stored in the blocks: 5, 9, 13, 15, the restore may be performed from the full backup data 502 relating to the time t0.

Here, the following processing is performed.

(1) A restore bitmap (RB) that shows a block that will be updated after the time t3 (block that has to be restored) is created. More specifically, a logical sum of BB and IBf at the present time t6 and IB (here, IB (IBe) at the time t4) that is one or more IB after the time t3 is calculated, and the calculation result becomes RB (RBa).

(2) A logical product of the RBa and the IB (IBd) at the time t3 corresponding to the restore source is calculated, and data corresponding to the reversed bit: 11 in the logical product are restored from the incremental backup data 502 at the time t3 to the block: 11 within the object main volume.

(3) The RB (RBb) obtained by subtracting the logical product of RBa and IBd from the RBa is created. Data corresponding to the reversed bits: 5, 7, 9, 13, 15 of the RBb are the remaining restore objects.

(4) A logical product of the RBb and the. IB (IBc) at the time t2 at which the incremental backup of the cycle immediately preceding the time t3 corresponding to the restore source was executed is calculated, and data corresponding to the reversed bit: 7 in this logical product is restored from the incremental backup data 502 at the time t2 to the block 7 within the object main volume.

(5) The RB (RBc) obtained by subtracting the logical product of RBb and IBc from the RBc is created. Data corresponding to the reversed bits: 5, 7, 9, 13, 15 of the RBc are the remaining restore objects.

(6) A logical product of the RBc and the IB (IBb) at the time t1 at which the incremental backup of the cycle immediately preceding the time t2 was executed is calculated. However, in this example, no reversed bit is present in this logical product and, therefore, the restore from the tape is not executed.

(7) The RB (RBd) obtained by subtracting the logical product of RBc and IBb from the RBc is created. Data corresponding to the reversed bits: 5, 9, 13, 15 of the RBd are the remaining restore objects.

(8) Before the time t1, the incremental backup was not executed and the full backup was executed at the time t0. Therefore, data corresponding to the reversed bits: 5, 9, 13, 15 of the RBd are respectively restored from the full backup data 502 at the time t0 to the blocks: 5, 9, 13, 15 of the object main volume.

The object main volume at the time t3 is restored by the Processing of Incremental Restore according to the above-described flow of sequential steps (1) to (8).

The processing performed in the present embodiment will be described below in greater detail.

<<Detailed Description of the Processing>>

Figure 13:
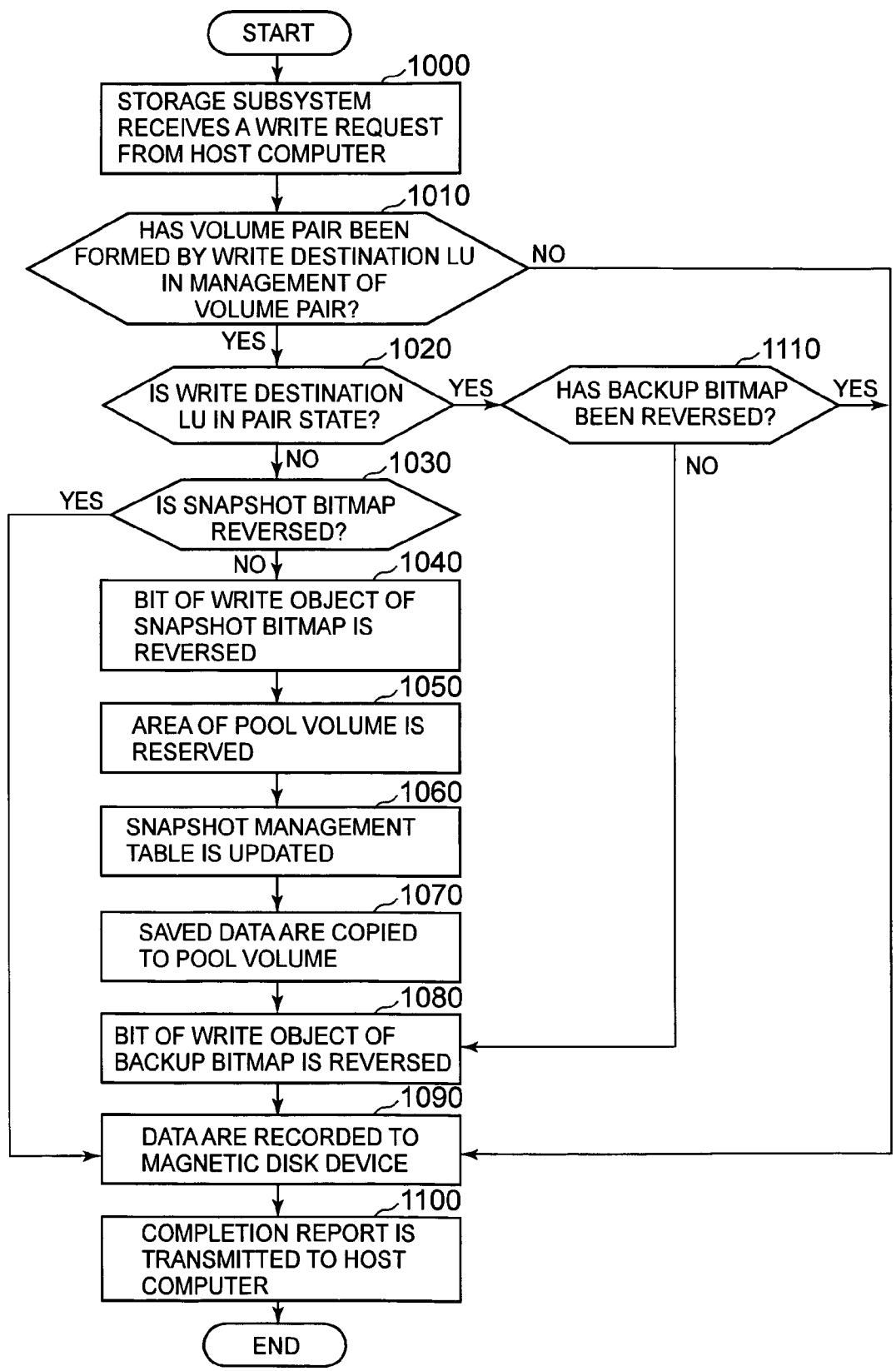
FIG. 13 shows a flow of processing in a recording subsystem that received a write request.

FIG. 13 shows a processing flow executed in the case where a write request is received by the storage subsystem 101 from the host computer 100.

In step 1000, the controller 123 receives a write request designating the LUN and LBA of the write destination LU from the host computer 100. As a result, the Disk Control Program 132 is executed. The write object data that correspond to the write request are temporarily stored by the Disk Control Program 132 in the cache memory 203.

In step 1010 the Disk Control Program 132 determines whether the LUN of the write destination LU is a LUN of the main volume 150 by referring to the Pair Configuration Management Table 301. If the determination result is positive, the processing advances to step 1020, and if the determination result is negative, the processing flow advances to step 1070.

In step 1020, the Disk Control Program 132 determines whether the status 314 corresponding to the LUN of the main volume 150 of the Pair Configuration Management Table 301 shows a pair status. If the determination result is negative, the processing flow advances to step 1030, and if the result is positive, the processing flow advances to step 1110.

In step 1030, the Disk Control Program 132 determines whether the bit that corresponds to the LBA of the write destination and is in the snapshot bitmap 303 corresponding to the write destination LU has been reversed. If the determination result is negative, the processing flow advances to step 1040, and if the determination result is positive, the processing flow advances to step 1090. If there area a plurality of bits corresponding to the LBA of the write destination and bits for which the determination result of the step 1030 is negative and bits for which the determination result is positive are present together among this plurality of bits, then step 1040 is implemented with respect to the bits for which the determination result is negative and step 1090 is implemented with respect to the bits for which the determination result is positive.

In step 1040, the Disk Control Program 132 determines whether the bit that corresponds to the LBA of the write destination and is in the snapshot bitmap 303 corresponding to the write destination LU is reversed.

In step 1050, the Disk Control Program 132 selects the pool volume 151 and reserves an area having a capacity corresponding to the reversed bit in the selected pool volume 151.

In step 1060, the Disk Control Program 132 updates the Snapshot Management Table 304. More specifically, for example, the Disk Control Program 132 writes to the Snapshot Management Table 304 for each reversed bit the number of the snapshot bitmap 303 corresponding to the write destination LU, the number of the reversed bit, and the information (LUN of the selected pool volume 151 and LBA in the reserved area) indicating the storage destination position of data before the update that are located in the position (update position within the main volume 150) corresponding to the reversed bit.

In step 1070, the Disk Control Program 132 copies the pre-update data in the main volume 150 that were in the position corresponding to the reversed bit to the storage destination position thereof (position in the aforementioned reserved area in the selected pool volume 151).

In step 1080, the Disk Control Program 132 reverses the bit corresponding to the update position within the main volume 150 in the backup bitmap 307 corresponding to the volume pair including the main volume 150.

In step 1090, the Disk Control Program 132 writes the write object data according to the write request to the position corresponding to the LUN and tBA designated by the write request.

In step 1100, the Disk Control Program 132 transmits the write completion report to the host computer 100. The completion report may be also transmitted at a point in time in which the write object data is stored in the cache memory 203, rather than in the step 1100.

In step 1110, the Disk Control Program 132 determines whether the bit corresponding to the update position within the main volume 150 has been reversed in the backup bitmap 307 corresponding to the volume pair including the main volume 150. If the determination result is positive, the processing flow advances to step 1090, and if the determination result is negative, the processing flow advances to step 1080.

Figure 14:
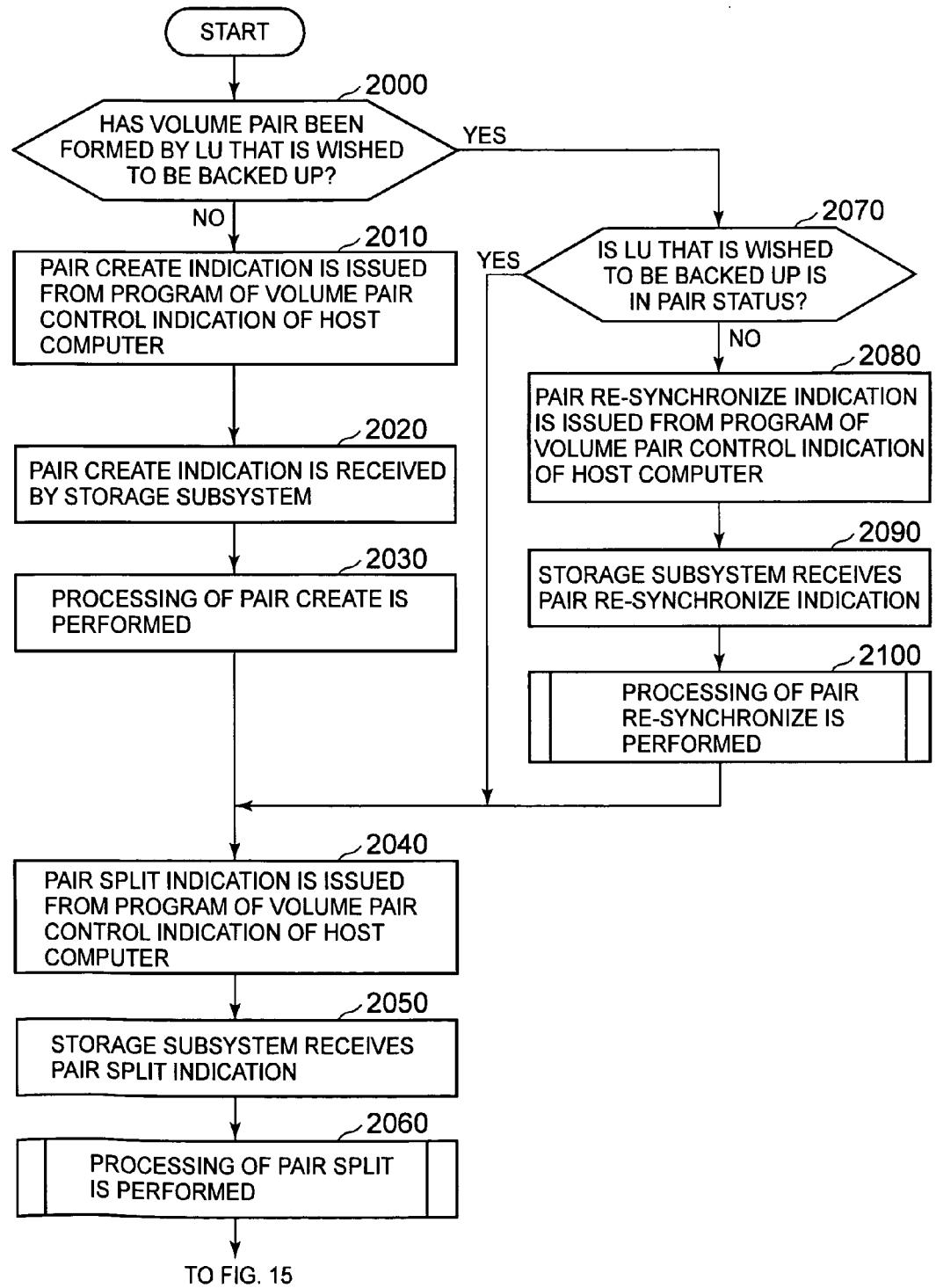
FIG. 14 shows a part of the processing flow of the Processing of Full Backup.
Figure 15:
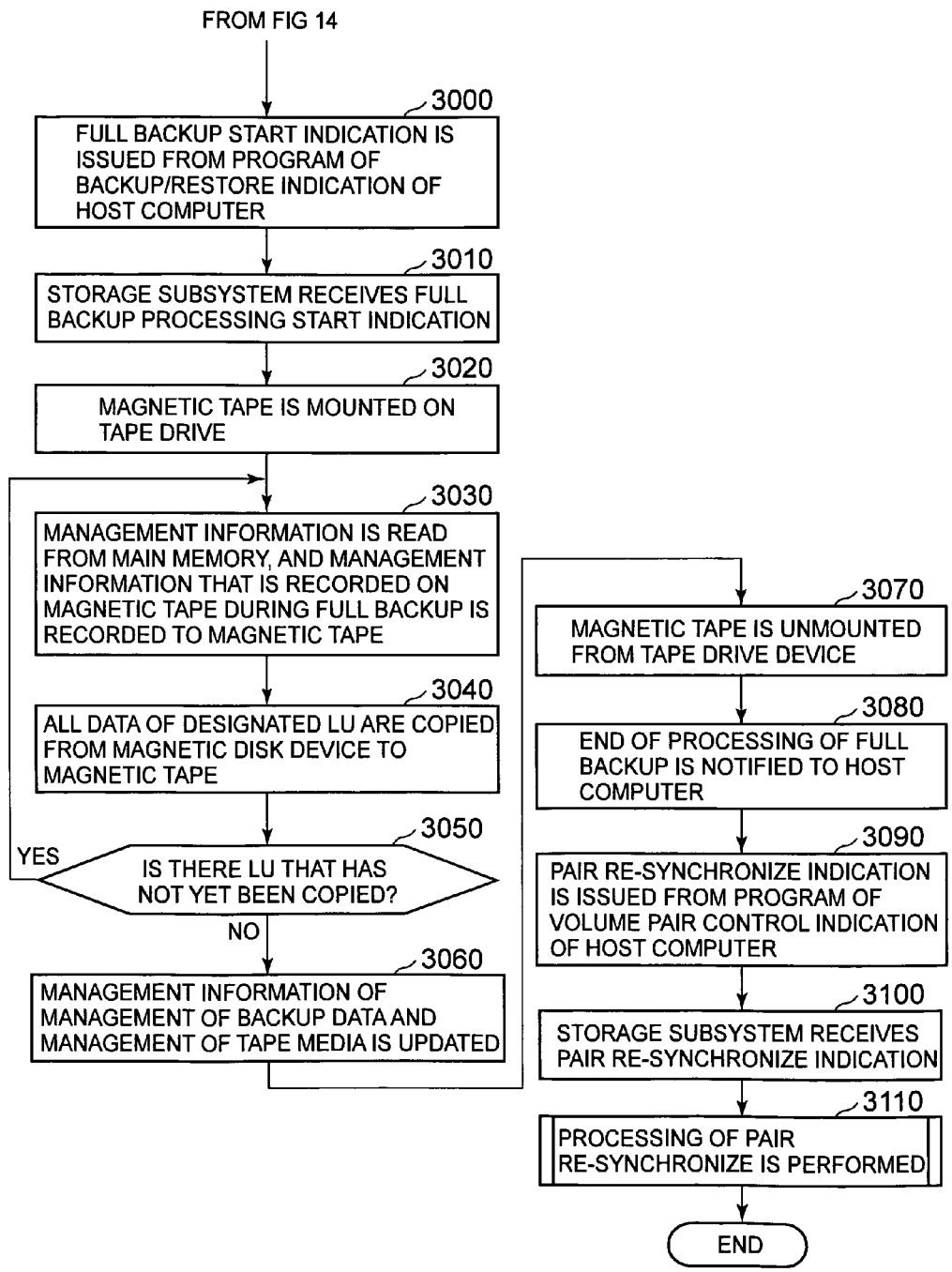
FIG. 15 shows a remainder of the processing flow of the Processing of Full Backup.

FIG. 14 and FIG. 15 show the processing flow of the Processing of Backup.

In step 2000, whether the LU that is wished to be backed up (snapshot volume 152) has formed a volume pair is determined. This determination may be performed by a user, or it may be performed by the Program 112 of Volume Pair Control Indication by referring to the Pair Configuration Management Table 301. If the determination result is positive, the processing flow advances to step 2070, and if the determination result is negative, the processing flow advances to step 2010.

In step 2010, a Pair Create Indication is issued from the Program 112 of Volume Pair Control Indication of the host computer 100 to the storage subsystem 101. In this Pair Create Indication, for example, a LUN of the main volume 150 is designated.

In step 2020, the Disk Control Program 132 receives the Pair Create Indication.

In step 2030, the Disk Control Program 132 executes the Processing of Pair Create in response to the Pair Create Indication. In this process, the status 314 of the Pair Configuration Management Table 301 that corresponds to the volume pair specified from this indication is made a pair status. Further, in this processing, the snapshot bitmap 303, backup bitmap 307, differential bitmap 703, and incremental bitmap 703 corresponding to this volume pair are created. Further, in this processing, information is entered in the Snapshot Bitmap Management Table 302, Backup Bitmap Management Table 306, and Differential/Incremental Bitmap Management Table 702, and information is also entered in the Snapshot Management Table 304. At this time, the initial value of the data storage position 343 written to the Snapshot Management Table 304 becomes the position information representing the main volume 150.

In step 2040, a Pair Split Indication is issued from the Program 112 of Volume Pair Control Indication of the host computer 100 to the storage subsystem 101. In this Pair Split Indication, for example, a LUN of the main volume 150 within the volume pair that was set to a pair status in step 2030 is designated.

In step 2050, the Disk Control Program 132 receives the Pair Split Indication.

In step 2060, the Processing of Pair Split is performed in response to the Pair Split Indication. The Processing of Pair Split will be explained below with reference to FIG. 20.

In step 2070, whether the status 314 of the volume pair including the LU that is wished to be backed up (snapshot volume 152) is a pair status is determined. This determination may be performed by a user, or it may be performed by the Program 112 of Volume Pair Control Indication by referring to the Pair Configuration Management Table 301. If the determination result is positive, the processing flow advances to step 2040, and if the determination result is negative, the processing flow advances to step 2080.

In step. 2080, a Pair. Re-synchronize Indication is issued from the Program 112 of Volume Pair Control Indication of the host computer 100 to the storage subsystem 101. In this Pair Re-synchronize Indication, for example, a LUN of the LU that is wished to be backed up (main volume 150) is designated.

In step 2090, the Disk Control Program 132 receives the Pair Re-synchronize Indication.

In step 2100, the Disk Control Program 132 executes the Processing of Pair Re-synchronize in response to the Pair Re-synchronize Indication. The Processing of Pair Re-synchronize will be explained below with reference to FIG. 19.

As shown in FIG. 15, in step 3000, a Full Backup Start Indication is issued from the Program 113 of Backup/Restore Control Indication of the host computer 100 to the storage subsystem 101. In the Full Backup Start Indication, for example, the LUN of the snapshot volume 152 constituting a volume pair including the LU corresponding to the LUN designated by the Pair Split Indication is designated as a backup source LUN.

In step 3010, the Backup/Restore Control Program 131 receives a Full Backup Start Indication. The Backup/Restore Control Program 131, for example, transmits a tape mount request to the tape library device 125.

In step 3020, the Tape Library Control Program 133 receives, for example, the mount request, controls the robot 134 in response to the request, and causes the robot to mount the tape 136 that serves as a backup destination on a tape drive 135. At this time, the necessary tapes 136 may be mounted on a plurality of tape drives 135 and parallel writing may be performed. The Processing of Copy may be also performed by replacing the copied tapes 136 with tapes 136 that have not been fully copied. The tape 136 that is the backup destination is, for example, an unused tape that was randomly selected by the Tape Library Control Program 133. The tapes may be identical in step 4050 or step 5050.

In step 3030, management information 901 that will be recorded to a tape during full backup is created and the created management information 901 is recorded to the tape 136 by coaction of the Backup/Restore Control Program 131 and the Tape Library Control Program 133. For example, the management information 901 can be created by performing a processing such as referring to the main memory 201 and acquiring the information corresponding to the tape number 631 of the mounted tape 136 from the Tape Media Management Table 603. The tape group number 621 contained in the management information 901 is the number of the tape group for including at least one full backup data that will be recorded according the current Full Backup Start Indication. The LUN 931 and LU capacity 932 are the LUN and LU capacity of the backup source LU in the full backup. For example, it is possible not to create the tape information 821 in the case where the present tape group starts from the intermediate section of the tape 136 and does not expand to another tape 136. This is because the tape information 821 is the information recorded in the head section of the tape 136. The same can be true for steps 4060, 5060.

In step 3040, all the data of the LU designated as the backup source are copied on the tape 136 by coaction of the Backup/Restore Control Program 131, Disk Control Program 132, and Tape Library Control Program 133. In such full backup, for example, 14 is recorded as the tape group number 621 in the Tape Group Management Table 602 of FIG. 8 by the Management 218 of tape media, "In backup" is recorded as the tape group status 622, "Full" is recorded as the backup data type 625, and when the backup ends, "Normal" is recorded as the tape group status 622.

Step 3060 and step 3070 are repeated until all the LU designated as the backup sources are copied (step 3050: NO) by coaction of the Backup/Restore Control Program 131, Disk Control Program 132, and Tape Library Control Program 133. In step 3030 of this repetition, only the data management information 511 is created and recorded. The data management information 511 serves to be included in each backup data. The same can be true in step 4060 included in repetition in step 4080, and also in step 5060 included in repetition in step 5080. When all the LU are copied (step 3050: YES), the processing flow advances to step 3060.

In step 3060, the management information of the Management 211 of backup data and Management 218 of tape media is updated. For example, the Management 211 of backup data adds information relating to the backup data 502 that were backed up to the Backup Data Management Table 701. Further, the Management 218 of tape media adds information relating to the tape group 411 to the Tape Group Management Table 602 (or updates the information when it has already been entered) and adds the number of the tape group that will record the present full backup data 502 to the storage tape group number 613 of the Tape Pool Management Table 601. As mentioned in the brackets hereinabove, for example, a case where the tape group has been defined before the backup (it is not related to the full/differential/incremental difference) is a case in which information is updated. In this case, for example, when 621, 622, 627 are entered before the backup and 622, 623, 624, 625, 626, 628 are entered (updated) after the backup, the information is sometimes updated in the Tape Group Management Table 602. Once the step 3060 is completed, an unmount request is transmitted, for example, from the Backup/Restore Control Program 131 or the Tape Library Control Program 133 to the tape library device 125.

In step 3070, the Tape Library Control Program 133 receives, for example, the unmount request, controls the robot 134 in response thereto, and causes the robot to unmount the tape 136 from the tape drive 135.

In step 3080, the Backup/Restore Control Program 131 notifies the host computer 100 that the Processing of Full Backup has ended.

In step 3090, for example, a Pair Re-synchronize Indication is issued from the Program 112 of Volume Pair Control Indication of the host computer 100 to the storage subsystem 101 in response to the received notification that the Processing of Full Backup has ended. In the Pair Re-synchronize Indication, for example, the LUN of the LU (main volume 150) that is wished to be backed up is designated.

In step 3100, the Disk Control Program 132 receives the Pair Re-synchronize Indication.

In step 3110, the Processing of Pair Re-synchronize is performed in response to the Pair Re-synchronize Indication.

Figure 16:
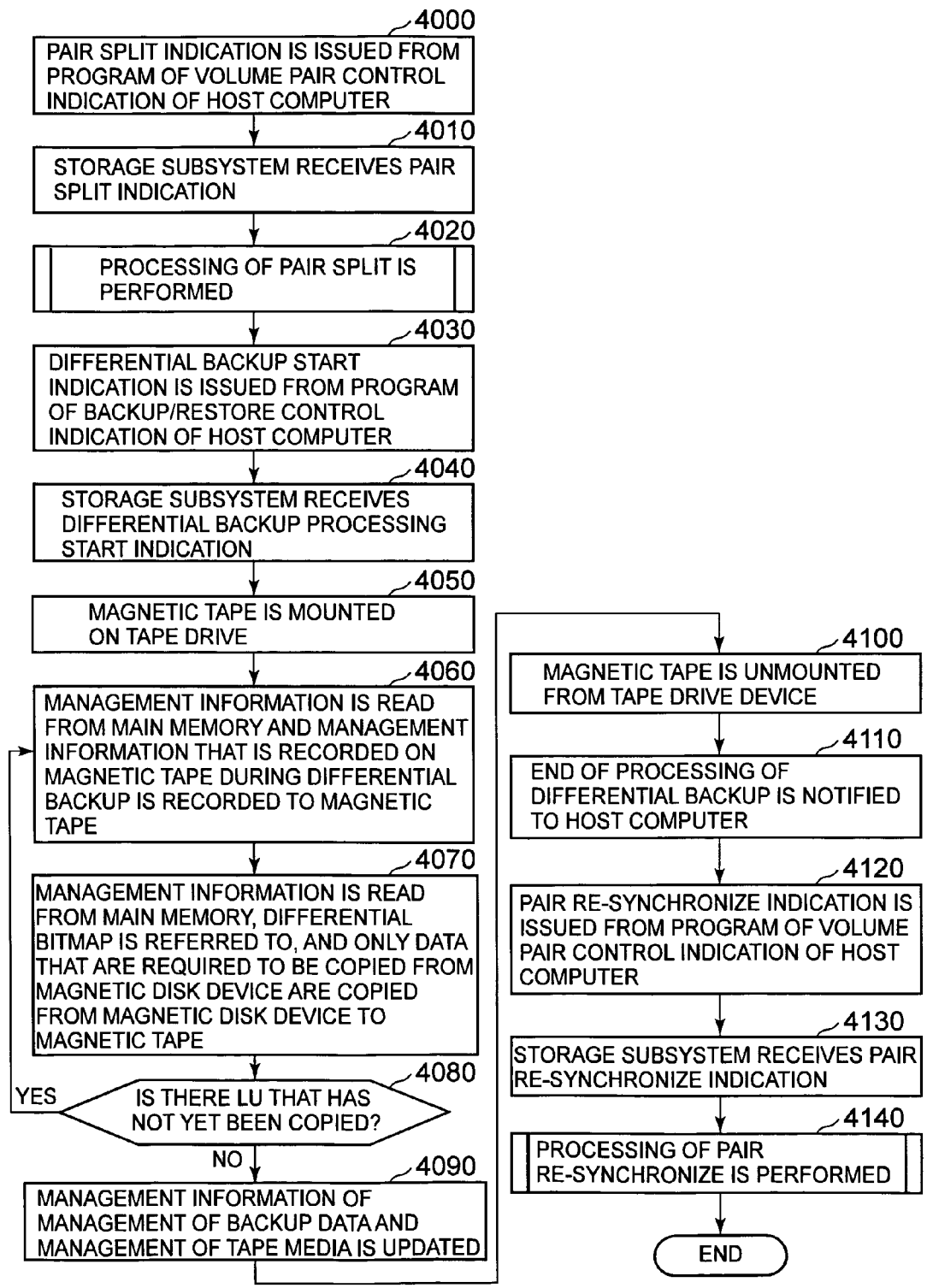
FIG. 16 shows a processing flow of the Processing of Differential Backup.

FIG. 16 shows a processing flow of Processing of Differential Backup.

In step 4000, a Pair Split Indication is issued from the Program 112 of Volume Pair Control Indication of the host computer 100 to the storage subsystem 101. In this Pair Split Indication, for example, the LUN of the LU (main volume 150) that is wished to be backed up is designated.

In step 4010, the Disk Control Program 132 receives the Pair Split Indication.

In step 4020, the Processing of Pair Split is performed in response to the Pair Split Indication.

In step 4030, a Differential Backup Start Indication is issued from the Program 113 of Backup/Restore Control Indication of the host computer 100 to the storage subsystem 101, for example, in response to the end of the Processing of Pair Split. In this Differential Backup Start Indication, for example, the LUN of the snapshot volume 152 constituting a volume pair including the LU corresponding to the LUN designated by the Pair Split Indication is designated as the backup source LUN.

In step 4040, the Backup/Restore Control Program 131 receives the Differential Backup Processing Start Indication. In response to this indication, for example, the Backup/Restore Control Program 131 transmits the tape mount request to the Tape Library Control Program 133.

In step 4050, the. Tape Library Control Program 133 causes a robot to mount the tape 136 that is the backup destination on the tape drive 135, for example, in response to this mount request.

In step 4060, the management information 902 for recording on the tape during differential backup is created and this management information 902 is recorded to the tape 136 by coaction of the Backup/Restore Control Program 131 and the Tape Library Control Program 133. The tape group number 621 is the number of the current tape group for including at least one differential backup data 502 that will be recorded based on the current Differential Backup Start Indication. The management information 902 includes the tape group number 626 necessary for restore, but this number 626 is acquired from the backup destination tape group number 713, for example, satisfying the following three conditions from the Backup Data Management Table 701:

(1) a LUN identical to the backup source LUN of the current differential backup is the backup source LUN 712, (2) the backup data type 715 is full, (3) from among the backup acquisition date and time 716 satisfying the conditions (1) and (2), the date and time are the closest to the present date and time. Further, the data management information 511 includes the differential management size 724 corresponding to the LUN 721 of the backup source LUN or the differential bitmap 703 that is in the differential bitmap storage position 725 corresponding to this LUN 721. In the case of incremental backup, for example, a tape group number (for example, a plurality thereof) obtained by adding the tape group number (the tape group number satisfying the conditions (1) and (3)) to the tape group number 626 necessary for restore that was entered to the tape group number (any of full/differential/incremental is possible) satisfying the conditions (1) and (3) above.

In step 4070, the differential bitmap 703 that is in the differential bitmap storage position 725 in which the LUN 721 is the backup source LUN and the backup type 723 corresponds to differential is referred to and the data with reversed differential bits are copied from the disk unit 90 to the tape 136 by coaction of the Backup/Restore Control Program 131, Disk Control Program 132, and Tape Library Control Program 133. In such differential backup, for example, the current tape group number is recorded as the tape group number 621 in the Tape Group Management Table 602 of FIG. 8 by the Management 218 of tape media, "In backup" is recorded as the tape group status 622, "Differential" is recorded as the backup data type 625, and when the backup ends, "Normal" is recorded as the tape group status 622.

Step 4060 and step 4070 are repeated until all the LU designated as the backup sources are copied (step 4080: NO) by coaction of the Backup/Restore Control Program 131, Disk Control Program 132, and Tape Library Control Program 133. Once the copying ends (step 4080: YES), the processing flow proceeds to step 4090.

In step 4090, the management information of the Management 211 of backup data and Management 218 of tape media is updated. For example, the Management 211 of backup data adds information relating to the differential backup data 502 to the Backup Data Management Table 701. The Management 218 of tape media adds information relating to the new tape group 411 where the differential backup data 502 has been recorded to the Tape Group Management Table 602 (or updates the information when it has already been entered) and adds the number of the new tape group 411 to the storage tape group number 613 of the Tape Pool Management Table 601. Once the step 4090 is completed, an unmount request is transmitted, for example, from the Backup/Restore Control Program 131 or the Tape Library Control Program 133 to the Tape Library Control Program 133.

In step 4100, the Tape Library Control Program 133 controls the robot 134, for example, in response to the unmount request, and causes the robot to unmount the tape 136 from the tape drive 135.

In step 4110, the Backup/Restore Control Program 131 notifies the host computer 100 that the Processing of Differential Backup has ended.

In step 4120, for example, a Pair Re-synchronize Indication is issued from the Program 112 of Volume Pair Control Indication of the host computer 100 to the storage subsystem 101 in response to the received notification that the Processing of Differential Backup has ended. In the Pair Re-synchronize Indication, for example, the LUN of the LU (main volume 150) that is wished to be backed up is designated.

In step 4130, the Disk Control Program 132 receives the Pair Re-synchronize Indication.

In step 4140, the Processing of Pair Re-synchronize is performed in response to the Pair Re-synchronize Indication.

Figure 17:
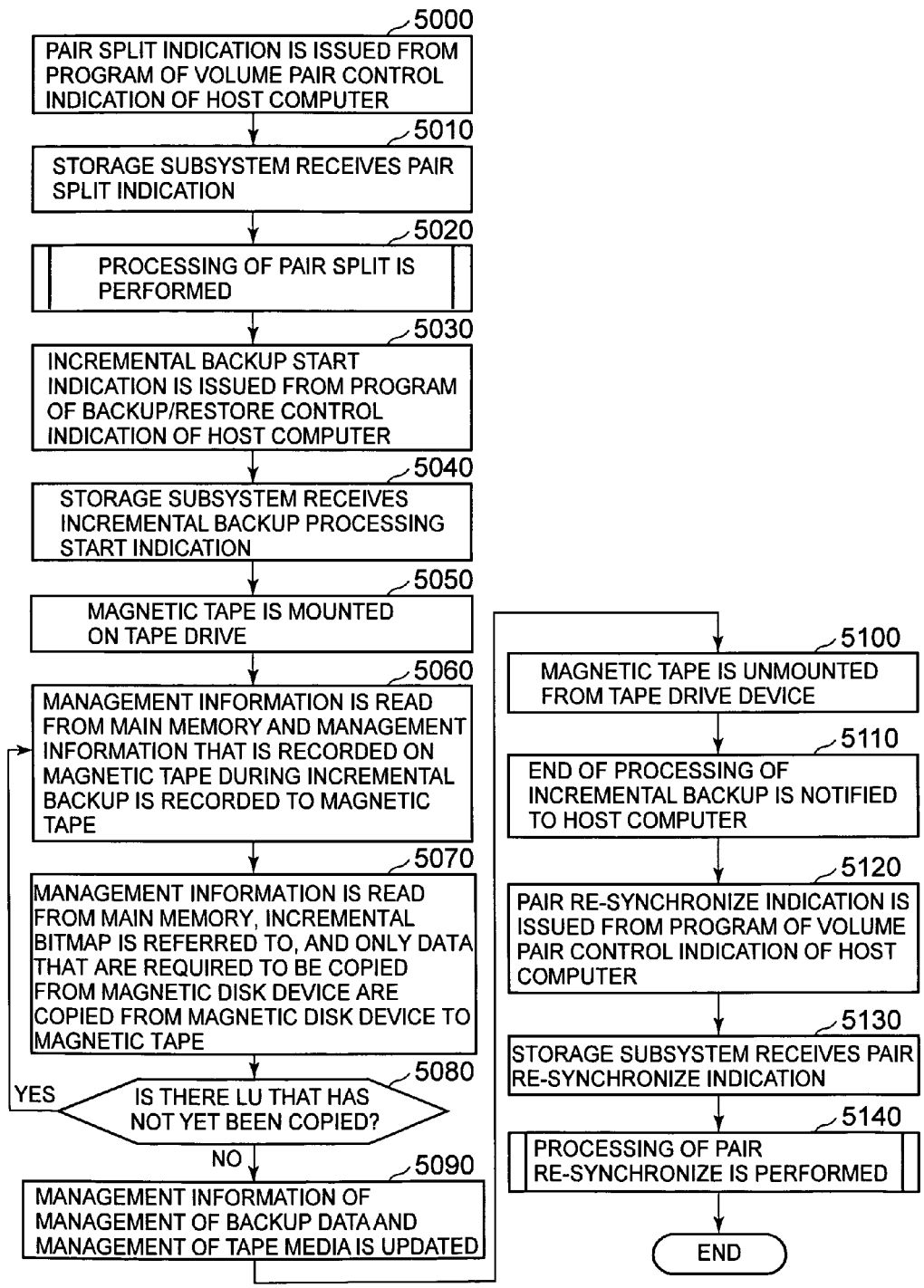
FIG. 17 shows a processing flow of the Processing of Incremental Backup.

FIG. 17 shows a processing flow of Processing of Incremental Backup.

In step 5000, a Pair Split Indication is issued from the Program 112 of Volume Pair Control Indication of the host computer 100 to the storage subsystem 101. In this Pair Split Indication, for example, the LUN of the LU (main volume 150) that is wished to be backed up is designated.

In step 5010, the Disk Control Program 132 receives the Pair Split Indication.

In step 5020, the Processing of Pair Split is performed in response to the Pair Split Indication.

In step 5030, an Incremental Backup Start Indication is issued from the Program 113 of Backup/Restore Control Indication of the host computer 100 to the storage subsystem 101. In this Incremental Backup Start Indication, for example, the LUN of the snapshot volume 152 constituting a volume pair including the LU corresponding to the LUN designated by the Pair Split Indication is designated as the backup source LUN.

In step 5040, the Backup/Restore Control Program 131 receives the Incremental Backup Processing Start Indication. In response to this indication, for example, the Backup/Restore Control Program 131 transmits the tape mount request to the Tape Library Control Program 133.

In step 5050, the Tape Library Control Program 133 causes a robot to mount the tape 136 that is the backup destination on the tape drive 135.

In step 5060, the management information 902 for recording on the tape during incremental backup is created and this management information 902 is recorded to the tape 136 by coaction of the Backup/Restore Control Program 131 and the Tape Library Control Program 133. The tape group number 621 is the number of the current tape group for including at least one incremental backup data 502 that will be recorded based on the current Incremental Backup Start Indication.

In step 5070, the incremental bitmap 703 that is in the differential bitmap storage position 725 in which the LUN 721 is the backup source LUN and the backup type 723 corresponds to incremental is referred to and the data with reversed bits are copied to the tape 136 by coaction of the Backup/Restore Control Program 131, Disk Control Program 132, and Tape Library Control Program 133. In such incremental backup, for example, the current tape group number is recorded as the tape group number 621 in the Tape Group Management Table 602 of FIG. 8 by the Management 218 of tape media, "In backup" is recorded as the tape group status 622, "Incremental" is recorded as the backup data type 625, and when the backup ends, "Normal" is recorded as the tape group status 622.

Step 5060 and step 5070 are repeated until all the LU designated as the backup sources are copied (step 5080: NO) by coaction of the Backup/Restore Control Program 131, Disk Control Program 132, and Tape Library Control Program 133. Once the copying ends (step 5080: YES), the processing flow proceeds to step 5090.

In step 5090, the management information of the Management 211 of backup data and Management 218 of tape media is updated. For example, the Management 211 of backup data adds information relating to the incremental backup data 502 to the Backup Data Management Table 701. The Management 218 of tape media adds information relating to the new tape group 411 where the incremental backup data 502 has been recorded to the Tape Group Management Table 602 (or updates the information when it has already been entered) and adds the number of the new tape group 411 to the storage tape group number 613 of the Tape Pool Management Table 601. Once the step 5090 is completed, a tape unmount request is transmitted, for example, from the Backup/Restore Control Program 131 or the Tape Library Control Program 133 to the Tape Library Control Program 133.

In step 5100, the Tape Library Control Program 133 controls the robot 134, for example, in response to the unmount request, and causes the robot to unmount the tape 136 from the tape drive 135.

In step 5110, the Backup/Restore Control Program 131 notifies the host computer 100 that the Processing of Incremental Backup has ended.

In step 5120, for example, a Pair Re-synchronize Indication is issued from the Program 112 of Volume Pair Control Indication of the host computer 100 to the storage subsystem 101 in response to the received notification that the Processing of Incremental Backup has ended. In the Pair Re-synchronize Indication, for example, the LUN of the LU (main volume 150) that is wished to be backed up is designated.

In step 5130, the Disk Control Program 132 receives the Pair Re-synchronize Indication.

In step 5140, the Processing of Pair Re-synchronize is performed in response to the Pair Re-synchronize Indication.

Figure 18:
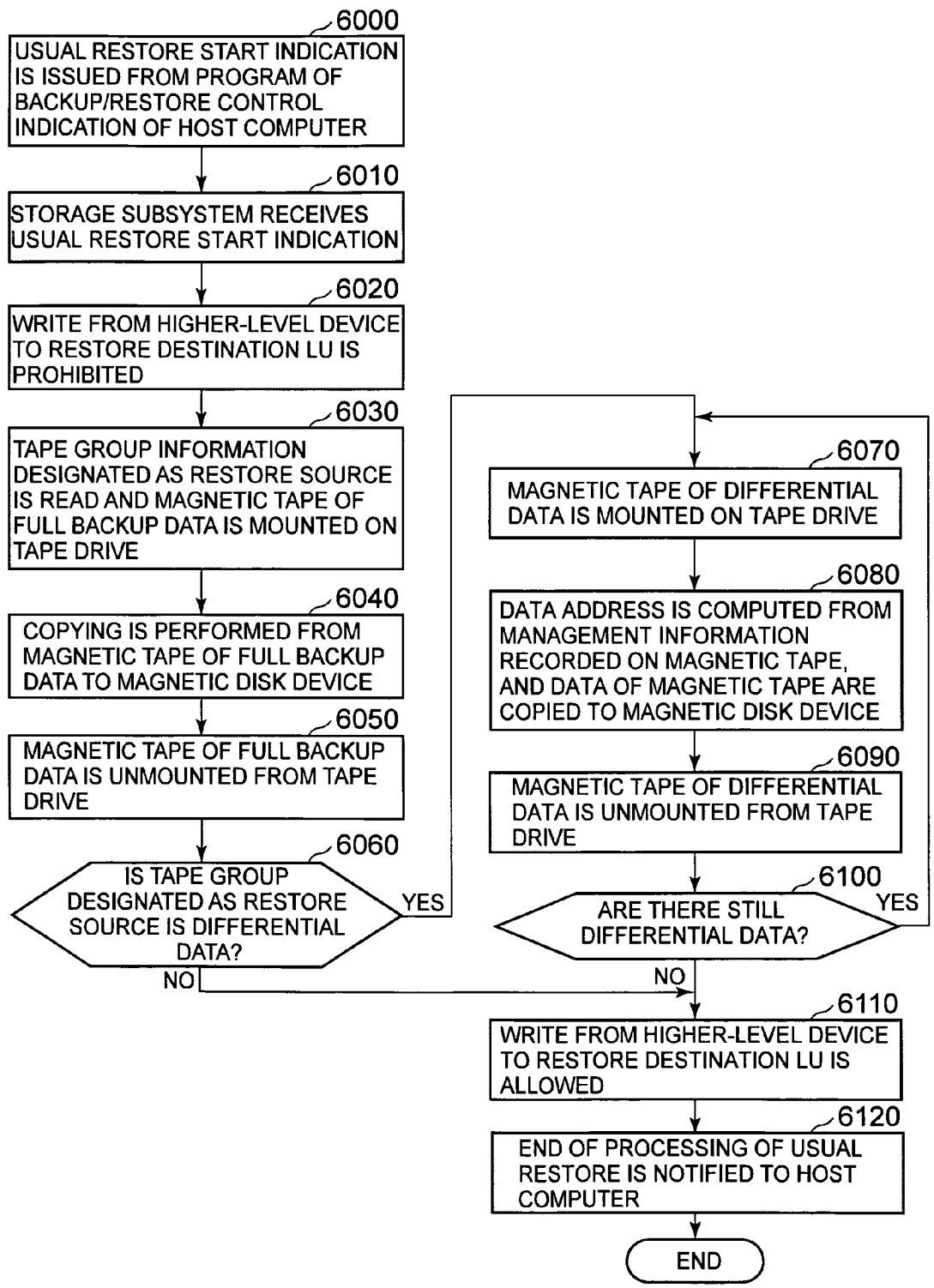
FIG. 18 shows a processing flow of the Processing of Usual Restore.

FIG. 18 shows a processing flow of Processing of Usual Restore.

In step 6000, a Usual Restore Start Indication is issued from the Program 113 of Backup/Restore Control Indication of the host computer 100 to the storage subsystem 101. In this Usual Restore Start Indication, for example, at least the restore source (for example, the tape group number), from among the restore source and restore destination, is designated.

In step 6010, the Backup/Restore Control Program 131 receives the Usual Restore Start Indication. At this time, the Backup/Restore Control Program 131 may issue a write prohibition request designating the restore destination LU to the Disk Control Program 132.

In step 6020, the Disk Control Program 132 prohibits writing from the host computer 100 to the restore destination LU at the predetermined occasion (for example, when a write prohibition request is received from the Backup/Restore Control Program 131).

In step 6030, the tape group number 626 necessary to restore the Tape Group Management Table 602 of the tape group 411 designated as the restore source is referred to and the tape 136 where the full backup data have been recorded is mounted on the tape drive 135 by coaction of the Backup/Restore Control Program 131 and the Tape Library Control Program 133. For example, if nothing has been recorded in the tape group number 626 necessary for the restore, the tape group 411 that was designated as the restore source is the full backup data, and if 11, 12 have been recorded in the tape group number 626 necessary for the restore, the tape group 411 with the tape group number 11 that is the head number is the full backup data. Further, for example, when the Backup/Restore Control Program 131 receives a designation of the backup acquisition date and time of the backup data that are wished to be restored, the tape group 411 of the backup destination tape group number 713 corresponding to this backup acquisition date and time is the "tape group 411 designated as the restore destination".

In step 6040, the data 512 from among the full backup data 502 are copied from the tape 136 where the full backup data 502 have been recorded to the LU (for example, the main volume 150) designated as the restore destination by coaction of the Backup/Restore Control Program 131 and the Tape Library Control Program 133. If the restore destination LU is not specifically designated, it may be the main volume 150 that automatically configures a pair with the snapshot volume 152 serving as a backup source LU.

In step 6050, the Tape Library Control Program 133 unmounts from the tape drive 135 the tape 136 where the full backup data 502 have been recorded.

In step 6060, the Backup/Restore Control Program 131 refers to the backup data type 625 corresponding to the tape group 411 designated as the restore source and determines whether the data are the full backup data. If the determination result is positive, the processing flow advances to step 6110, and if the determination result is negative, the processing flow advances to step 6070.

In step 6070, the tape group number 626 that is necessary for the restore corresponding to the tape group 411 designated as the restore source is referred to and the tape 136 having recorded thereon the differential/incremental backup data 502 (may be differential backup data 502 or incremental backup data 502) that have to be further subjected to Processing of Copy is mounted on the disk drive 135 by coaction of the Backup/Restore Control Program 131 and the Tape Library Control Program 133. For example, if 21, 22, 23 are recorded in the tape group number 626 necessary for the restore, then when the copying of the tape group 411 with a tape group number of 21 is completed, copying to the tape group 411 with a tape group number of 22 is performed, and when the copying to the tape group 411 with a tape group number of 22 is completed, the copying to the tape group 411 with a tape group number of 23 is performed.

In step 6080, management information 902 within the tape 136 where the differential/incremental backup data 502 have been recorded is referred to and the data 512 of the tape 136 are copied to the LU designated as the restore destination, while calculating the LBA of the restore destination LU where the data 512 have to be copied, by coaction of the Backup/Restore Control Program 131, Disk Control Program 132, and Tape Library Control Program 133. For example, the LBA of the restore destination LU where the data 512 have to be copied is calculated by using the differential/incremental bitmap 703 and differential management size 724 recorded on the tape 136. More specifically, for example, when the head LBA of the restore destination LU is taken as 100, the block size is taken as 1 MB, the differential management size 724 is taken as 1 MB, and the differential/incremental bitmap 703 is taken as 011001 . . . from the head, then the calculation yields the following results: the LBA of the restore destination LU where the data 512 of the head section recorded on the tape 136 have to be copied is 101, the LBA of the restore destination LU where the second data 512 have to be copied is 102, the LBA of the restore destination LU where the third data 512 have to be copied is 105, . . . .

In step 6090, the Tape Library Control Program 133 unmounts from the tape drive 135 the tape 136 where the differential/incremental backup data 502 for which the Processing of Copy was completed have been recorded.

Steps 6070, 6080, 6090 are repeated until all the tape group numbers 621 recorded in the tape group number 626 necessary for the restore are copied (step 6100: YES). If all the tape group numbers 621 recorded in the tape group number 626 necessary for the restore are not copied (step 6100: NO), the processing advances to step 6110. Further, at this time, the Backup/Restore Control Program 131 issues a write permission request designating the restore destination LU to the Disk Control Program 132

In step 6110, the Disk Control Program 132 allows writing from the host computer 100 to the restore destination LU (main volume 150) at the predetermined occasion (for example, when a write permission request is received from the Backup/Restore Control Program 131).

In step 6120, the Backup/Restore Control Program 131 notifies the host computer 100 that the Processing of Usual Restore has ended.

Figure 19:
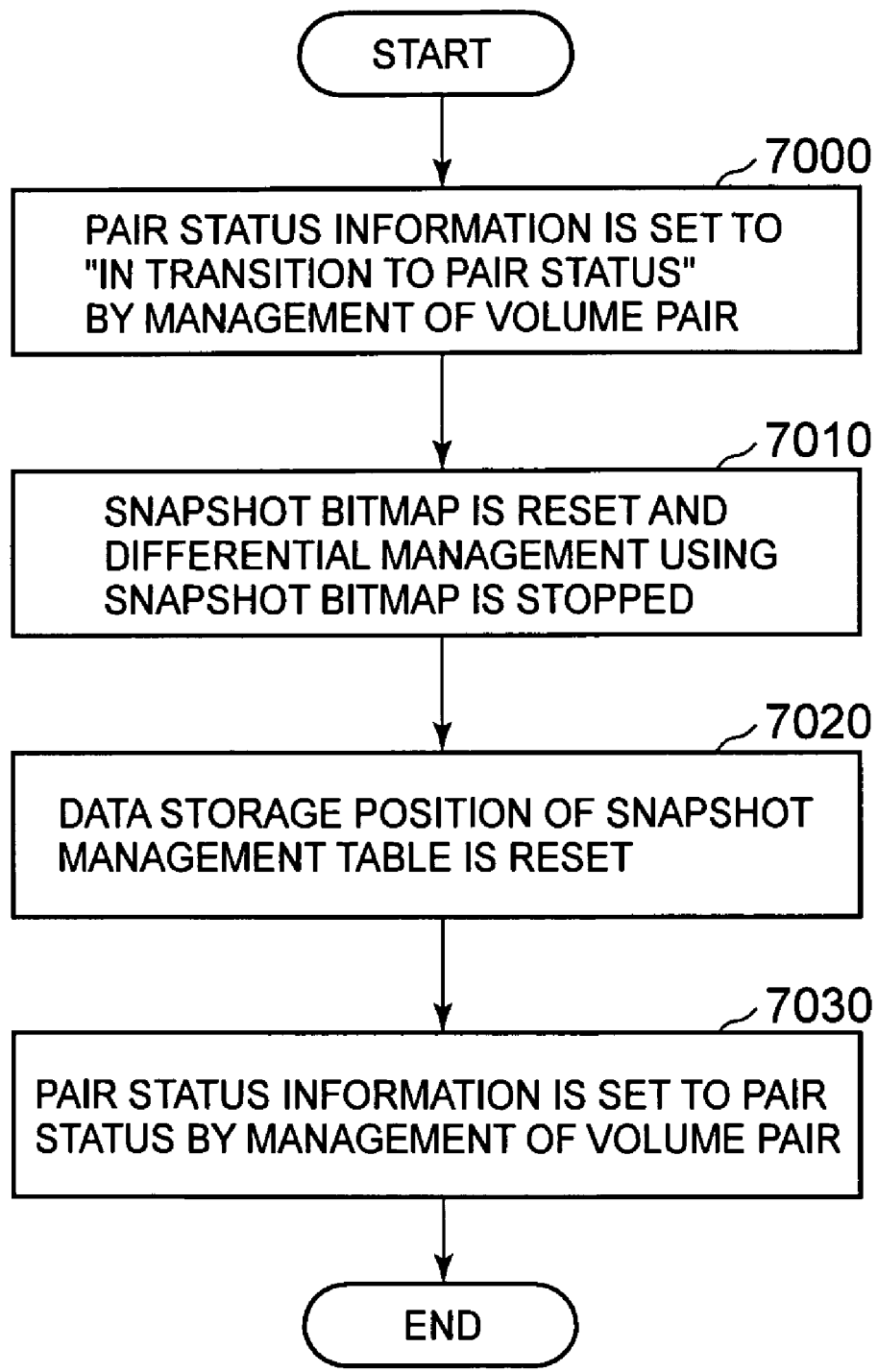
FIG. 19 shows a processing flow of the Processing of Pair Re-synchronize.

FIG. 19 shows a processing flow of the Processing of Pair Re-synchronize. In the explanation of FIG. 19, a volume pair including the main volume 150 that has been designated by the Pair Re-synchronize Indication will be called "object volume pair".

In step 7000, the Management 215 of volume pair sets the status 314 of the Pair Configuration Management Table 301 of the object volume pair to "In transition to pair status".

In step 7010, the Management 215 of volume pair resets the snapshot bitmap 303 corresponding to the object volume pair and stops the differential management using the snapshot bitmap 303. As a result, for example, in step 9010 and subsequent steps, even if a data update is present in the main volume 150 in the object volume pair, the bit of the snapshot bitmap 303 corresponding to the object volume pair is not reversed.

In step 7020, the Management 215 of volume pair resets the data storage position 343 of the Snapshot Management Table 304 corresponding to the snapshot bitmap 303 of the object volume pair (for example, the column of the data storage position 343 is made blank, or a record including the data storage position 343 is deleted).

In step 7030, the Management 215 of volume pair sets the status 314 of the Pair Configuration Management Table 301 that corresponding to the object volume pair to the pair status.

Figure 20:
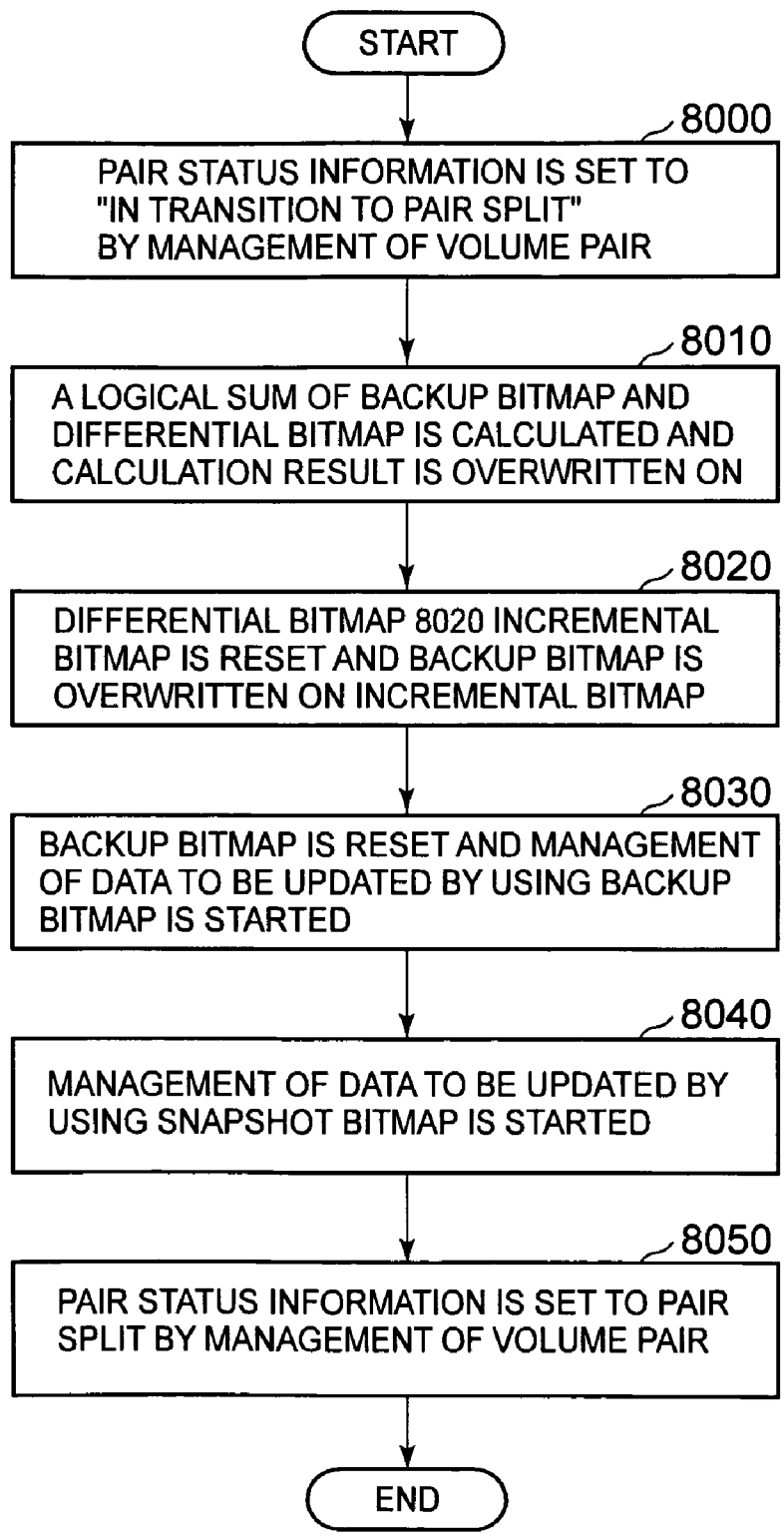
FIG. 20 shows a processing flow of the Processing of Pair Split.

FIG. 20 shows a processing flow of the Processing of Pair Split. In the explanation of FIG. 20, a volume pair including the main volume 150 that has been designated by the Pair Split Indication will be called "object volume pair".

In step 8000, the Management 215 of volume pair sets the status 314 of the Pair Configuration Management Table 301 of the object volume pair to "In transition to pair split".

In step 8010, a logical sum of the backup bitmap 307 corresponding to the object volume pair and the differential bitmap 703 corresponding to the backup source LU (snapshot volume) of the object volume pair is calculated and the calculation result is overwritten on the differential bitmap 703 by coaction of the Management 215 of volume pair and the Management 211 of backup data.

In step 8020, the incremental bitmap 703 corresponding to the backup source LU (snapshot volume) of the object volume pair is reset (all the bits are taken to be non-reversed (for example, 0)), and the calculation result of the backup bitmap 307 corresponding to the object volume pair is overwritten on the incremental bitmap 703 by coaction of the Management 215 of volume pair and the Management 211 of backup data.

In step 8030, the Management 215 of volume pair resets the backup bitmap 307 corresponding to the object volume pair, and starts the management of data to be updated in the main volume 150 within the object volume pair by using the backup bitmap 307.

In step 8040, the Management 215 of volume pair starts the management of data to be updated in the main volume 150 within the object volume pair by using the snapshot bitmap 303 corresponding to the object volume pair.

In step 8050, the Management 215 of volume pair sets the status 314 of the Pair Configuration Management Table 301 that corresponds to the object volume pair to a split status.

When a volume that will be an object is restricted in advance, e.g., by an incremental backup LU or differential backup LU, step 8020 or step 8030 can be omitted. The bitmap may be held only on any one side.

Figure 21:
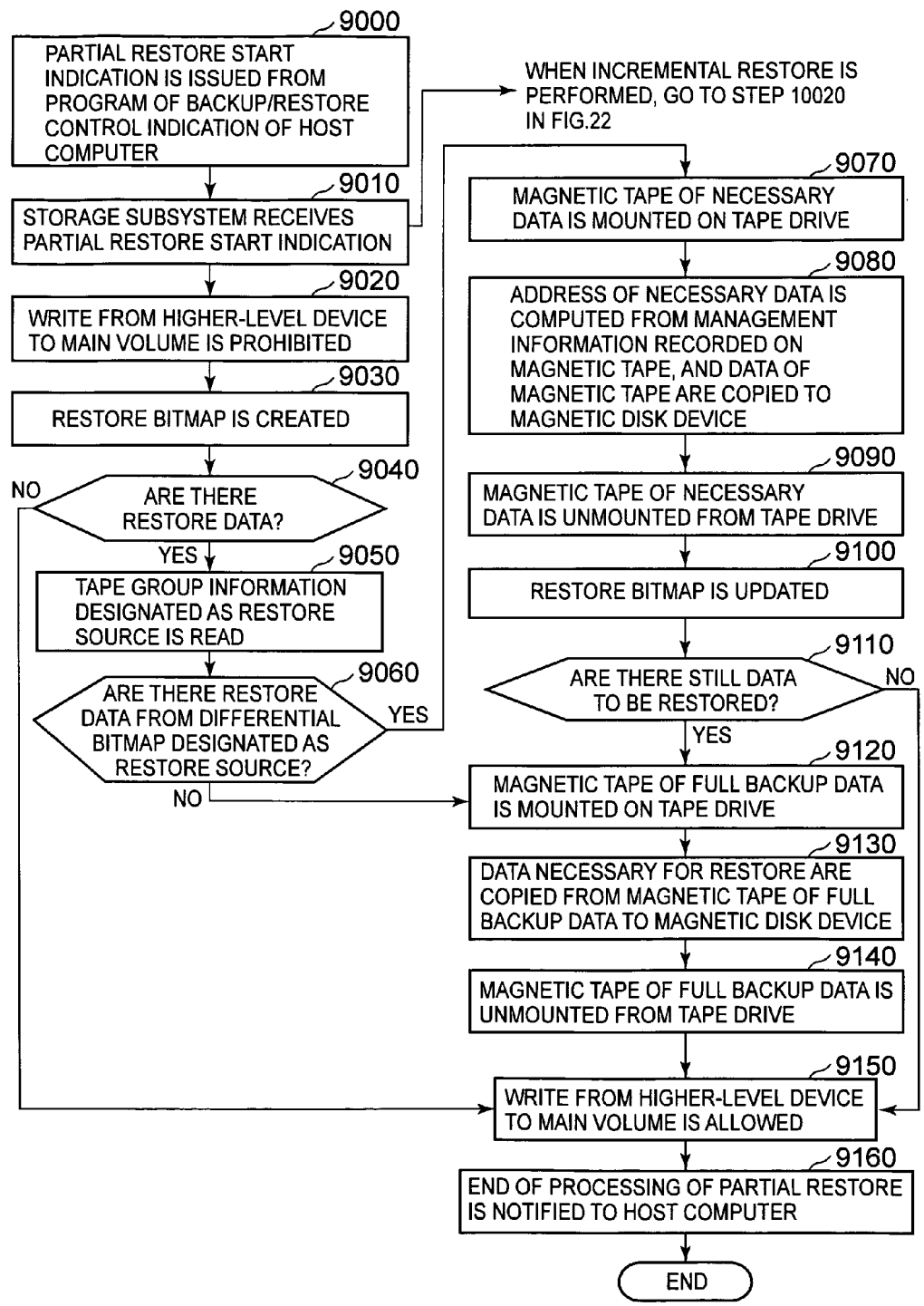
FIG. 21 shows a processing flow of the Processing of Differential Restore.

FIG. 21 shows a processing flow of the Processing of Differential Restore.

In step 9000, a Partial Restore Start Indication is issued from the Program 113 of Backup/Restore control Indication of the host computer 100 to the storage subsystem 101. In this Partial Restore Start Indication, for example, at least the restore source (for example, the tape group number), from among the restore source and restore destination, is designated.

In step 9010, the Backup/Restore Control Program 131 receives the Partial Restore Start Indication. At this time, the Backup/Restore Control Program 131 may issue a write prohibition request designating the restore destination LU (main volume 150) to the Disk Control Program 132. Further, for example, by referring to the Tape Group Management Table 602, it is possible to determine whether the restore performed based on the Partial Restore Start Indication is a differential restore or an incremental restore. As a result, for example, when the differential restore is determined to be performed, the processing flow advances to step 9020, and when the incremental restore is determined to be performed, the processing flow advances to step 10020 of FIG. 22.

In step 9020, the Disk Control Program 132 prohibits writing from the host computer 100 to the restore destination LU (main volume 150) at the predetermined occasion (for example, when a write prohibition request is received from the Backup/Restore Control Program 131).

In step 9030, a logical sum of the backup bitmap 307 corresponding to the backup source where the data of the restore object have been stored and the newest differential bitmap 703 corresponding to the backup source is calculated by coaction of the Disk Control Program 132 and the Backup/Restore Control Program 131, and the restore bitmap is created as a calculation result.

In step 9040, the Backup/Restore Control Program 131 refers to the created restore bitmap and determines whether there are data that have to be restored. If the reversed bit is present, the determination result is positive and the processing flow advances to step 9050. If the reversed bit is absent, the determination result is negative and the processing flow advances to step 9150.

In step 9050, the Backup/Restore Control Program 131 reads the tape group information 501 recorded on the tape group designated as the restore source.

In step 9060, the Backup/Restore Control Program 131 specifies the data management information 511 including the LUN 931 matching the backup source LUN 624 within the tape group information 501 that was read out. Further, the Backup/Restore Control Program 131 determines whether the data that are the restore object and were backed up in differential backup are present, by referring to the differential bitmap 703 included in the data management information 511. If a reversed bit is present in the differential bitmap 703, the determination result is positive and the processing flow advances to step 9070. If the reversed bit is absent, the determination result is negative and the processing flow advances to step 9120.

In step 9070, the tape 136 having recorded therein the differential backup data 502 corresponding to the reversed bit of the differential bitmap 703 is mounted on the tape drive 135 by coaction of the Backup/Restore Control Program 131 and the Tape Library Control Program 133.

In step 9080, management information 902 within the tape 136 where the differential backup data 502 have been recorded is referred to and the data 512 of the tape 136 are copied to the restore destination LU (main volume 150), while calculating the LBA of the restore destination LU (main volume 150) where the data 512 have to be copied, by coaction of the Backup/Restore Control Program 131, Disk Control Program 132, and Tape Library Control Program 133. For example, the LBA of the restore destination LU (main volume 150) where the data 512 have to be copied is calculated by using the differential bitmap 703 and differential management size 724 recorded on the tape 136.

In step 9090, the Tape Library Control Program 133 unmounts from the tape drive 135 the tape 136 where the differential backup data 502 for which the Processing of Copy was completed have been recorded.

In step 9100, the Backup/Restore Control Program 131 updates as a new restore bitmap the restore bitmap from which the reversed portion of the differential bitmap 703 of the tape group designated as the restore source has been removed.

In step 9110, the Backup/Restore Control Program 131 refers to the restore bitmap after the update and determines whether there are still data that will be restored. If a reversed bit is present in the restore bitmap after the update, the determination result is positive and the processing flow advances to step 9120. If the reversed bit is absent, the determination result is negative and the processing flow advances to step 9150.

In step 9120, the tape group number 626 that is necessary to restore the Tape Group Management Table 602 of the tape group 411 designated as the restore source is referred to and the tape 136 where the full backup data have been recorded is mounted on the tape drive 135 by coaction of the Backup/Restore Control Program 131 and the Tape Library Control Program 133.

In step 9130, data 512 necessary for the restore that are included in the full backup data 502 are copied from the tape 136 where the full backup data 502 have been recorded to the restore destination LU (main volume 150) by coaction of the Backup/Restore Control Program 131 and the Tape Library Control Program 133. The data 512 necessary for the restore are the data corresponding to the reversed bits in the restore bitmap.

In step 9140, the Tape Library Control Program 133 unmounts the tape 136 where the full backup data 502 have been recorded from the tape drive 135. At this time, the Tape Library Control Program 133 may issue a write permission request that designates the restore destination LU (main volume 150) to the Disk Control Program 132.

In step 9150, the Disk Control Program 132 allows writing from the host computer 100 to the restore destination LU (main volume 150) at the predetermined occasion (for example, when a write permission request is received from the Tape Library Control Program 133).

In step 9160, the Backup/Restore Control Program 131 notifies the host computer 100 that the Processing of Partial Restore has ended.

Figure 22:
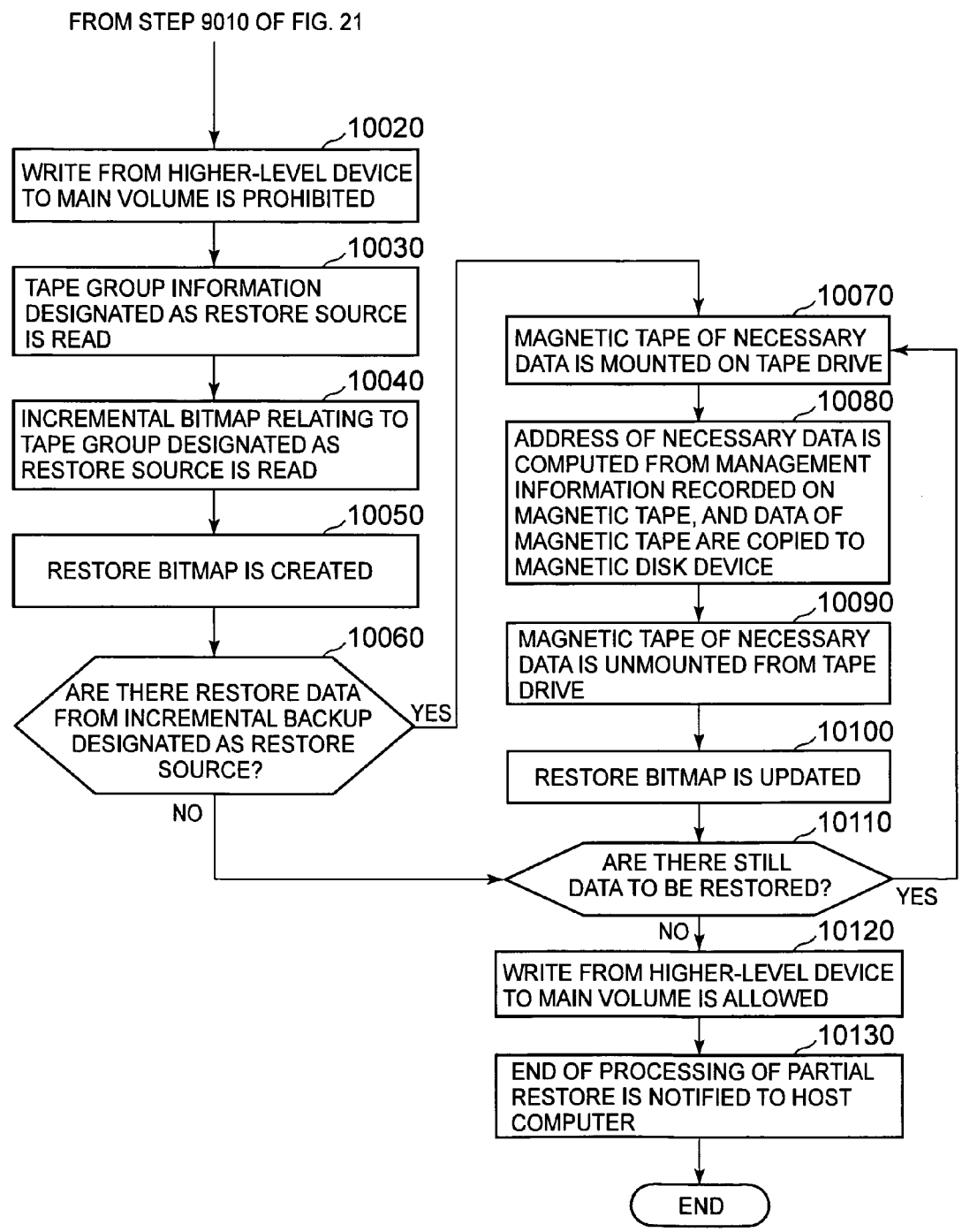
FIG. 22 shows a processing flow of the Processing of Incremental Restore.

FIG. 22 shows a processing flow of the Processing of Incremental Restore.

In step 10020, the Disk Control Program 132 prohibits writing from the host computer 100 to the restore destination LU (main volume 150) at the predetermined occasion (for example, when a write prohibition request is received from the Backup/Restore Control Program 131).

In step 10030, the Backup/Restore Control Program 131 reads the tape group information 501 that has been recorded in the tape group designated as the restore source.

In step 10040, the Backup/Restore Control Program 131 reads the incremental bitmap 703 relating to the tape group designated as the restore source. More specifically, for example, the program reads at least one incremental snapshot 703 within the interval after the Processing of Full backup of the snapshot volume 152 corresponding to the backup source LUN 624 within the tape group information 501 that was read in step 10030 to the present time.

In step 10050, the Backup/Restore Control Program 131 calculates a logical sum of at least one later incremental bitmap 703 that contains no tape group designated in the restore source (at least one incremental bitmap 703 after the date and time indicated by the recording date and time 628 within the tape group information 501 that was read in step 10030) and the backup bitmap 307 corresponding to the backup source LUN 624 within the tape group information 501 that was read in step 10030, and a restore bitmap that is the calculation result is created.

In step 10060, the Backup/Restore Control Program 131 calculates a logical sum of the restore bitmap and the incremental bitmap 703 of the tape group designated in the restore source, refers to the bitmap that is the calculation result, and determines whether data that will be restored are present. If a reversed bit is present in the bitmap, the determination result is positive and the processing flow advances to step 10070. If the reversed bit is absent, the determination result is negative and the processing flow advances to step 10110.

In step 10070 the tape 136 where the data 512 corresponding to the reversed bit specified in step 10060 (data 512 within the incremental backup data 502) is mounted on the tape drive 135 by coaction of the Backup/Restore Control Program 131 and the Tape Library Control Program 133.

In step 10080, management information 902 within the tape 136 where the incremental backup data 502 have been recorded is referred to and the data 512 of the tape 136 (data 512 corresponding to the reversed bit specified in step 10060) are copied to the restore destination LU, while calculating the LBA of the restore destination LU where the data 512 have to be copied, by coaction of the Backup/Restore Control Program 131, Disk Control Program 132, and Tape Library Control Program 133.

In step 10090, the Tape Library Control Program 133 unmounts from the tape drive 135 the tape 136 where the incremental backup data 502 for which the Processing of Copy was completed have been recorded.

In step 10100, the Backup/Restore Control Program 131 updates as a new restore bitmap the restore bitmap from which the logical sum of the restore bitmap and incremental bitmap where the necessary data were copied has been removed.

In step 10110, the Backup/Restore Control Program 131 refers to the restore bitmap after the update and determines whether data to be restored are still present. If a reversed bit is present in the restore bitmap after the update, the determination result is positive, and the processing flow returns to step 10070. If the reversed bit is absent, the determination result is negative and the processing flow returns to step 10120. At this time, the Backup/Restore Control Program 131 issues a write permission request designating the restore destination LU to the Dick Control Program 132.

In step 10120, the Disk Control Program 132 allows writing from the host computer 100 to the restore destination LU (main volume 150) at the predetermined occasion (for example, when a write permission request is received from the Backup/Restore Control Program 131).

In step 10130, the Backup/Restore Control Program 131 notifies the host computer 100 that the Processing of Partial Restore has ended.

With the above-described embodiment, the backup is executed without a backup server. As a result, the backup server performance produces no effect on the backup performance.

With the above-described embodiment, the data image (snapshot) of the main volume 150 is logically held in the snapshot volume 152 that is a virtual logical volume, and in the backup, this snapshot volume 152 is taken as a backup source. Therefore, the storage capacity consumed is less than that of a method in which the snapshot is held by copying the main volume 150 itself. Furthermore, the backup can be executed without stopping the update of the main volume 150.

With the above-described embodiment, the Processing of Differential Restore or the Processing of Incremental Restore is a processing in which the restore is performed by selecting missing data from a plurality of data 512 within the full backup data 502 after the necessary differential data 512 have been previously restored. Therefore, the data transfer volume from the restore source to the restore destination can be reduced by comparison with the Processing of Restore in which the necessary differential data 512 are restored after a plurality of data 512 constituting the full backup data 502 have been previously restored.

With the above-described embodiment, in the case of a differential/incremental backup, the management information 902 is also recorded, in addition to the data of the backup object to the tape 136. As a result, in the case of restore, the restore can be performed by using the management information 902 that has been recorded at the tape 136, even if the information of the main memory 201 of the storage subsystem 101 that has performed the backup is absent.

Further, with the above-described embodiment, the differential/incremental bitmaps 703 that should be held in the storage subsystem may be of two kinds at the very most: for differential backup and for incremental backup for one backup source LU, regardless of the generation number that should be differential managed. As a result, it is possible to avoid restricting the generation number that can be differentially managed to the storage capacity of the memory of the storage subsystem.

The preferred embodiments of the present invention were described above, but they are merely illustrative examples for explaining the present invention, and the scope of the present invention should not be construed as being limited to the embodiments. The present invention can be carried out in a variety of other modes.

For example, the snapshot bitmap 303 and the backup bitmap 307 may be integrated.

Further, for example, pair-related indications and backup-related indications may be integrated. More specifically, for example, a Pair Split Indication and a Full/Differential/Incremental Backup Indication may be integrated.

Further, for example, the management information 901 and 902 may be managed by the main memory 201 instead of or in addition to being stored in the storage device that is a backup destination.

What is claimed is:

1. A storage system comprising:
    a main volume that is a logical volume in which an update is generated by writing a data element transmitted from a higher-level device;

a copy storage area that is a storage area in which a data element prior to updating in said main volume is copied;

a snapshot management unit that manages a correspondence between a plurality of virtual storage positions in a snapshot volume that is a virtual logical volume for logically holding a snapshot image of said main volume and a plurality of address information elements indicating a plurality of actual storage positions of a plurality of data elements constituting the snapshot image of the main volume that are stored in said main volume and/or said copy storage area;

a full backup unit that executes a full backup that is a backup of differential management information and data elements from all the storage positions indicated by said plurality of address information elements to a backup destination storage device;

a differential management unit that updates differential management information for managing which virtual storage position within said snapshot volume is equivalent to a difference when the difference occurs between said snapshot volume and said backup destination storage device due to updating of said snapshot volume following an update of said main volume after said full backup; and a partial backup unit that executes a partial backup in which an actual storage position of one or more data elements equivalent to the difference between said snapshot volume and said backup destination storage device is specified from an address information element corresponding to a virtual storage position specified from said differential management information, and the differential management information and one the one or more data elements present in the specified actual storage position are backed up to said backup destination storage device.

2. The storage system according to claim 1, wherein said differential management unit manages by said differential management information a storage position, from among a plurality of virtual storage positions in said snapshot volume, of a differential data element that is present between said snapshot volume after said full backup and said backup destination storage device, said partial backup in each cycle is a differential backup, and the differential backup backs up one or more differential data elements present in one or more actual storage positions indicated by one or more address information elements corresponding to one or more virtual storage positions specified from said differential management information.

3. The storage system according to claim 2, wherein said differential management information includes a first differential management information element that is information for managing in which storage position, from among a plurality of virtual storage positions in said snapshot volume, an update has occurred and includes a second differential management information element that is information for managing which data element logically stored in a storage position, from among a plurality of virtual storage positions in said snapshot volume, is a backup object; and in which storage position, from among a plurality of virtual storage positions in said snapshot volume, a differential data element is present is specified from a result of a logical operation of said first differential management information element and said second differential management information element.

4. The storage system according to claim 3, wherein said snapshot image is a data image of said main volume at a point in time in which a volume pair of said main volume and said snapshot volume is split; said differential management unit is configured such that if an update occurs in any storage position, from among a plurality of virtual storage positions in said snapshot volume, within an interval from a point in time in which said volume pair has been split to a point in time in which said volume pair is split the next time, then said first differential management information element is updated so that the updated storage position becomes known, and at the time said volume pair is split, said differential management unit performs a logical operation of said first differential management information element and said second differential management information element at the time of this split, overwrites the result of this logical operation on said second differential management information element, and then resets said first differential management information element; and in said differential backup, specifying is performed to determine a virtual storage position in which a differential data element is present, from the second differential management information element at the time of the differential backup.

5. The storage system according to claim 4, wherein said partial backup unit also backs up restore necessary information that is necessary to restore a snapshot image in use of a differential data element, in addition to the differential data element present in a specified position, in a differential backup of each cycle, to said backup destination storage device; and said restore necessary information includes a second differential management information element at a point in time of the differential backup.

6. The storage system according to claim 3, wherein said snapshot image is a data image of said main volume at a snapshot acquisition time; said differential management unit is configured such that if an update occurs in any storage position, from among a plurality of virtual storage positions in said snapshot volume, within an interval from a snapshot acquisition time to a next snapshot acquisition time, then said first differential management information element is updated so that the updated storage position becomes known, and at the snapshot acquisition time, said differential management unit performs a logical operation of said first differential management information element and said second differential management information element, overwrites the result of this logical operation on said second differential management information element, and then resets said first differential management information element; and in said differential backup, specifying is performed to determine a virtual storage position in which a differential data element is present, from the second differential management information element at the time of the differential backup.

7. The storage system according to claim 1, wherein said differential management unit manages by said differential management information a storage position, from among a plurality of virtual storage positions in said snapshot volume, of a differential data element between said snapshot volume and said backup destination storage device after immediately preceding full backup or immediately preceding partial backup; said partial backup in each cycle is an incremental backup; and the incremental backup backs up one or more differential data elements present in one or more actual storage positions indicated by one or more address information elements corresponding to one or more virtual storage positions specified from said differential management information.

8. The storage system according to claim 7, wherein said differential management information includes a first differential management information element that is information for managing in which storage position, from among a plurality of virtual storage positions in said snapshot volume, an update has occurred and a second differential management information element that is information for managing which data element corresponding to a storage position, from among a plurality of virtual storage positions in said snapshot volume, is a backup object; and specifying is performed to determine a virtual storage position in which a differential data element is present, from said second differential management information element that has been updated in use of said first differential management information element.

9. The storage system according to claim 8, wherein said snapshot image is a data image of said main volume at a point in time in which a volume pair of said main volume and said snapshot volume is split; said differential management unit is configured such that if an update occurs in any storage position, from among a plurality of virtual storage positions in said snapshot volume, within an interval from a point in time in which said volume pair has been split to a point in time in which said volume pair is split the next time, then said first differential management information element is updated so that the updated storage position becomes known, and said differential management unit resets said second differential management information element at the time of this split of said volume pair, overwrites said first differential management information element at the time of this split on said second differential management information element that has been reset, and then resets said first differential management information element; and in said incremental backup, specifying is performed to determine a virtual storage position in which a differential data element is present, from the second differential management information element at the time of the incremental backup.

10. The storage system according to claim 9, wherein said partial backup unit also backs up restore necessary information that is necessary to restore a snapshot image in use of a differential data element, in addition to the differential data element present in a specified virtual storage position, in an incremental backup of each cycle, to said backup destination storage device; and said restore necessary information includes a second differential management information element at a point in time of the incremental backup.

11. The storage system according to claim 8, wherein said snapshot image is a data image of said main volume at a snapshot acquisition time; said differential management unit is configured such that if an update occurs in any storage position, from among a plurality of virtual storage positions in said snapshot volume, within an interval from a snapshot acquisition time to a next snapshot acquisition time, then said first differential management information element is updated so that the updated storage position becomes known, and at the snapshot acquisition time, said differential management unit resets said second differential management information element, overwrites said first differential management information element at this time on said second differential management information element that has been reset, and then resets said first differential management information element; and in said incremental backup, specifying is performed to determine a virtual storage position in which a differential data element is present, from the second differential management information element at the time of the incremental backup.

12. The storage system according to claim 1, wherein said differential management unit manages by said differential management information both a position, from among a plurality of positions in said snapshot volume, of a differential data element between said snapshot volume and said backup destination storage device after said full backup, and a position, from among a plurality of positions in said snapshot volume, of a differential data element between said snapshot volume and said backup destination storage device after immediately preceding full backup or immediately preceding partial backup; said partial backup in each cycle is designated by backup indication from a higher-level device from among the differential backup and incremental backup; and the differential backup and incremental backup back up one or more differential data elements present in one or more positions indicated by one or more address information elements, from among a plurality of said address information, elements, corresponding to one or more positions specified from said differential management information.

13. The storage system according to claim 12, wherein said snapshot image is a data image of said main volume at a point in time in which a volume pair of said main volume and said snapshot volume is split; said differential management information includes a first differential management information element that is information for managing in which position, from among a plurality of positions in said snapshot volume, an update has occurred and second and third differential management information elements that are information for managing which data element corresponding to a position, from among a plurality of positions in said snapshot volume, is a backup object; said differential management unit is configured such that if an update occurs in any position, from among a plurality of positions in said snapshot volume, within an interval from a point in time in which said volume pair has been split to a point in time in which said volume pair is split the next time, then said first differential management information element is updated so as to know the updated position, and at the time said volume pair is split, said differential management unit performs a logical operation of said first differential management information element and said second differential management information element at the time of this split, overwrites a result of this logical operation on said second differential management information element, resets said third differential management information element, overwrites said first differential management information element at the time of this split on said third differential management information element after the reset, and then resets said first differential management information element; and in said differential backup, specifying is performed to determine a position, from among a plurality of positions in said snapshot volume, in which a differential data element is present, from the second differential management information element at the time of the differential backup; and in said incremental backup, specifying is performed to determine a position, from among a plurality of positions in said snapshot volume, in which a differential data element is present, from the third differential management information element at the time of the incremental backup.

14. The storage system according to claim 12, wherein said snapshot image is a data image of said main volume at a snapshot acquisition time; said differential management information includes a first differential management information element that is information for managing in which virtual storage position, from among a plurality of virtual storage positions in said snapshot volume, an update has occurred and second and third differential management information elements that are information for managing which data element corresponding to the virtual storage position storage position, from among a plurality of virtual storage positions in said snapshot volume, is a backup object; said differential management unit is configured such that if an update occurs in any virtual storage position, from among a plurality of virtual storage positions in said snapshot volume, within an interval from a snapshot acquisition time to a next snapshot acquisition time, then said first differential management information element is updated so that the updated position becomes known, and at the snapshot acquisition time, said differential management unit performs a logical operation of said first differential management information element and said second differential management information element at this time, overwrites the result of this logical operation on said second differential management information element, resets said third differential management information element, overwrites said first differential management information element at this time on said third differential management information element after the rest, and then resets said first differential management information element; in said differential backup, specifying is performed to determine a virtual storage position, from among a plurality of virtual storage positions in said snapshot volume, in which a differential data element is present, from the second differential management information element at the time of the differential backup; and in said incremental backup, a position, from among a plurality of positions in said snapshot volume, in which a differential data element is present is specified from the third differential management information element at the time of the incremental backup.

15. The storage system according to claim 1, further comprising a restore unit that restores a snapshot image of a restore object, from among a plurality of snapshot images respectively corresponding to a plurality of points in time, to said main volume or another logical volume, wherein said restore unit restores said plurality of data elements subjected to said full backup, and then overwrites one or more data elements, which have been backed up in said partial backup and are in the snapshot image of said restore object, on data elements respectively corresponding to said one or more data elements from among said plurality of data elements restored.

16. The storage system according to claim 1, further comprising a restore unit that restores a snapshot image of a restore object, from among a plurality of snapshot images respectively corresponding to a plurality of points in time, to said main volume or another logical volume, wherein said restore unit restores one or more data elements, which have been backed up in said partial backup and are in the snapshot image of said restore object, and restores data elements other than said one or more data elements that are in the snapshot image of said restore object by reading from a group of data elements partially backed up and/or from a group of data elements fully backed up at a point in time preceding a restore object time that is a point in time in which the snapshot image of said restore object had been partially backed up.

17. The storage system according to claim 16, wherein a restore destination of a data element stored in said backup destination storage device is said main volume; and said restore unit does not execute the restore with respect to positions having stored therein data elements constituting a snapshot image of said restore object, from among a plurality of positions in said main volume at a restore execution time that is a point in time in which the restore is executed.

18. The storage system according to claim 17, wherein said differential management information includes a first differential management information element that is information for managing in which position, from among a plurality of positions in said snapshot volume, an update has occurred and a second differential management information element that is information for managing which data element corresponding to a position, from among a plurality of positions in said snapshot volume, is a backup object; and said restore unit specifies one or more first restore object positions, from among a plurality of positions in said main volume, from a result of logical operation of said first differential management information element and said second differential management information element in said restore execution time, specifies one or more second restore object positions from among a plurality of positions in said main volume from said second differential management information element at said restore object time, restores one or more data elements differentially backed up at said restore object time to each respective said one or more second restore object positions, and restores to a position other than said one or more second restore object positions, from among said one or more first restore object positions, a data element that corresponds to said position by selecting said data element from a group of data elements that had been full backed up at a point in time before said restore object time.

19. The storage system according to claim 18, wherein said differential management unit is configured such that if an update occurs in any position, from among a plurality of positions in said snapshot volume, within an interval from a point in time in which said volume pair has been split to a point in time in which said volume pair is split the next time, then said first differential management information element is updated so that the updated storage position becomes known, and at the time said volume pair is split, said differential management unit performs a logical operation of said first differential management information element and said second differential management information element at the time of this split, overwrites the result of this logical operation on said second differential management information element, and then resets said first differential management information element.

20. The storage system according to claim 18, wherein said differential management unit is configured such that if an update occurs in any virtual storage position, from among a plurality of virtual storage positions in said snapshot volume, within an interval from a snapshot acquisition time to a next snapshot acquisition time, then said first differential management information element is updated so that the updated virtual storage position becomes known, and at the snapshot acquisition time, said differential management unit performs a logical operation of said first differential management information element and said second differential management information element at this time, overwrites the result of this logical operation on said second differential management information element, and then resets said first differential management information element.

21. The storage system according to claim 17, wherein said differential management information includes a first differential management information element that is information for managing in which position, from among a plurality of positions in said snapshot volume, an update has occurred and a second differential management information element that is information for managing which data element corresponding to a position, from among a plurality positions in said snapshot volume, is a backup object; and restore unit executes the following processing (1) to (3):
  (1) to create a restore position information element that represents one or more restore object positions, from among a plurality of positions in said main volume, from a result of logical operation of said first differential management information element at said restore execution time and each second differential management information element in each backup time that is before said restore execution time and after said restore object time;
  (2) to restore a data element incrementally backed up or fully backed up at the backup time to the restore object position specified from a result of logical operation of said second differential management information element at the incremental backup time and said created restore position information element or the updated restore position information element with respect to each incremental backup time before said restore object time, and to update said restore position information element by removing said specified restore object position from one or more restore object positions indicated by the restore position information element used for said logical operation;

(3) if the restore position information element after the update relating to the incremental backup time immediately after the full backup represents at least one restore object position, then data element corresponding to this restore object position, from among a plurality of data elements fully backed up, is restored to the restore object position.

22. The storage system according to claim 21, wherein said differential management unit is configured such that if an update occurs in any position, from among a plurality of positions in said snapshot volume, within an interval from a point in time in which said volume pair has been split to a point in time in which said volume pair is split the next time, then said first differential management information element is updated so that the updated storage position becomes known, and said differential management unit resets said second differential management information element at the time of this split of said volume pair, overwrites said first differential management information element at the time of this split on said second differential management information element that has been reset, and then resets said first differential management information element.

23. The storage system according to claim 21, wherein said differential management unit is configured such that if an update occurs in any position, from among a plurality of positions in said snapshot volume, within an interval from a snapshot acquisition time to a next snapshot acquisition time, then said first differential management information element is updated so that the updated position becomes known, and at the snapshot acquisition time, said differential management unit resets said second differential management information element, overwrites said first differential management information element at this time on said second differential management information element after the reset, and then resets said first differential management information element.

24. The storage system according to claim 1, wherein said backup destination storage device is a storage device of a sequential access type.

25. A storage control method comprising the steps of:

managing a correspondence between a plurality of virtual storage positions in a snapshot volume that is a virtual logical volume for logically holding a snapshot image of a main volume that is a logical volume in which an update is generated by writing a data element transmitted from a higher-level device and a plurality of address information elements indicating a plurality of actual storage positions of a plurality of data elements constituting the snapshot image of the main volume that are stored in both said main volume and a copy storage area that is a storage area in which a data element prior to updating in said main volume is copied, or stored in one of said main volume and said copy storage area;

backing up differential management information and data elements from all the storage positions indicated by said plurality of address information elements to a backup destination storage device in an initial backup;

updating the differential management information for managing which virtual storage position within said snapshot volume is equivalent to a difference when the difference occurs between said snapshot volume and said backup destination storage device due to updating said snapshot volume is updated following an update of said main volume, after said initial backup; and specifying, in the next and subsequent backups, an actual storage position of one or more data elements equivalent to the difference between said snapshot volume and said backup destination storage device from an address information element corresponding to a virtual storage position specified from said differential management information and backing up the differential management information and one or more data elements present in the specified actual storage position to said backup destination storage device.

* * * * *